US009422181B1

(12) United States Patent
Borchard et al.

(10) Patent No.: US 9,422,181 B1
(45) Date of Patent: Aug. 23, 2016

(54) VEHICLE WASH WATER RECLAIM SYSTEM

(71) Applicants: Charles A. Borchard, Rocklin, CA (US); Gregory W. Evans, Davis, CA (US); Christopher M. Borchard, Citrus Heights, CA (US); Steven M. Samudio, Fair Oaks, CA (US)

(72) Inventors: Charles A. Borchard, Rocklin, CA (US); Gregory W. Evans, Davis, CA (US); Christopher M. Borchard, Citrus Heights, CA (US); Steven M. Samudio, Fair Oaks, CA (US)

(73) Assignee: New Wave Industries, North Highlands, CA (US)

( * ) Notice: Subject to any disclaimer, the term of this patent is extended or adjusted under 35 U.S.C. 154(b) by 465 days.

(21) Appl. No.: 14/092,738

(22) Filed: Nov. 27, 2013

(51) Int. Cl.
 *C02F 9/00* (2006.01)
 *C02F 1/38* (2006.01)
 *B01D 21/34* (2006.01)
 *B01D 21/26* (2006.01)
 *C02F 103/44* (2006.01)

(52) U.S. Cl.
 CPC .......... *C02F 9/00* (2013.01); *B01D 21/267* (2013.01); *B01D 21/34* (2013.01); *C02F 1/38* (2013.01); *B01D 2201/287* (2013.01); *C02F 2103/44* (2013.01)

(58) Field of Classification Search
 CPC .......... C02F 9/00; C02F 1/38; C02F 2103/44; B01D 21/34; B01D 21/267; B01D 2201/287
 See application file for complete search history.

(56) References Cited

U.S. PATENT DOCUMENTS

| 4,168,231 | A | * | 9/1979 | Allen ...................... C02F 1/38 210/136 |
| 4,412,920 | A | | 11/1983 | Bolton et al. |
| 5,152,891 | A | | 10/1992 | Netkowicz et al. |
| 5,215,656 | A | | 6/1993 | Stoneburner |
| 6,508,933 | B2 | | 1/2003 | Wilkins et al. |
| 7,083,735 | B2 | | 8/2006 | Laing |
| 7,347,933 | B2 | | 3/2008 | Berry, III et al. |
| 7,501,058 | B1 | | 3/2009 | Lawrence, Sr. |
| 8,246,831 | B2 | | 8/2012 | McFarland |

* cited by examiner

Primary Examiner — David A Reifsnyder
(74) Attorney, Agent, or Firm — Dennis A. DeBoo

(57) ABSTRACT

Vehicle wash water reclaim system in fluid communication with settling tanks receiving used vehicle wash water, the system comprising: a control system, a self-cleaning vertical plane strainer, a pump controlled by the control system, and a cyclone assembly wherein the pump is in fluid communication with the self-cleaning vertical plane strainer for drawing vehicle wash water through the vertical plane strainer and pumping it through the cyclone assembly to a recirculation line feeding back to the underground settling tanks and to a vehicle wash line feeding vehicle wash equipment. The assembly comprising at least one first cyclone in continuous fluid communication between the pump and the recirculation and vehicle wash lines and at least one second cyclone selectively switched into parallel fluid communication with the at least one first cyclone. An ozone system and a hydrogen peroxide system comprising a screen filter bio-media combination are disposed in the recirculation line.

21 Claims, 25 Drawing Sheets

VEHICLE WASH WATER RECLAIM SYSTEM

FIELD OF THE INVENTION

This invention relates to a vehicle wash water reclaim system utilized for collecting vehicle wash water from a vehicle wash system and treating the reclaimed vehicle wash water for effective and safe reuse by the vehicle wash system.

BACKGROUND OF THE INVENTION

Vehicle wash operators have used water reclaim or reclamation systems for decades to reduce the amount of fresh water required by the wash and the amount of water discharged from the wash to minimize the cost of municipal water and sewer charges. The first reclaim systems incorporated a collection pit to collect large solids such as rocks and debris, a recirculation pump to deliver water from the pit to the wash equipment, and possibly a sand separator (50-60 micron removal) to remove some finer solids. Although these systems saved water and sewer costs, they also created deleterious issues with the vehicle wash equipment due to, for example, increased maintenance from plugging of lines, plugging of nozzles, and increased wear of wash equipment pumps. These systems further introduced a foul odor from increased biological activity.

The next generation of reclaim systems that have been used in the last ten years have improved, but at the expense of increased maintenance and operating costs. For example, finer filtration techniques used as the filter media tend to plug with biological activity that cannot be easily removed and disposable filters increase operating costs for replacement parts and labor. With the need of increased maintenance comes more downtime of these reclaim systems for said maintenance or poor performance, resulting in higher water and sewer costs for the wash operator. Additionally, these reclaim systems require greater attention and water treatment knowledge by the vehicle wash operator. As a result of the above delineated problems, many of these reclaim systems have been abandoned and bypassed.

Notwithstanding, water has become an ever increasing limited commodity and an ever increasing operating expense to the operators of vehicle wash systems. Additionally, some local municipalities require the use of water reclaim systems. While other municipalities charge water, sewer, and connection fees that make reclaiming water from the wash a necessity to keep operating expenses within budget for the wash operator. As a result, the use of water reclaim systems has continued to increase in spite of the significant problems associated therewith.

Accordingly, there is a need for a vehicle wash water reclaim system that, inter alia, ameliorates or overcomes one or more of the significant shortcomings delineated hereinabove.

BRIEF SUMMARY OF THE INVENTION

Accordingly, and in one aspect, an embodiment of the invention ameliorates or overcomes one or more of the significant shortcomings delineated hereinabove by providing a vehicle wash water reclaim system that, inter alia, collects vehicle (automobile, truck, bus, train, aircraft, boat, et cetera) wash water and treats the vehicle wash water by removing fine solids that clog wash nozzles and damage or increase wear on wash pumps of vehicle wash equipment, plus controls the biological activity to prevent odor and plugging of lines and wash nozzles of the vehicle wash equipment while also reducing required operator attention and maintenance in comparison to previous systems.

Additionally, and in one aspect, an embodiment of the invention provides a vehicle wash water reclaim system in fluid communication with underground settling tanks receiving used vehicle wash water, the system comprising: a control system, a self-cleaning vertical plane strainer device, a pump controlled by the control system, and a cyclone assembly wherein the pump is in fluid communication with the self-cleaning vertical plane strainer for drawing used vehicle wash water through the vertical plane strainer and pumping it through the cyclone assembly to a recirculation line feeding back to the underground settling tanks and to a vehicle wash line feeding vehicle wash equipment. In one embodiment, the vehicle wash water reclaim system further comprises an ozone system for entraining ozone into the treated reclaim water in the recirculation line. In one embodiment, the vehicle wash water reclaim system further comprises a hydrogen peroxide system comprising a self-cleaning recirculation filter comprising bio-media and disposed in the recirculation line for providing bio-media screen filtered hydrogen peroxide injected ozone-laden treated reclaim water flowing in the recirculation line to the underground settling tanks.

Furthermore, and in one aspect, the control system comprises a programmable logic controller configured with a self-cleaning vertical plane strainer process and a self-cleaning recirculation filter process to automatically cycle the self-cleaning of the self-cleaning vertical plane strainer device and the self-cleaning recirculation filter comprising bio-media for ensuring that cleaning of the components is performed on a regular basis without the need for operator oversight, which maintains operating performance and reduces part wear thereby reducing the need for replacement parts that increases operating, maintenance, and downtime expenses. By reducing part wear, the system also extends system life while improving system reliability.

Moreover, and in one aspect, the self-cleaning vertical plane strainer process comprises a self-prime process to self-prime the pump after the self-cleaning of the vertical plane strainer device.

In one aspect, an embodiment of the cyclone assembly comprises at least one first cyclone in continuous fluid communication between the pump and the recirculation and vehicle wash lines and at least one second cyclone selectively switched into parallel fluid communication with the at least one first cyclone.

In one aspect, an embodiment of the vehicle wash water reclaim system is sized to treat 85-100% of the wash water used by the wash and return this treated water automatically to various applications within the wash, providing significant savings to the end user on incoming fresh water and sewer charges. With zero discharge, the system eliminates the need for sewer connections and discharge permits.

Accordingly, it should be apparent that numerous modifications and adaptations may be resorted to without departing from the scope and fair meaning of the claims as set forth herein below following the detailed description of the invention.

DETAILED DESCRIPTION OF THE INVENTION

Figure 1:
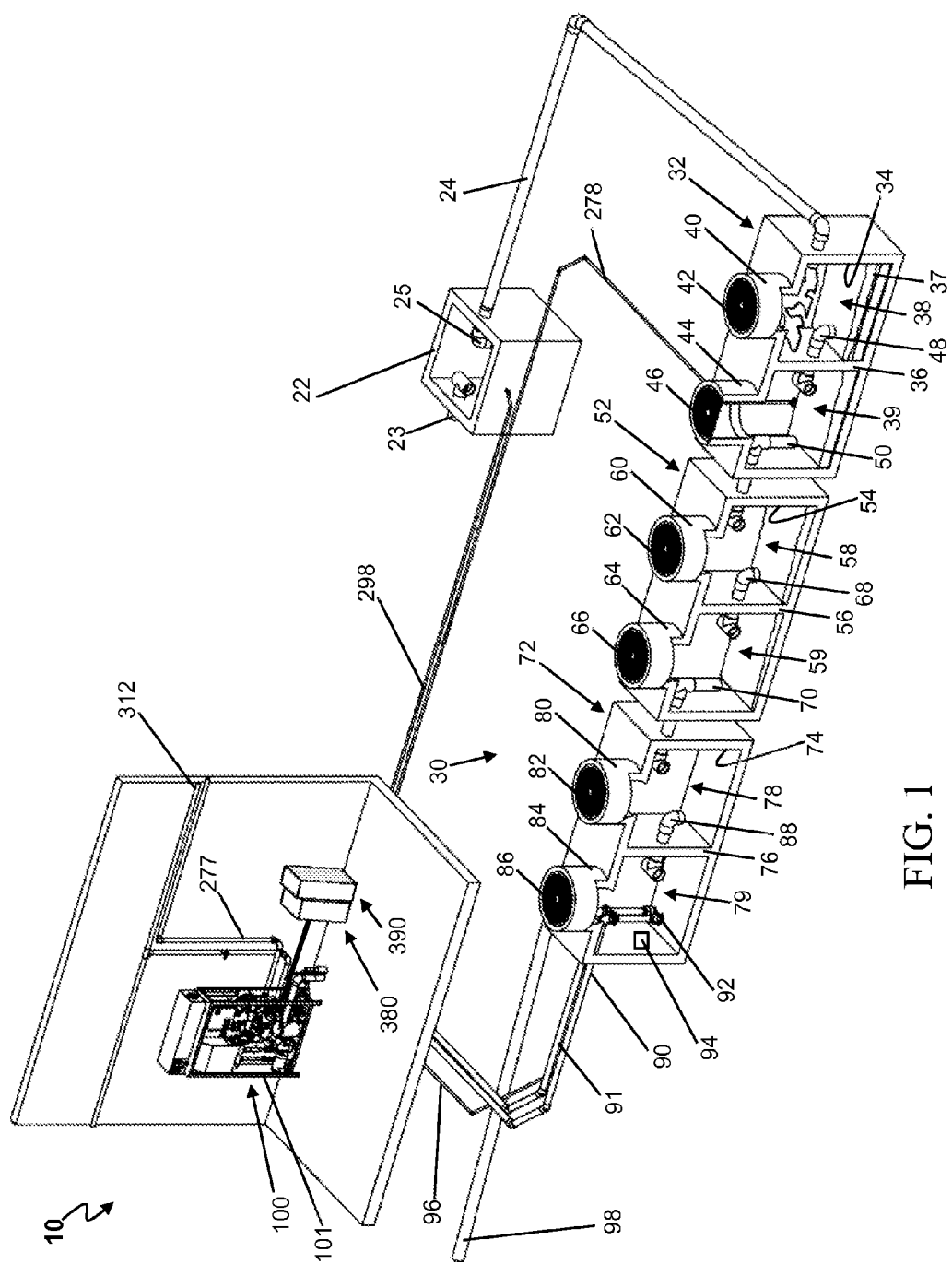
FIG. 1 is a perspective view of an embodiment of a vehicle wash water reclaim system operatively coupled to a settling tank system that is illustrated in section and to a vehicle wash catch basin for, under the orchestration of a controller of the system, pumping water in the settling tank system to the vehicle wash water reclaim system for processing the communicated water into a treated reclaim water for use with the vehicle wash system while simultaneously and continuously feeding back a supply of the treated reclaim water that defines a recirculation water to the settling tank system wherein, in one embodiment, the recirculation water is ozone injected, hydrogen peroxide treated, and filtered prior to being fed back to the settling tank system.

Considering the drawings, wherein like reference numerals denote like parts throughout the various drawing figures, reference numeral 10 is directed to an embodiment of a vehicle wash water reclaim system.

System 10 Overview

Figure 2:
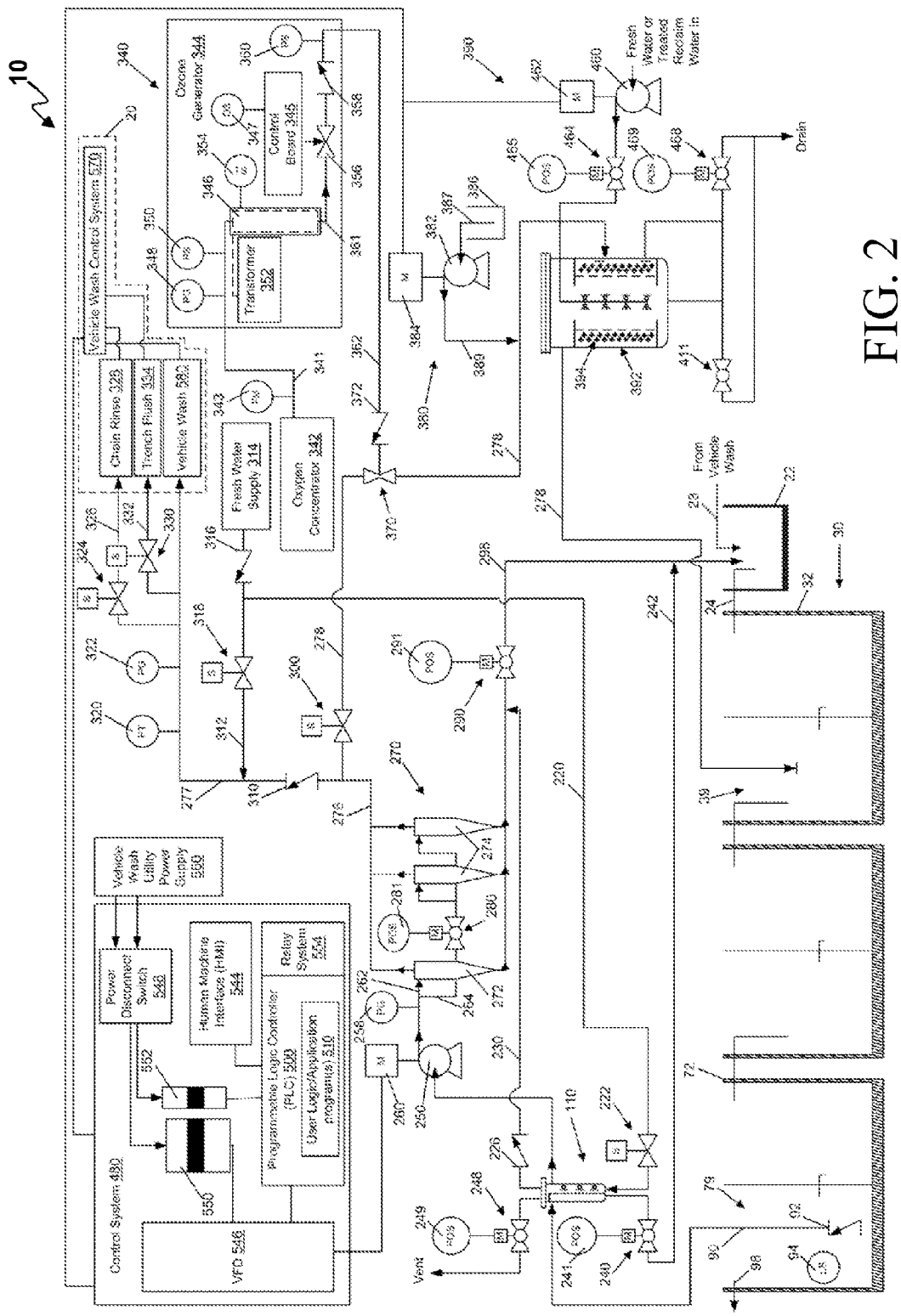
FIG. 2 is a partial process and instrumentation diagram and functional block diagram view of an embodiment of the vehicle wash water reclaim system.

In one embodiment, and referring to FIGS. 1 and 2, the vehicle wash water reclaim system 10 comprises an above ground vehicle wash water reclaim unit 100 supported on a frame 101 and comprising a control system 480. The vehicle wash water reclaim unit 100 is operatively coupled to and in fluid communication between a vehicle wash system 20 and an underground reclaim water settling tank system 30.

Vehicle wash water reclaim unit 100 comprises a self-cleaning vertical plane strainer device 110, a reclaim pump 250 driven by a reclaim pump motor 260, and a cyclone system 270 having continuous recirculation cyclone utilization combined with an on demand cyclone utilization wherein the self-cleaning vertical plane strainer device 110 is operatively coupled to and in fluid communication with the suction side of the pump 250 and the cyclone system 270 is operatively coupled to and in fluid communication with the outlet side of the pump for, under orchestration of the control system 480, treating vehicle wash water collected from the vehicle wash system 20 via the underground reclaim water settling tank system 30. Then, delivering upon demand, the treated water to the vehicle wash system 20 for effective and safe reuse for satisfactorily washing subsequent vehicles while simultaneously and continuously feeding back a continuous flow of the treated water to the underground reclaim water settling tank system 30. In one embodiment, the wash water reclaim unit 100 comprises an ozone generation and injection system 340 for entraining ozone into the continuous flow of treated water.

In one embodiment, the vehicle wash water reclaim system 10 comprises a hydrogen peroxide delivery system 380 for injecting hydrogen peroxide into the continuous flow of treated recirculation water to obtain a continuous flow of hydrogen peroxide injected ozone-laden treated reclaim recirculation water back to the underground reclaim water settling tank system 30.

In one embodiment, the vehicle wash water reclaim system 10 further comprises a self-cleaning recirculation filter system 390 comprising a bio-media means 434 (FIG. 16) for filtering the hydrogen peroxide injected ozone-laden treated reclaim recirculation water just prior to being delivered back to the underground reclaim water settling tank system 30.

The size of the pump, the number of cyclones needed, the number of reclaim tanks, and the size of ozone generation system is determined by the amount of treated water required by the wash or washes being served.

Vehicle Wash System 20

More specifically, and referring to FIG. 1, an embodiment of the vehicle wash system 20 comprises a catch basin 22 for initially collecting vehicle wash water via inlet 23 that has been used by the vehicle wash system 20 in cleaning a vehicle.

In turn, the catch basin 22 feeds the collected vehicle wash water, which comprises settleable solids (typically sand, grit) as well as perhaps oils and grease removed from the surface of the vehicle, to the underground reclaim tank system 30 via a transfer line or conduit 24 providing open fluid communication between the catch basin 22 and the underground reclaim tank system 30.

In general, catch basin 22 captures large heavy solids (rocks, gravel) and floating trash (e.g., plastic bags) disposed in the collected vehicle wash water prior to the collected vehicle wash water being feed to the reclaim tank system 30. Also, the outlet connection 25 is preferably in an elbow down position as illustrated and below the water surface to prevent any gas from traveling back from the reclaim tanks Reclaim Tank System 30

In the embodiment illustrated in FIG. 1, the reclaim tank system 30 comprises a plurality of underground reclaim tanks disposed in a series configuration and, in particular, in a series configuration of three settling tanks comprised of an upstream tank 32, an midstream tank 52, and an downstream tank 72 configured such that relatively cleaner water flows from one settling tank into the next successive settling tank as illustrated by the decreasing amounts of settled solids 37 contained from one settling tank to the next in a downstream direction.

Upstream Tank 32

In one embodiment, the upstream tank 32 comprises an interior surface 34 defining an interior chamber bifurcated by a full height baffle 36 into a multi-chamber configuration comprised of an upstream chamber compartment 38 and a downstream chamber compartment 39.

Additionally, and in one embodiment, the upstream tank 32 comprises an upstream cylindrical riser 40 and a downstream cylindrical riser 44. The upstream cylindrical riser 40 surmounts and is in open communication with the upstream chamber compartment 38 at one open end while having the other open end closed by a removable cap 42. Similarly, the downstream cylindrical riser 44 surmounts and is in open communication with the downstream chamber compartment 39 at one open end while having the other open end closed by a removable cap 46.

The upstream tank 32 further comprises an open ended conduit assembly 48 having a portion extending through full height baffle 36 and between an upstream open downturned elbow end in open communication with the upstream chamber compartment 38 and a downstream open horizontally disposed T-shaped end in open communication with the downstream chamber compartment 39 for communicating the collected vehicle wash water from the upstream chamber compartment 38 to the downstream chamber compartment 39 which, in turn, communicates the collected vehicle wash water to the midstream tank 52 via conduit assembly 50. The upstream open downturned elbow end of the open ended conduit assembly 48 is downturned to keep floatables from migrating and to collect near the water level mid-point to capture the cleanest water.

Midstream Tank 52

In one embodiment, the midstream tank 52 comprises an interior surface 54 defining an interior chamber bifurcated by a full height baffle 56 into a multi-chamber configuration comprised of an upstream chamber compartment 58 and a downstream chamber compartment 59 wherein upstream chamber compartment 58 receives the collected vehicle wash water from the downstream chamber compartment 39 of the upstream tank 32 via conduit assembly 50.

Additionally, and in one embodiment, the midstream tank 52 comprises an upstream cylindrical riser 60 and a downstream cylindrical riser 64. The upstream cylindrical riser 60 surmounts and is in open communication with the upstream chamber compartment 58 at one open end while having the other open end closed by a removable cap 62. Similarly, the downstream cylindrical riser 64 surmounts and is in open communication with the downstream chamber compartment 59 at one open end while having the other open end closed by a removable cap 66.

The midstream tank 52 further comprises an open ended conduit assembly 68 having a portion extending through full height baffle 56 and between an upstream open downturned elbow end in open communication with the upstream chamber compartment 58 and a downstream open horizontally disposed T-shaped end in open communication with the downstream chamber compartment 59 for communicating the collected vehicle wash water from the upstream chamber compartment 58 to the downstream chamber compartment 59 which, in turn, communicates the collected vehicle wash water to the downstream tank 72 via conduit assembly 70. The upstream open downturned elbow end of the open ended conduit assembly 68 is downturned to keep floatables from migrating and to collect near the water level mid-point to capture the cleanest water.

Downstream Tank 72

In one embodiment, the downstream tank 72 comprises an interior surface 74 defining an interior chamber bifurcated by a full height baffle 76 into a multi-chamber configuration comprised of an upstream chamber compartment 78 and a downstream chamber compartment 79 wherein upstream chamber compartment 78 receives the collected vehicle wash water from the downstream chamber compartment 59 of the midstream tank 52 via conduit assembly 70.

Additionally, and in one embodiment, the downstream tank 72 comprises an upstream cylindrical riser 80 and a downstream cylindrical riser 84. The upstream cylindrical riser 80 surmounts and is in open communication with the upstream chamber compartment 78 at one open end while having the other open end closed by a removable cap 82. Similarly, the downstream cylindrical riser 84 surmounts and is in open communication with the downstream chamber compartment 79 at one open end while having the other open end closed by a removable cap 86.

The downstream tank 72 further comprises an open ended conduit assembly 88 having a portion extending through full height baffle 76 and between an upstream open downturned elbow end in open communication with the upstream chamber compartment 78 and a downstream open horizontally disposed T-shaped end in open communication with the downstream chamber compartment 79 for communicating the collected vehicle wash water from the upstream chamber compartment 78 to the downstream chamber compartment 79 which, in turn, is in fluid communication with the system 10 via a suction line 90 such as a pipe, conduit, et cetera. In an alternate embodiment, the reclaim tank system 30 may be configured as an above ground reclaim tank system employing one or more above ground tanks. The upstream open downturned elbow end of the open ended conduit assembly 88 is downturned to keep floatables from migrating and to collect near the water level mid-point to capture the cleanest water.

Suction Line 90 and Flapper Foot Valve 92

Suction line 90 comprises a take up end operatively coupled to a swing type check valve, such as a flapper foot valve 92 disposed in the downstream chamber compartment 79 of the downstream tank 72 of the reclaim tank system 30 and an opposing end operatively coupled to the vehicle wash water reclaim system 10 for allowing fluid flow communication of reclaimed vehicle wash water to the system 10. When in use, the system 10 induces a suction into the suction line 90, the flapper foot valve 92 moves into the open position allowing water to be drawn up and through the suction or reclaim line 90. When the suction stops, the flapper foot valve 92 moves into the closed position. In one embodiment, the tank system 30 comprises a redundant suction line 91 that may be employed to replace suction line 90 as required. The depth of each suction lines 90 and 91 should be four times their respective diameter from the bottom to prevent vortexing.

Level Switch 94 and Discharge Line 98

A level switch 94 is also disposed in the downstream chamber compartment 79 of the downstream tank 72 and is typically attached to a sidewall of the downstream chamber compartment 79 for detecting if the level of reclaim water in the last downstream tank 72 is below a predetermined low reclaim water level position. The level switch 94 communicates this determination to the system 10 via an electrical coupling line 96 operatively coupled between system 10 and the level switch 94. In one embodiment, the level switch 94 is attached to one of the suction lines and its conduit is connected into a conduit box attached to the side of the reclaim tank.

Furthermore, the reclaim tank system 30 comprises a discharge line 98 for allowing any excess water to discharge from the tank system 30 in order to satisfy the water balance for the wash. In one embodiment the discharge line 98 is in open fluid communication with the downstream chamber compartment 79 of the last downstream tank 72 as illustrated in FIG. 1. The volume of discharge from the reclaim tank system 30 is dependent on the amount of fresh water used by the wash, less any water that is lost to evaporation and carryout. In general, the discharge is sent to a separate, customer supplied wastewater treatment device, or directly to sewer or a leach field.

In one embodiment, the discharge line 98 is above the recirculation only liquid level and slopes downward to a main sewer line. Additionally, the discharge line 98 may overflow with excess water while washing vehicles. A backflow preventer is installed between the last downstream tank 72 on the discharge line 98 and the main sewer line to prevent sewage backflow from entering the reclaim tank system 30.

Vehicle Wash Water Reclaim Unit 100 Overview

Referring to FIGS. 1 through 5, and in one embodiment, the vehicle wash water reclaim system 10 comprises the vehicle wash water reclaim unit 100. In turn, the vehicle wash water reclaim unit 100 comprises a reclaim water feed motor 260, a reclaim water feed pump 250, a self-cleaning vertical plane strainer device 110, a cyclone system 270 having continuous recirculation cyclone utilization combined with an on demand cyclone utilization, a treated water or cyclone outlet line 276, a cyclone underflow line 298 having an inline underflow motorized ball valve 290, a treated water vehicle wash line 277 having an inline check valve 310 precluding backflow and an inline pressure transducer 320, a fresh water bypass line 312 having an inline selectively opened fresh water bypass solenoid valve 318 and check valve 316, a treated water recirculation or feedback line 278 having an inline selectively closed recirculation solenoid valve 300, an Ozone generation and injection system 340, a control system 480 comprising a programmable logic controller (PLC) 500 having preprogrammed modes of operation (user logic or application program(s) 510), a variable frequency drive (VFD) 546, and a relay system 554.

As illustrated in FIG. 2, an embodiment of the vehicle wash water reclaim system 10 is powered from an external power source such as a utility power source 560 of a vehicle wash establishment in which the system 10 is employed. In an auto mode of programmed operation, the control system 480 comprising the programmable logic controller (PLC) 500 provides operating signals to the variable frequency drive (VFD) 546 for controllably driving the reclaim water feed pump motor 260 which, in turn, controllably drives the reclaim water feed pump 250 operatively coupled to the suction line 90 through self-cleaning vertical plane strainer device 110 to draw reclaim water through the suction line 90 and self-cleaning vertical plane strainer device 110 from the last downstream chamber compartment 79 of the vehicle wash water reclaim tank system 30. After drawing the reclaim water through the suction line 90 and self-cleaning vertical plane strainer device 110, the reclaim water feed pump 250 then pumps the strained reclaim water through the cyclone system 270 in one of two modes of operation: a continuous recirculation only mode of operation or a continuous recirculation with simultaneous on demand vehicle wash mode of operation.

Figure 20:
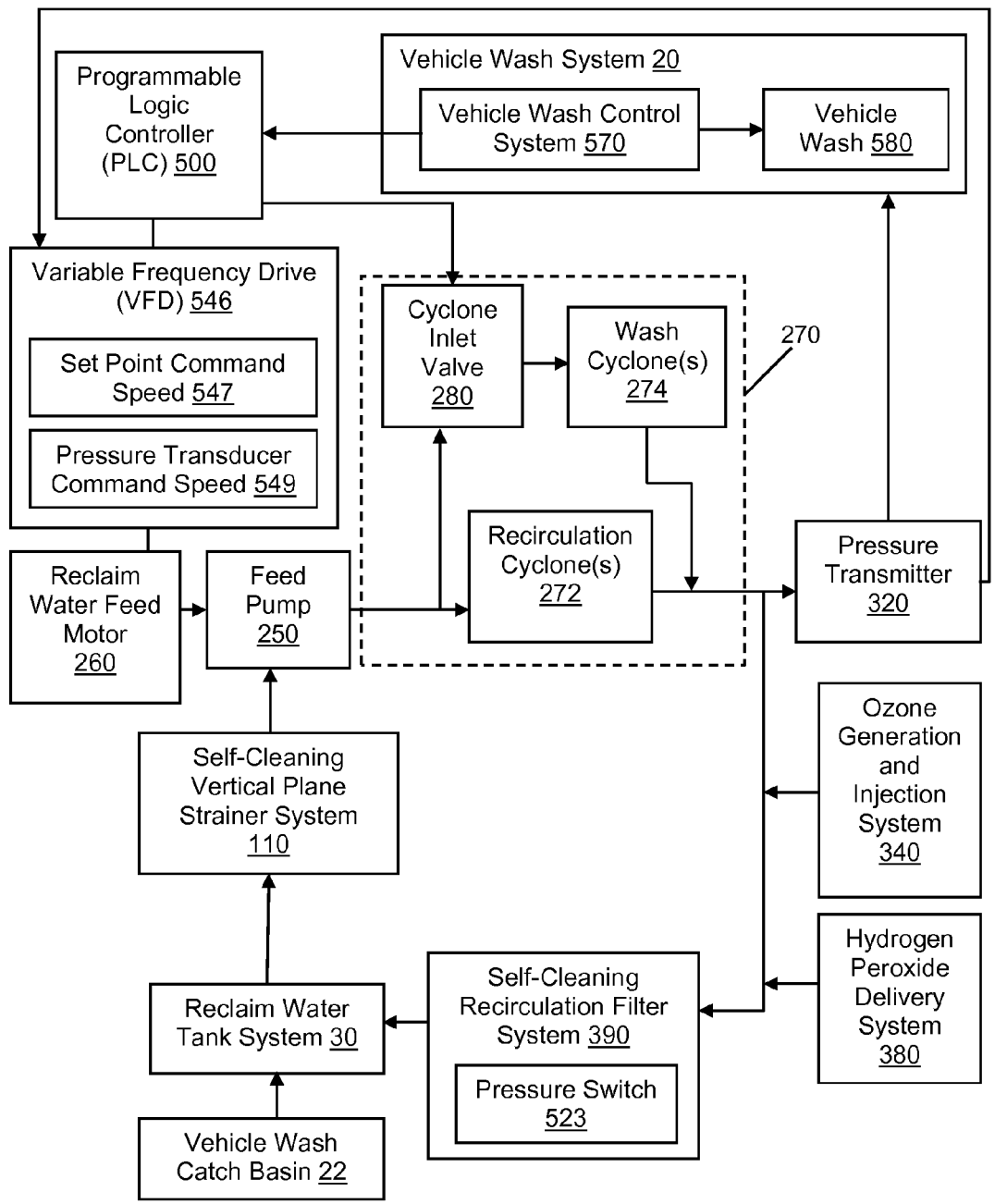
FIG. 20 is a block diagram view illustrating the feedback loops of an embodiment of the vehicle wash water reclaim system.

Referring to FIGS. 2 and 20, an embodiment of the cyclone system 270 comprises at least two parallel cyclone lines comprising a continuously open recirculation (first) cyclone line 262 and a selectively opened and closed vehicle wash (second) cyclone line 264. The continuously open recirculation cyclone line 262 comprises at least one recirculation or first cyclone 272 in continuous open fluid communication between the reclaim water feed pump 250 and the cyclone output or treated water line 276. The selectively opened and closed vehicle wash cyclone line 264 comprises at least one vehicle wash or second cyclone 274 and a recirculation motorized ball valve or cyclone inlet motorized ball valve 280 in a series configuration for selectively opening or closing the fluid communication between the reclaim water feed pump 250 and the cyclone output or treated water line 276 via the orchestration of the control system 480 opening and closing of the cyclone inlet motorized ball valve 280.

In the continuous recirculation only mode of operation the vehicle wash activation 572 of the vehicle wash equipment 580 is off, the control system 480 signals the VFD 546 to drive the motor 260 to drive the pump 250 at a preset speed, and the cyclone inlet motorized ball valve 280 is closed to pump reclaimed water through the first cyclone line 262 comprising the at least one recirculation or first inline cyclone 272 and back to the downstream chamber 39 of the tank 32 of the settling tank system 30 via recirculation line 278 so as not to disturb the settlement 37 in the upstream chamber 38 of the tank 32 the settling tank system 30. Accordingly, the continuous recirculation only mode provides a continuous recirculation or feedback loop of treated reclaimed water to the vehicle wash water reclaim tank system 30 at a first substantially constant motor speed.

In the simultaneous continuous recirculation and vehicle wash mode of operation or, in short, the wash activation mode, the pressure transducer 320 sends a signal to control the VFD to maintain a predefined or setpoint pressure, for example 40 psi, on the cyclone output or treated water line 276 and the cyclone inlet motorized ball valve 280 is opened to run water through all cyclones to the treated water outlet line 276. In turn, the treated water outlet line 276 bifurcates into the treated water vehicle wash line 277 and the treated water recirculation or feedback line 278 wherein the pump simultaneously pumps treated reclaim water through both during wash activation.

Accordingly, in the simultaneous continuous recirculation and vehicle wash mode of operation the system 10 provides a continuous recirculation or feedback loop of treated reclaim water to the vehicle wash water reclaim tank system 30 while simultaneously providing a continuous on demand supply of the treated reclaim water to the vehicle wash 580 at a variable motor speed controlled by a pressure feedback signal.

In both modes of operation, the reclaim water feed pump 250 pumps reclaimed water through one or more cyclones or cyclonic separators to separate the solids from the reclaim water, keeping the treated reclaim water to use for the vehicle wash and/or to recirculate back to the downstream chamber 39 of the tank 32 and to isolate and discharge the solids from the bottom of the cyclones to the catch basin 22 even while the underflow motorized ball valve assembly 290 is in the closed position by utilizing a pair of opposing, diametrically spaced apart central orifices 294, 295 drilled respectively through the closed faces of the ball 292 of the underflow motorized ball valve assembly 290 to allow a controlled flow of solids laden water out of the one or more cyclones or cyclonic separators an into the catch basin 22 via the underflow line 298 and the inline orifices 294, 295 of the ball valve 292.

As noted above, the vehicle wash water reclaim system 10 further comprises the self-cleaning vertical plane strainer device 110 disposed in the suction line 90 extending between the inlet port of the reclaim water feed pump 250 and the downstream chamber compartment 79 of the downstream tank 72 of the reclaim tank system 30 for filtering the reclaim water pumped up from the downstream chamber compartment 79 of the downstream tank 72 of the reclaim water settling tank system 30.

As also noted above, the vehicle wash water reclaim system 10 further comprises the ozone generation and injection system 340. While the system 10 is recirculating treated reclaim water through the recirculation line 278, ambient air is simultaneously drawn through an oxygen concentrator 342 into a corona ozone cell 346 where ozone is generated. In turn, the ozone cell 346 is operatively coupled to a suction port of a Mazzei eductor 370 having an inlet and an outlet disposed in the recirculation line 278 wherein the pressurized treated reclaim water enters the injector inlet, it is constricted toward an internal injection chamber and changes into a high-velocity treated reclaim water jet stream. The increase in velocity through the injection chamber results in a decrease in pressure, thereby enabling the ozone to be drawn through suction line 362 and the suction port of the Mazzei eductor 370 and entrained into the treated reclaim water stream. As the treated reclaim water jet stream is diffused toward the injector outlet, its velocity is reduced and it is reconverted into pressure energy, but at a pressure lower than injector inlet pressure. Then, the ozone-laden treated reclaim water continues to the downstream chamber 39 of the tank 32 of the settling tank system 30 to kill bacteria, remove color bodies from chemical dyes, and smell prior to suction line filtration.

As also noted above, the vehicle wash water reclaim system 10 further comprises the hydrogen peroxide delivery system 380 operatively coupled to the recirculation line 278 downstream from the Mazzei eductor 370 for adding hydrogen peroxide to ozone-laden treated reclaim water that continues to the tank system 30. The use of hydrogen peroxide and ozone together produces a more powerful oxidant than either does individually and the combination is defined as advanced oxidation. The combination will oxidize organic material (i.e. surfactants, oils, etc.) in the water more effectively, creating more easily digestible organic material.

As also noted above, the vehicle wash water reclaim system 10 further comprises the self-cleaning recirculation filter system 390 that comprises bio-media 434 and is that disposed in the recirculation line 278 downstream from the hydrogen peroxide addition to the ozone-laden treated reclaim water. Passing the hydrogen peroxide injected ozone-laden treated reclaim water through the bio-media 434 allows for bio-growth to occur and reduce the overall amount of organic material in the water in the tank system 30, making the water better for reuse and/or discharge.

In one embodiment, the vehicle wash water reclaim system 10 further comprises a hydrogen peroxide solution delivery system 380 for injecting hydrogen peroxide into the continuous flow of ozone-laden treated reclaim water to obtain a continuous flow of hydrogen peroxide injected ozone-laden treated reclaim water to the downstream chamber 39 of the tank 32 of the settling tank system 30.

In one embodiment, vehicle wash water reclaim system 10 further comprises self-cleaning recirculation filter device 390 comprising a bio-media means 434 for filtering the hydrogen peroxide injected ozone-laden treated reclaim water just prior to being delivered to downstream chamber 39 of tank 32 of settling tank system 30.

Vehicle Wash Water Reclaim Unit 100 Detailed

Self-Cleaning Vertical Plane Strainer Device 110

Figure 6:
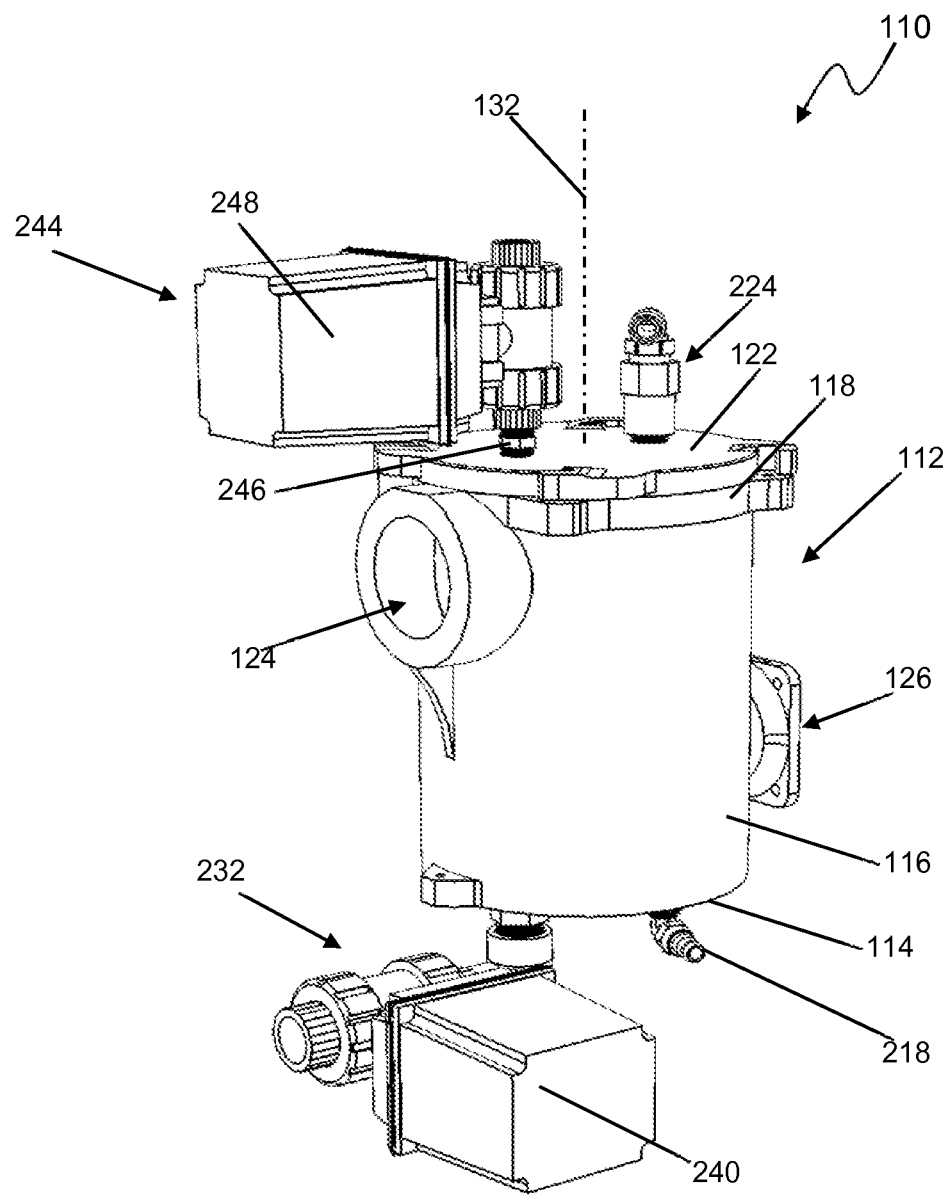
FIG. 6 is an inlet port perspective view of an embodiment of a self-cleaning vertical plane strainer device of the main vehicle wash water reclaim unit of the vehicle wash water reclaim system.
Figure 7:
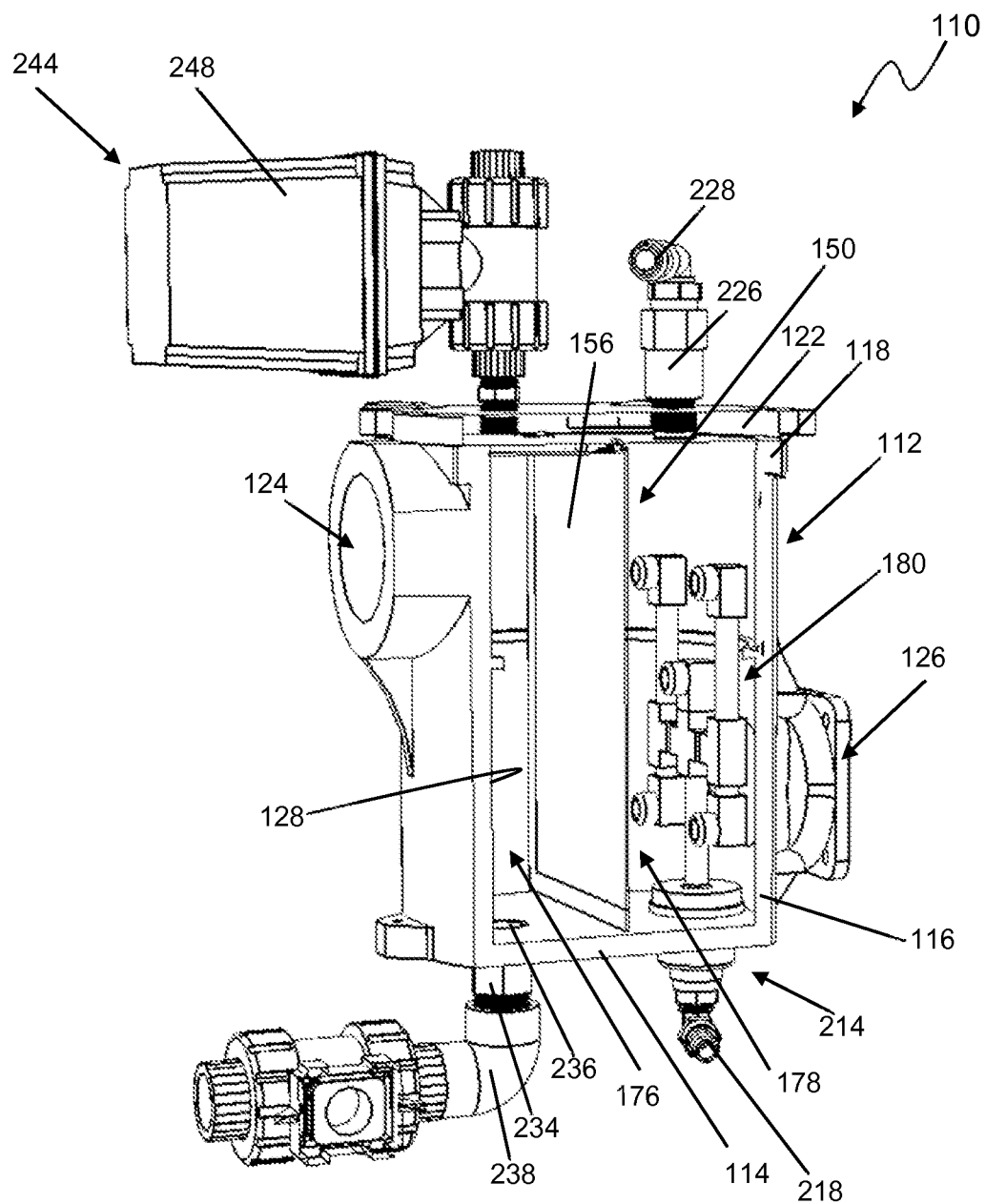
FIG. 7 is a partial sectional view of an embodiment of the self-cleaning vertical plane strainer device illustrating a perspective view of a removable vertical plane strainer assembly comprising a perforated vertical plane strainer device partitioning a housing of the self-cleaning vertical plane strainer device and a spray nozzle manifold assembly having a X-shaped array of spray nozzles configured to spray from an outlet port/channel side of the self-cleaning vertical plane strainer device thru the perforated vertical plane strainer device to an inlet port/channel side of the self-cleaning vertical plane strainer device for cleaning the perforation within the perforated vertical plane strainer device and dislodging debris formed on the inlet port/channel side of the self-cleaning vertical plane strainer device.

Now with reference to FIGS. 6 and 7, the vehicle wash water reclaim unit 100 comprises the self-cleaning vertical plane strainer device 110. The self-cleaning vertical plane strainer device 110 comprises a housing 112, a removable vertical plane strainer assembly 150, a spray assembly 180 comprising a right angle manifold spray assembly 182 (FIG. 12), a flush water inlet assembly 214 (FIG. 12), a vent to atmosphere assembly 224, a flush water outlet assembly 232, and a vent check valve assembly 244.

Self-Cleaning Vertical Plane Strainer Device Housing 112

Referring to FIG. 6, the self-cleaning vertical plane strainer device 110 comprises a housing 112. The housing 112 comprises a bottom 114 having an outer circumscribing periphery transitioning into an upwardly extending circumscribing sidewall 116 terminating to an upper circumscribing lip 118 defining an upper opening 120 (FIG. 8) of the housing 112. The upper opening 120 of the housing 112 is closed at by a lid 122 that mounts on the upper circumscribing lip 118 of the housing 112. The lid 122 is secured to the upper circumscribing lip 118 of the housing 112 with bolts.

The housing 112 further comprises an inlet channel or passage 124 and an outlet channel or passage 126 that are integrally formed within the sidewall 116 wherein the inlet channel 124 and the outlet channel 126 are on opposite sides of the housing 112 with the inlet channel 124 at a higher elevation or housing height (closer to upper circumscribing lip 118) than the outlet channel 126.

Figure 8:
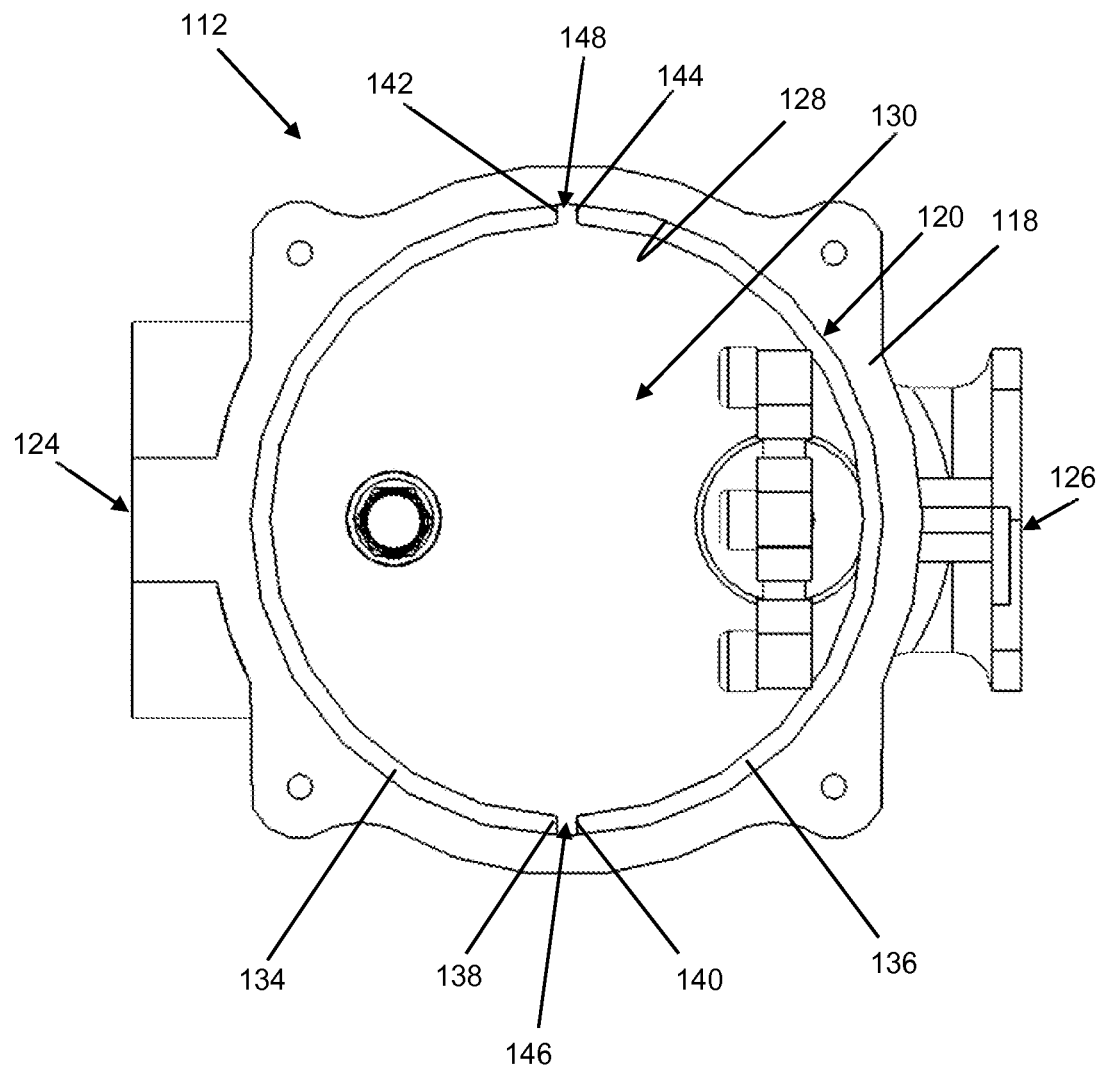
FIG. 8 is a top plan view of an embodiment of the self-cleaning vertical plane strainer device with a lid and the removable vertical plane strainer assembly removed therefrom.

Referring to FIGS. 6 through 8, the upwardly extending circumscribing sidewall 116 of the housing 112 comprises an interior circumscribing surface 128 defining a circumscribing main chamber 130 that extends along and circumscribes the central longitudinal axis 132 of the housing 112 and that is closed at one end by bottom 114 and at the opposing end by lid 122.

The housing 112 further comprises a pair of opposing, spaced apart, semicircular shaped ridges 134, 136 that radially extend inwardly toward the central longitudinal axis 132 from the interior surface 128 of the sidewall 116 of the housing 112 in a common horizontal plane substantially perpendicular to the central longitudinal axis 132 of the housing 112. In one embodiment, the semicircular shaped ridges 134, 136 radially extend inwardly toward the central longitudinal axis 132 from the interior surface 128 of the sidewall 116 at a housing height that is between the housing heights of inlet and outlet channels 124, 126 as illustrated in FIG. 7.

As illustrated in FIG. 8, the pair of opposing, spaced apart, semicircular shaped ridges 134, 136 comprise two pair of opposing, spaced apart, ends 138, 140 and 142, 144 that form a pair of opposing openings or receiving slots 146, 148 directly adjacent the interior surface 128 of the sidewall 116 of the housing 112 such that the pair of opposing, spaced apart, semicircular shaped ridges 134, 136 provides receiving means for the removable vertical plane strainer assembly 150 at a housing height location that is between the housing heights of the inlet and outlet channels 124, 126 as illustrated in FIG. 7.

In general, the receiving means for the removable vertical plane strainer assembly 150 may be functionally located between the closed bottom 114 and the lid 122. Additionally, more than one pair of opposing, spaced apart, semicircular shaped ridges 134, 136 may be provided and located in a longitudinally spaced apart relation between the closed bottom 114 and lid 122.

Removable Vertical Plane Strainer Assembly 150

Figure 9:
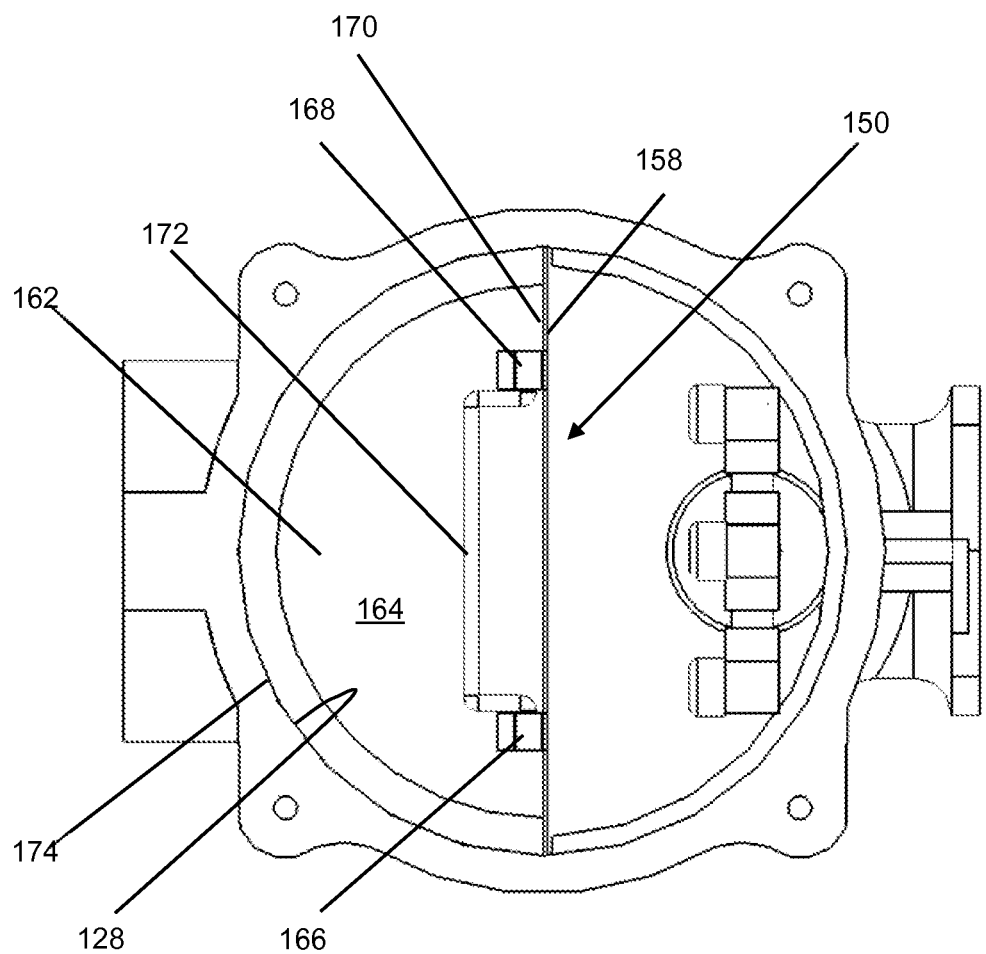
FIG. 9 is a top plan view of an embodiment of the self-cleaning vertical plane strainer device with the lid removed therefrom to illustrate a top plan view of an embodiment of the removable vertical plane strainer assembly and spray nozzle manifold assembly.
Figure 10:
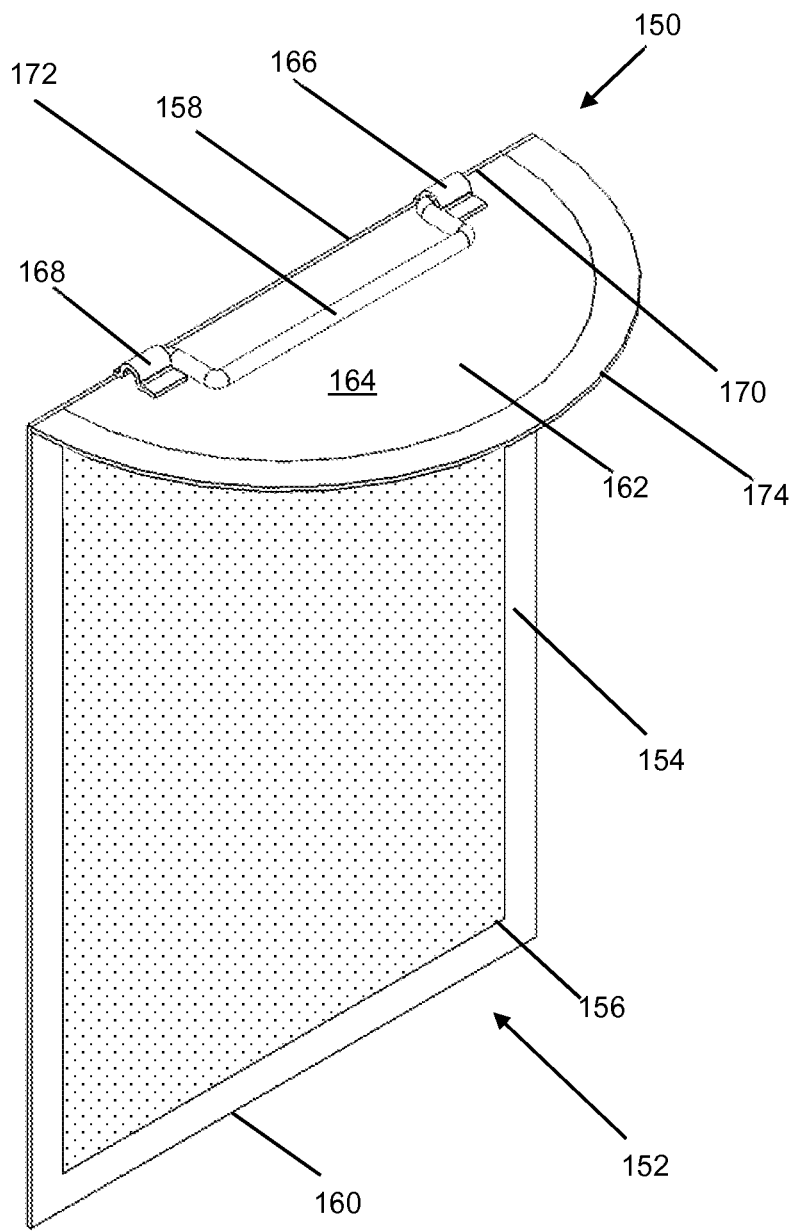
FIG. 10 is an inlet port/channel side perspective view of an embodiment of the removable vertical plane strainer assembly.
Figure 11:
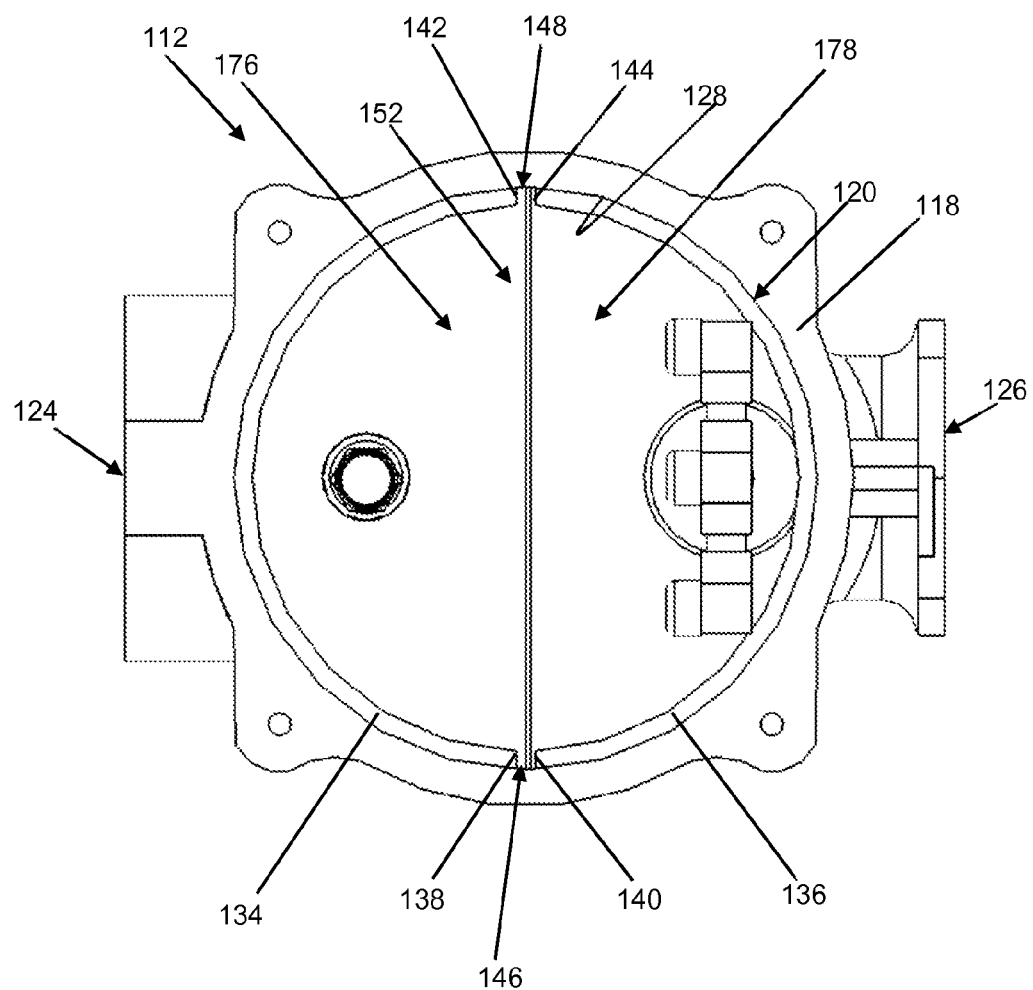
FIG. 11 is a top plan view of an embodiment of the self-cleaning vertical plane strainer device with the lid removed therefrom and with both the horizontal top member and handle removed from the removable vertical plane strainer assembly.

Referring to FIGS. 9 through 11, an embodiment of the removable vertical plane strainer assembly 150 comprises a perforated planar shaped vertical divider device or perforated vertical plane strainer device 152 having a superior (top) edge 158 and a semicircle shaped horizontal top member 162 having a horizontal base edge 170 coupled to the superior edge 158 by way of, but limited to, spot welding the two edges 158, 170 together. The assembly 150 further comprises a pair of spaced apart brackets 166, 168 disposed on an upper horizontal surface 164 of the member 162 along its horizontal edge 170 wherein the brackets comprise medial U-shaped portions loosely capturing ends of a handle 172 to allow the handle to pivot from a horizontal position in operation to a vertical position for use in removing the removable vertical plane strainer assembly 150 from the housing 112. In use, an arcuate edge 174 of the semicircle shaped horizontal member 162 is complemental in shape and seals against the interior surface 128 of the sidewall 116 of the housing 112.

In one embodiment, the perforated vertical plane strainer device 152 is comprised of a frame 154 circumscribing a screen or perforated vertical plane strainer 156 formed from, by not limited to, a metal. In one embodiment, the perforation are circularly with about one-eighth (⅛) of an inch diameter.

The perforated vertical plane strainer device 152 is configured to be removably received within the pair of opposing openings or receiving slots 146, 148 directly adjacent the interior surface 128 of the sidewall 116 of the housing 112 such that the pair of opposing, spaced apart, semicircular shaped ridges 134, 136 provides receiving means for the removable vertical plane strainer assembly 150 at a housing height location that is between the housing heights of inlet and outlet channels 124, 126.

With the removable vertical plane strainer assembly 150 received within the receiving means, the perforated vertical plane strainer device 152 of the removable vertical plane strainer assembly 150 partitions the main chamber 130 of the housing 112 into a semi-cylinder inlet volume zone 176 and a semi-cylinder outlet volume zone 178 as illustrated in FIGS. 7 and 11.

Spray Assembly 180

Figure 12:
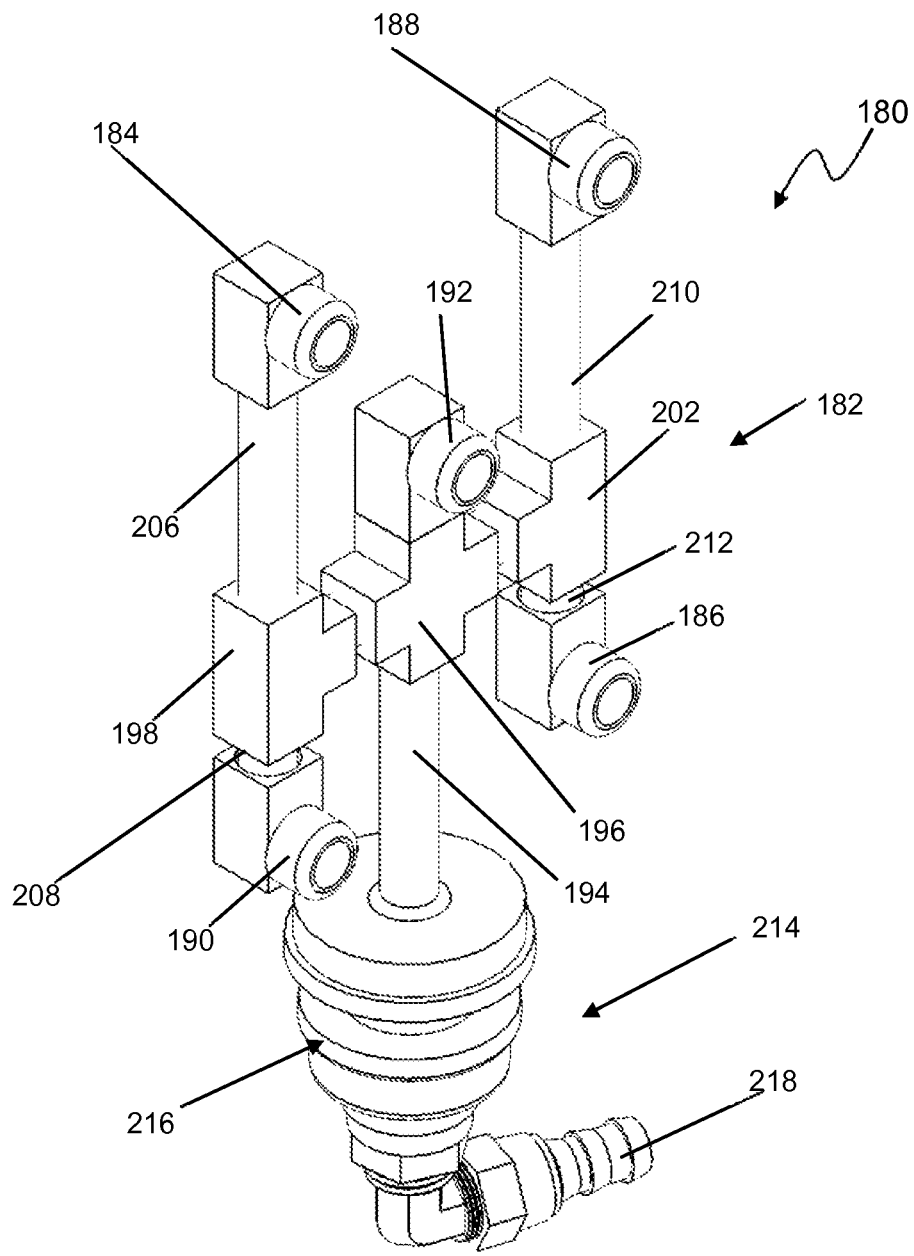
FIG. 12 is a front perspective view of an embodiment of the spray nozzle manifold assembly.

Referring now to FIG. 12, the spray assembly 180 comprises right angle manifold spray assembly 182 surmounting and in fluid communication with a flush water inlet assembly 214.

Right Angle Manifold Spray Assembly 182

In one embodiment, the right angle manifold spray assembly 182 comprises an array of spray nozzles or nozzles having an X-shaped configuration for discharging a spray covering a rectangularly shaped pattern onto and complemental to the shape of the perforated vertical plane strainer device 152 of the removable vertical plane strainer assembly 150. In one embodiment, the X-shaped array of spray nozzles comprises at least one spray nozzle 184 and 186 respectively at each end of one branch of the X-shaped array, at least one spray nozzle 188 and 190 respectively at each end of the other branch of the X-shaped array, and at least one spray nozzle 192 at the intersection of the two branches of the X-shaped configuration as illustrated in FIG. 12.

Figure 13:
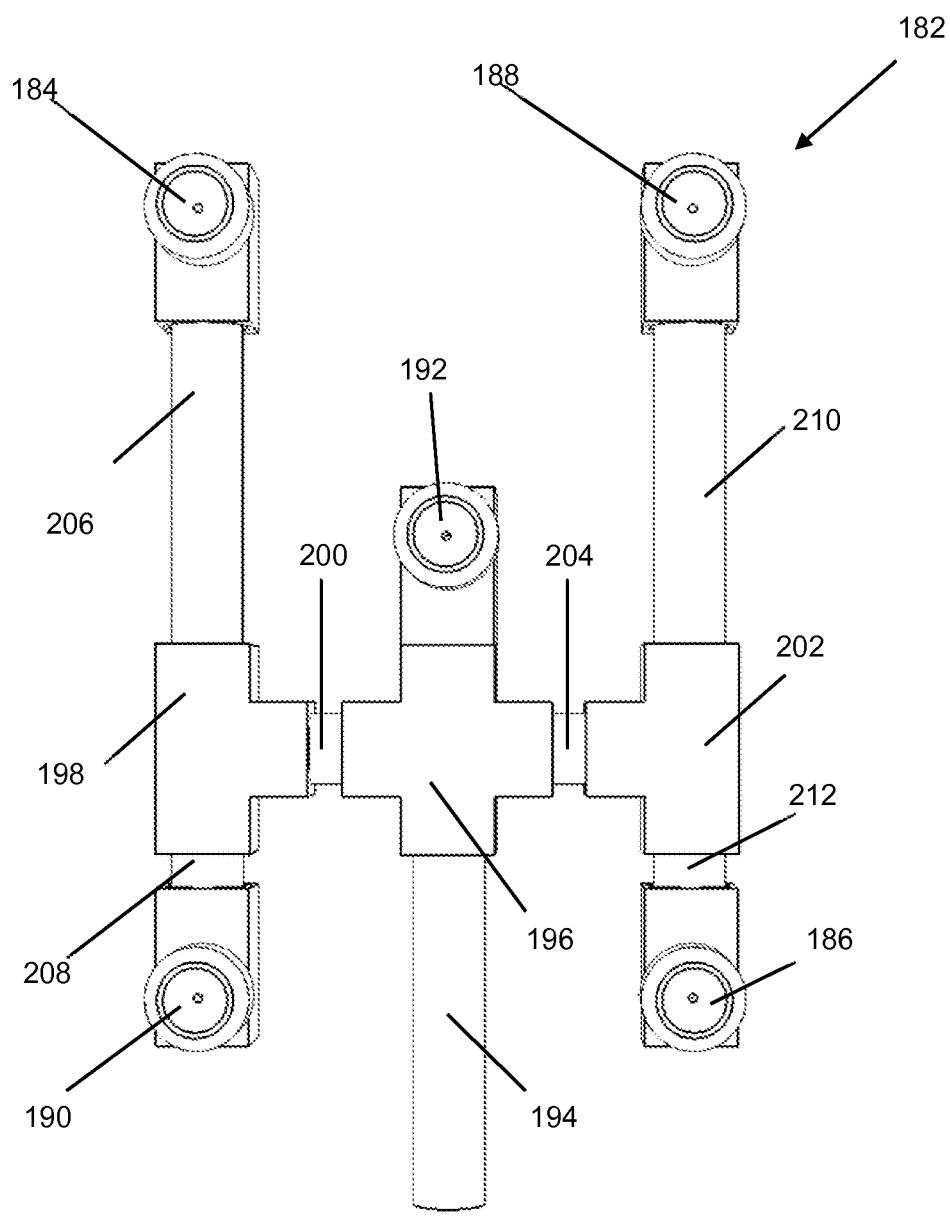
FIG. 13 is a front elevational view of an embodiment of the spray nozzle manifold assembly.

Referring to FIG. 13, the right angle manifold spray assembly 182 further comprises a riser pipe 194 connected to a first port of a four port cross shaped passageway manifold section 196. The cross shaped passageway manifold section 196 comprises a second port, opposing said first port, that is connected to the central spray nozzle 192, a third port connected to a base port of a first T-shaped passageway manifold section 198 via a first horizontal spacer pipe 200, and a fourth port, opposing said third port, connected to a base port of a second T-shaped passageway manifold section 202 via a second horizontal spacer pipe 204.

The first T-shaped passageway manifold section 198 further comprises a superior port operatively coupled to one end of a first side upper pipe 206 having an opposing open end coupled to superiorly positioned spray nozzle 184. Additionally, the first T-shaped passageway manifold section 198 comprises an inferior port operatively coupled to one open end of a first side lower pipe 208 having an opposing open end operatively coupled to inferiorly positioned spray nozzle 190.

The second T-shaped passageway manifold section 202 further comprises a superior port operatively coupled to one open end of a second side upper pipe 210 having an opposing open end operatively coupled to superiorly positioned spray nozzle 188. Additionally, the second T-shaped passageway manifold section 202 further comprises an inferior port operatively coupled to one open end of a second side lower pipe 212 having an opposing open end operatively coupled to inferiorly positioned spray nozzle 186.

All the ports in each of the manifold sections are in open fluid communication with one another.

Figure 14:
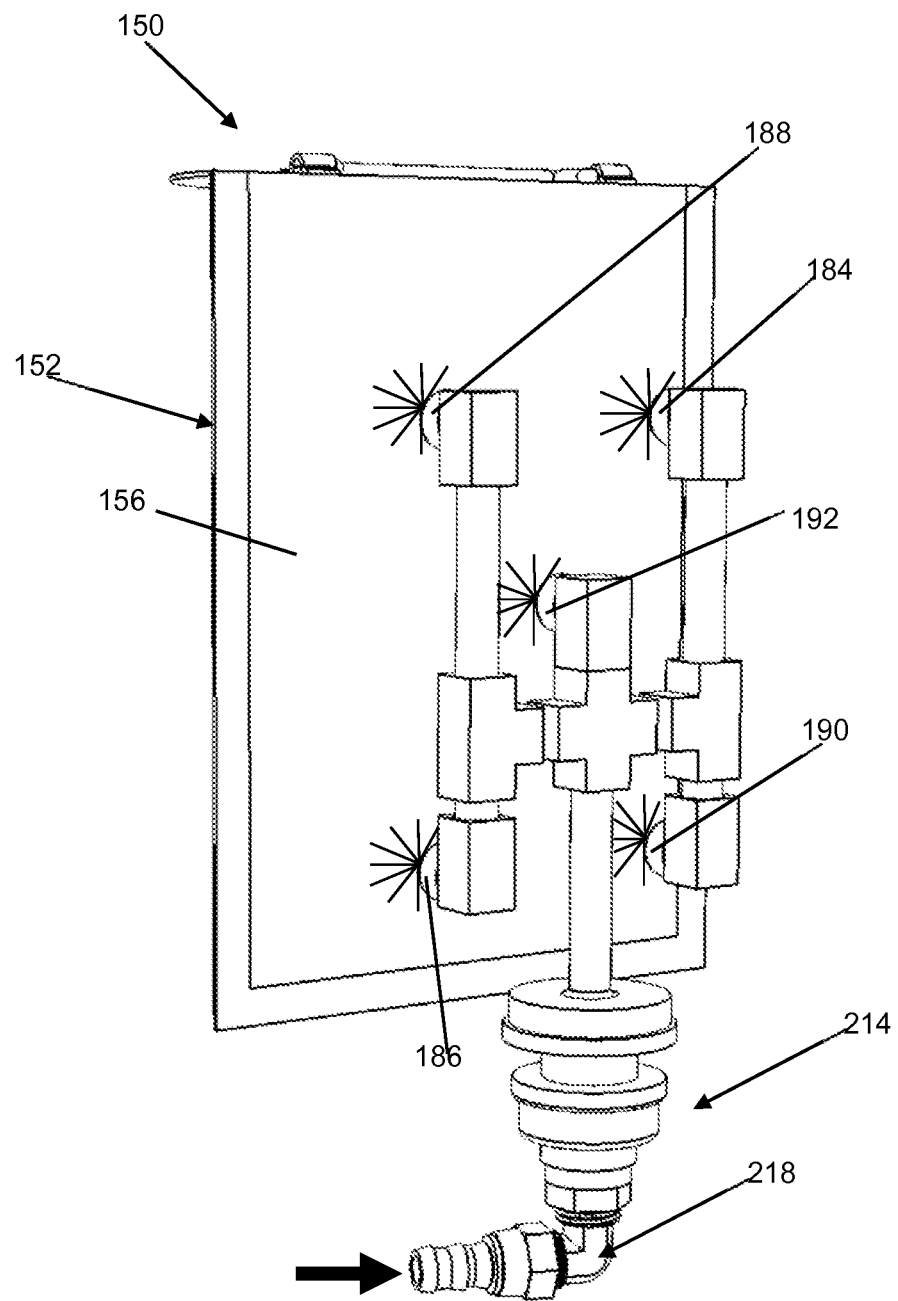
FIG. 14 is an outlet side perspective view of an embodiment of the removable vertical plane strainer assembly and a posterior perspective view of the spray nozzle manifold assembly spaced from and parallel with the outlet side of the removable vertical plane strainer assembly.

Referring to FIG. 14 and then back to FIG. 7, the pair of superiorly mounted spray nozzles 184, 188; the central spray nozzle 192, and the pair of inferiorly mounted spray nozzles 186, 190 form a X-shaped array of spray nozzles juxtaposed adjacent the perforated vertical plane strainer device 152 of the removable vertical plane strainer assembly 150 for providing a high power spray covering the rectangularly shaped area of the perforated vertical plane strainer device 152 of the removable vertical plane strainer assembly 150 for cleaning debris off the perforated vertical plane strainer device 152 on the semi-cylinder inlet volume zone 176 side of the self-cleaning vertical plane strainer device 110 wherein said debris is disposed of through orifice 236 in the closed bottom 114 of the housing 112 of the self-cleaning vertical plane strainer device 110 during an automatic self-cleaning cycle delineated below.

Flush Water Inlet Assembly 214

Referring to FIGS. 7 and 12, the spray assembly 180 comprises flush water inlet assembly 214. The flush water inlet assembly 214 comprises a housing adaptor 216 operatively coupled through a hole in the bottom 114 of the housing 112 at a location that is within the semi-cylinder outlet volume zone 178 of the longitudinally partitioned housing 112 wherein the housing adaptor 216 comprises a passageway for allowing passage of fluid therethrough. The housing adaptor 216 comprises an exterior end operatively coupled to a ninety-degree hose barb 218 which, in turn, is operatively coupled to a flush line 220 (FIG. 2) having an input connected to the fresh water line 312 and an output connected in series with a pump prime and flush water inlet solenoid valve 222. The housing adaptor 216 also comprises an interior end operatively coupled to the right angle manifold spray assembly 182 such that the opening and closing of the flush water inlet solenoid valve 222 controls water delivery from the fresh water line 312 through the flush line 220 and flush water inlet assembly 214 to right angle manifold spray assembly 182.

Vent to Atmosphere Assembly 224

Referring to FIGS. 6 and 7, an embodiment of the self-cleaning vertical plane strainer device 110 comprises vent to atmosphere assembly 224. The vent to atmosphere assembly 224 comprises a check valve 226 having an inlet end operatively coupled through a hole disposed in the lid 122 of the self-cleaning vertical plane strainer device 110 at a location adjacent the superior end of the outlet semi-cylinder volume zone 178 and a ninety-degree hose barb 228 having one end operatively coupled to the outlet end of the check valve 226 and another end operatively coupled to a catch basin vent line 230. Catch basin vent line 230 operatively couples to the underflow line 298 which empties into the catch basin 22.

As noted above, there are diametrically spaced apart central orifices 294, 295 drilled respectively through the closed faces of the ball 292 of the underflow motorized ball valve assembly 290 disposed in underflow line 298.

Flush Water Outlet Assembly 232

Still referring to FIGS. 6 and 7, an embodiment of the self-cleaning vertical plane strainer device 110 comprises flush water outlet assembly 232. The flush water outlet assembly 232 comprises a male hex nipple fitting 234 having a first threaded end operatively coupled through a threaded hole 236 in the bottom 114 of housing 112 at a location adjacent the inferior end of the inlet semi-cylinder volume zone 176 of the longitudinally and diametrically partitioned housing 112.

Additionally, the male hex nipple fitting 234 comprises a second threaded end operatively coupled to an elbow 238 which, in turn, is operatively coupled to a fluid input port of a flush water outlet motorized ball valve 240 having a fluid output connected to a flush water output line 242 that outputs to the catch basin 22. The flush water outlet motorized ball valve 240 comprises a position sensor 241 electrically coupled to the PLC device 500. Additionally, the opening and closing of the flush water outlet motorized ball valve 240 is orchestrated by the PLC device 500 of the control system 480.

Vent Motorized Ball Valve Assembly 244

Still referring to FIGS. 6 and 7, an embodiment of the self-cleaning vertical plane strainer device 110 comprises vent motorized ball valve assembly 244. The vent motorized ball valve assembly 244 comprises a male hex nipple fitting 246 having a first threaded end operatively coupled through a threaded hole in the lid 122 of device 110 at a location adjacent the superior end of the inlet semi-cylinder volume zone 176 of the longitudinally and diametrically partitioned housing 112. Additionally, the male hex nipple fitting 246 comprises a second threaded end operatively coupled to a vent to atmosphere motorized ball valve 248 that outputs to the atmosphere. The opening and closing of the vent to atmosphere motorized ball valve 248 is orchestrated by the PLC control system 480.

The vent to atmosphere motorized ball valve 248 comprises a position sensor 249 electrically coupled to the PLC device 500. Additionally, the opening and closing of the vent to atmosphere motorized ball valve 248 is orchestrated by the PLC device 500 of the control system 480.

As detailed below, the self-cleaning vertical plane strainer device 110 is used on the suction side of the self-priming reclaim water feed pump 250 drawing from tank system 30, the self-cleaning vertical plane strainer device 110 is subjected to vacuum pressure during normal operation and must be brought to atmospheric pressure for the operation of the self-cleaning vertical plane strainer process 520. Thereafter, the system is pressurized with water to remove air before the self-priming reclaim water feed pump 250 starts. The self-priming reclaim water feed pump 250 then pulls water thru the system, creating the vacuum.

Reclaim Water Feed Pump 250-Motor 260-Cyclone System 270

Referring to FIGS. 1 through 4, and as noted above, the vehicle wash water reclaim unit 100 comprises the self-priming reclaim water feed pump 250 operatively coupled to and driven by feed pump motor 260.

In turn, and also referring to FIG. 20, the self-priming reclaim water feed pump 250 is operatively coupled to a cyclone system 270 configured to have both a continuously open fluid communication path with at least one first cyclone 272 of the cyclone system 270 and a selectively open fluid communication path with at least one second cyclone 274 of the cyclone system 270. The cyclone system 270 further comprises the cyclone inlet motorized ball valve 280 utilized for selectively opening and closing the fluid communication path between the pump 250 and at least one second cyclone 274 of the cyclone system 270. The cyclone inlet motorized ball valve 280 comprises a position sensor 281 electrically coupled to the PLC device 500. Additionally, the opening and closing of the cyclone inlet motorized ball valve 280 is orchestrated by the PLC device 500 of the control system 480.

The reclaim water feed pump 250 is a suction pump that brings reclaim water up to be treated from the downstream chamber compartment 79 of the downstream tank 72 of the reclaim tank system 30 via the pump suction line 90 operatively coupled between a suction input channel 252 (FIG. 3) of the reclaim water feed pump 250 and the downstream chamber compartment 79 of the downstream tank 72 of the reclaim tank system 30.

As detailed above, the self-cleaning vertical plane strainer device 110 is disposed in series in the pump suction line 90 dividing the pump suction line 90 into an unstrained/unfiltered pump suction line side and a strained/filtered pump suction line side.

An output channel 254 of the reclaim water feed pump 250 is operatively coupled to pump output line 256 that comprises an inline pressure gauge 258 and that thereafter bifurcates into a continuously open recirculation cyclone line 262 comprising at least one first or recirculation cyclone 272 and a selectively opened and closed vehicle wash cyclone line 264 comprising at least the one second or vehicle wash cyclone 274. The cyclone inlet motorized ball valve 280, under the control of the PLC control system 480, opens and closes the fluid communication from the reclaim water feed pump 250 to at least the one second cyclone or vehicle wash cyclone 274. The strained/filtered and cycloned reclaim water or the treated reclaim water is output from the one or more cyclones 272, 274 in the cyclone system 270 and is feed to a cyclone output line 276 that bifurcates into vehicle wash line 277 and reclaim water recirculation line 278.

The feed pump motor 260 is electrically coupled to the Variable Frequency Drive (VFD) 546 of the control system 480. In turn, the VFD 546 is electrically coupled to the PLC 500 wherein the PLC 500 orchestrate or signals the mode of operation for the VFD 546 wherein the VFD 546 controls the speed of the pump 250 to either continuously recirculate reclaim water at a first speed or low pump speed through at least the one recirculation cyclone 272 of the cyclone system 270 feeding the reclaim water recirculation line 278 only while having the cyclone inlet motorized ball valve 280 closed, or to provide water to the vehicle wash 580 via at least the one recirculation cyclone feeding both the vehicle wash line 277 and the reclaim water recirculation line 278 in combination with at least the one second cyclone or vehicle wash cyclone 274 selectively accessible and running in parallel with at least the one recirculation cyclone 272 while having the cyclone inlet motorized ball valve 280 open to deliver treated water at a predefined pressure wherein pressure transducer 320 provides the signal directly to the VFD to control motor speed as a function of the measurement by pressure transducer 320 to maintain the predefined pressure of the treated water.

The cyclone inlet motorized ball valve 280 optimizes the flow to the cyclones, which optimizes their separation efficiency. During recirculation only mode, the cyclone inlet motorized ball valve 280 closes to divert the flow through at least the one recirculation cyclone 272. During wash activation mode, the cyclone inlet motorized ball valve 280 opens to allow all the cyclones in the cyclone system 270 to be operated and meet the treated water demand. This configuration allows the system 10 to utilize the Variable Frequency Drive (VFD) 546 on the single feed pump motor 260 to meet both recirculation and run demands of various flow rates with one pump 250.

Also, the VFD 546 allows operation of the single feed pump 250 via motor 260 on a continuous basis instead of being off or on based on demand. This reduces the wear on the feed pump motor 260 and increases the life of the pump seal and the pump motor.

The configuration delineated above also provides better separation efficiency by the cyclones 270 or 272, 274, more flexibility in meeting various flow demands with less pumps, and less pump maintenance.

In one embodiment, the cyclone system 270 ranges, dependent on flow rate needs, from comprising a single recirculation cyclone 272, to comprising a single recirculation cyclone 272 and a single selectively accessible cyclone 274, or to comprising a single recirculation cyclone 272 and a plurality of selectively accessible cyclones 274, or to comprising a plurality of recirculation cyclones 272 and a plurality of selectively accessible cyclones 274, or to comprising a plurality of recirculation cyclones 272 and a single of selectively accessible cyclone 274.

The cyclones 272, 274 of the system 10 are high efficiency cyclones that remove down to 5 micron settleable solids prior to filtered and cycloned reclaim water being recycled and sent to the vehicle wash 580 on demand. The cyclones 272, 274 create nearly 1000 G's of centrifugal force to obtain this fine particle separation. All or part of the treated (cleaned) water is sent back to the second chamber 39 of the first reclaim tank 32 as part of the continual recirculation mode.

High efficiency cyclones providing different flow rate needs are available from the manufacturer FLSmidth Krebs located at 5505 W. Gillete Road, Tucson, Ariz., USA.

Underflow Motorized Ball Valve with Central Orifices Through Closed Faces

Referring to FIGS. 1 through 5, the cyclone system 270 further comprises an underflow motorized ball valve assembly 290 used on the underflow (separated solids) line 298 from the cyclones system 270 to the vehicle wash catch basin 22.

Figure 5:
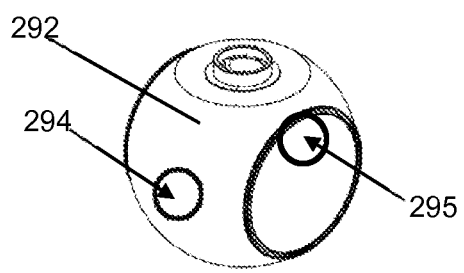
FIG. 5 is a perspective view of an embodiment of a ball valve of an underflow motorized ball valve assembly of the main vehicle wash water reclaim unit of the vehicle wash water reclaim system.

Referring to FIG. 5, the underflow motorized ball valve assembly 290 comprises a ball valve 292 having pair of opposing, diametrically spaced apart central orifices 294, 295 respectively disposed through the closed faces of ball valve 292 of the underflow motorized ball valve assembly 290 to allow a controlled flow of solids laden water out of the cyclones and through the ball valve 292 when the ball valve is in the closed position via the underflow line 298 which empties into the catch basin 22

When in operation, this configuration allows the solids-laden water from the cyclone system 270 to be re-introduced into the reclaim water at the front end of the underground tank system 30 where some solids settle and some continue with the water phase to be re-treated or go out with the effluent.

The underflow motorized ball valve assembly 290 comprises a position sensor 291 electrically coupled to the PLC device 500. Additionally, the opening and closing of the underflow motorized ball valve assembly 290 is orchestrated by the PLC device 500 of the control system 480. Periodically, and as orchestrated by the PLC device 500, the ball valve is opened to flush the cyclones 272, 274 and the underflow line 298.

Recirculation Water Solenoid Valve 300

Referring to FIGS. 1 and 2, the vehicle wash water reclaim unit 100 comprises the reclaim water recirculation solenoid valve 300 operatively coupled to the PLC device 500 and disposed in the reclaim water recirculation line 278 wherein the opening and closing of the recirculation water solenoid valve 300 is orchestrated by the PLC device 500 for allowing fluid communication from the cyclone output line 276 to an upstream portion of the tank system 30 and, in one embodiment, to the downstream chamber compartment 39 of an upstream tank 32 of the tank system 30 so as not to disturb the settlement 37 in the upstream chamber compartment 38 of an upstream tank 32 that is in direct fluid communication with the vehicle wash catch basin 22 via transfer line or conduit 24.

Accordingly, the recirculation water solenoid valve 300, under the orchestration of the PLC device 500, opens a feedback loop line that starts at a downstream portion of the tank system 30, runs through at least one recirculation cyclone 272 and the open recirculation water solenoid valve 300, and back to an upstream portion of the tank system 30. Additionally, the PLC device 500 orchestrates the closing of the feedback loop line by the closing of the recirculation water solenoid valve 300. The normally open recirculation water solenoid valve 300 closes during the self-priming mode to create pressure on the system so that the pump 250 more easily catches prime.

Treated Water Check Valve 310

Referring to FIG. 2, the vehicle wash water reclaim unit 100 comprises a treated reclaim water check valve 310 disposed in line or in series with the vehicle wash line 277. The treated reclaim water check valve 310 allows the treated reclaim water to flow away from the cyclone system 270 while precluding backflow to the cyclone system 270 including any flow of fresh water from a fresh water line 312 in fluid communication with the vehicle wash line 277. The fresh water line 312 joins with the vehicle wash line 277 at a location downstream from the treated water check valve 310 and upstream from the vehicle wash or vehicle wash equipment 580.

Fresh Water Inlet Solenoid Valve 318 and Check Valve 316

Still referring to FIG. 2, the vehicle wash water reclaim unit 100 comprises fresh water line 312 operatively coupled between a source 314 of fresh water and the vehicle wash line 277 at a location downstream from the treated water check valve 310 and upstream from the vehicle wash or vehicle wash equipment 580. The fresh water line 312 provides open fluid communication between the vehicle wash line 277 and the fresh water source 314 for accordingly providing vehicle wash water.

As illustrated in FIG. 2, the vehicle wash water reclaim unit 100 comprises a fresh water check valve 316 disposed in line or in series with the fresh water line 312 for allowing water flow in the direction of the vehicle wash line 277 while precluding backflow.

As also illustrated in FIG. 2, the vehicle wash water reclaim unit 100 comprises a fresh water solenoid valve 318 operatively coupled to the PLC device 500 and disposed in series in the fresh water line 312 wherein the opening and closing of the fresh water solenoid valve 318, therefore the fresh water line 312, is orchestrated by the PLC device 500 for opening or closing fluid communication from the fresh water source 314 to the vehicle wash line 277. Accordingly, the fresh water solenoid valve 318, under the orchestration of the PLC device 500, opens the fresh water line 312 that starts at the fresh water source 314, runs through the fresh water check valve 316 and the fresh water solenoid valve 318, and terminates at vehicle wash line 277.

Pressure Transmitter 320 and Pressure Gauge 322

Still referring to FIG. 2, the vehicle wash water reclaim unit 100 comprises a pressure transducer or transmitter 320 disposed, for example, in line or in series with the vehicle wash line 277 and operatively coupled to the PLC device 500 and the VFD 546 for providing signals correlative to the VFD 546 correlative to pressure readings of the water in vehicle wash line 277. The vehicle wash water reclaim unit 100 further comprises a pressure gauge 322 disposed in line or in series with the vehicle wash line 277 at a location downstream from the pressure transmitter 320 for providing visual pressure readings of the treated water pressure in the vehicle wash line 277.

Chain Rinse Solenoid Valve 324

As illustrated in FIG. 2, the vehicle wash water reclaim unit 100 comprises a chain rinse solenoid valve 324 operatively coupled to the PLC device 500 and disposed in series in a chain rinse line 326 that is connected in open communication to the vehicle wash line 277 wherein the opening and closing of the chain rinse solenoid valve 324 is orchestrated by the PLC device 500 for opening or closing fluid communication from the vehicle wash line 277 to a chain rinse system 328.

Trench Flush Solenoid Valve 330

As also illustrated in FIG. 2, the vehicle wash water reclaim unit 100 comprises a trench flush solenoid valve 330 operatively coupled to the PLC device 500 and disposed in series in a trench flush line 332 that connected in open communication to the vehicle wash line 277 wherein the opening and closing of the trench flush solenoid valve 330 is orchestrated by the PLC device 500 for opening or closing fluid communication from the vehicle wash line 277 to a trench flush system 334.

Ozone Generation System 340

Referring to FIG. 2, the vehicle wash water reclaim unit 100 comprises ozone generation system 340. The ozone generation system 340 comprises an oxygen concentrator 342 and an ozone generator 344 operatively coupled thereto via an oxygen line 341 having a flow meter 343 disposed therein.

The ozone generator 344 comprises a control board 345 electrically coupled to the corona discharge ozone cell 346. In turn, the ozone cell 346 is operatively coupled to the oxygen concentrator 342 via oxygen line 341 that has a pressure gauge 348 and a pressure switch 350 disposed therein. A transformer 352 powers the corona discharge ozone cell 346 which has a temperature switch 354 coupled thereto. The output line 361 of the corona discharge ozone cell 346 has coupled therein a needle valve 356 for adjustment followed by check valve 358 followed by vacuum switch 360. In turn, an ozone line 362 is coupled between the output line 361 of the corona discharge ozone cell 346 and the Mazzei eductor 370. A Mazzei eductor check valve 372 precludes backflow in ozone line 362. Additionally, the control board 345 is equipped with an ozone fault indicator 347 and operatively coupled to the PLC device 500.

In one embodiment, the ozone generation system 340 is controlled by using the PLC device 500. The PLC device 500 also lights indicator lamps to indicate the operational state of the system 10 and the ozone generator system 340.

In one embodiment, the system 10 is operated 24/7 constantly so that treated ozone-laden reclaim water is recirculated to the underground reclaim tank system 30 to keep the system tank water from going septic. When the wash requires treated reclaim water, the vehicle wash control system 570, operatively coupled to the PLC device 500, provides a run signal and the system 10 automatically increases the pump speed using the VFD 546 to provide treated reclaim water at a constant pressure of, for example, 40 psig to the wash and still recirculates water to the reclaim tanks 30.

The ozone generation system 340 will operate only if the system 10 is operating, and the pressure switch 350 and the vacuum switch 360 on the ozone generator are satisfied. The pressure switch 350 determines if enough oxygen flow is coming from the oxygen concentrator 342 and the vacuum switch 360 determines if enough treated reclaim water is flowing through the recirculation line 278 and Mazzei eductor 370 disposed therein to pull ozone into the treated reclaim water stream. If either of these switches fault, the ozone generation system 340 is turned off and alarms are displayed. The control board 345 provides the control for the ozone generator 344 and is operatively coupled the PLC device 500 for providing operating signals thereto.

The addition of ozone to the reclaim tank system 30 provides a powerful disinfectant that controls the bacteria levels at an acceptable amount for odor and plugging control. Furthermore, the addition of ozone to the reclaim tank system 30 oxidizes dyes in the reclaim water to remove the color created by wash chemicals (i.e. triple foams).

The size of the pump 250, the number of cyclones 272, 274 needed in each branch, and the size of ozone generation system 340 are each determined by the amount of treated water required by the number of washes being served.

Hydrogen Peroxide Solution Delivery System 380

Referring to FIG. 2, the vehicle wash water reclaim unit 100 comprises a hydrogen peroxide solution delivery system 380. The hydrogen peroxide solution delivery system 380 comprises a chemical pump 382 driven by chemical pump motor 384 controlled by the PLC device 500 of the control system 480 by receiving a run signal therefrom. The chemical pump 382 comprises an input channel in fluid communication with a hydrogen peroxide container 386 of hydrogen peroxide solution via chemical input line 387. In turn, chemical pump 382 comprises an output channel in fluid delivery communication with the recirculation line 278 via chemical output line 389 for adding hydrogen peroxide to the ozone-laden reclaim water to produce the hydrogen peroxide injected ozone-laden treated reclaim water containing an even stronger oxidant than either ozone or hydrogen peroxide by themselves.

Specifically, the hydrogen peroxide combines with the ozone to form the hydroxyl radical, which is a stronger oxidizer than either ozone or hydrogen peroxide. The stronger oxidizer provides better control of biological activity, the removal of color bodies from wash chemical dyes, and the destruction of organics from wash chemicals and oils/greases removed from washed vehicles. This stronger oxidizer is delivered to the underground reclaim tank system 30 and the combination of ozone and hydrogen peroxide is typically termed advanced oxidation.

Self-Cleaning Recirculation Filter System 390

Referring to FIG. 2, the vehicle wash water reclaim system 10 comprises a self-cleaning recirculation filter system 390 disposed in the recirculation line 278 at a location downstream from the introduction of the ozone and hydrogen peroxide solution to provide clearer water with lower total suspended solids and less operator attention (up to 60-90 days without servicing).

Now referring to FIGS. 15 through 18, the self-cleaning recirculation filter system 390 comprises a self-cleaning recirculation filter device 392 mounted on legs 393 for support thereof.

The self-cleaning recirculation filter device 392 comprises a housing 394, a filter media in the form of a wedge-wire cylindrical screen filter 420 disposed within the housing 394; bio-media balls 434 circumferentially interposed between the exterior of the cylindrical screen filter 420 and housing 394; a spray nozzle assembly 440 comprising a plurality of pairs of spray nozzles 448 disposed within the cylindrical screen filter 420; a booster pump 460 (FIG. 2) in open fluid communication with the fresh water source or supply 314 (FIG. 2) and/or the treated water source line 276 (FIG. 2) and in selectively open fluid communication with the spray nozzle assembly 440; a motor 462 operatively coupled to the booster pump 460 and to the PLC device 500 to drive the motor 462 and therefore the booster pump 460 under the application or software configuration of the PLC device 500; a flush water inlet motorized ball valve 464 operatively coupled between the booster pump 460 and the spray nozzle assembly 440; a flush water outlet motorized ball valve 468, a treated reclaim water recirculation filter inlet motorized ball valve 472, a filtered treated reclaim water outlet channel 414 and alternative outlet channel 412, and a manual flush water outlet valve 411.

Self-Cleaning Recirculation Housing 394

Figure 15:
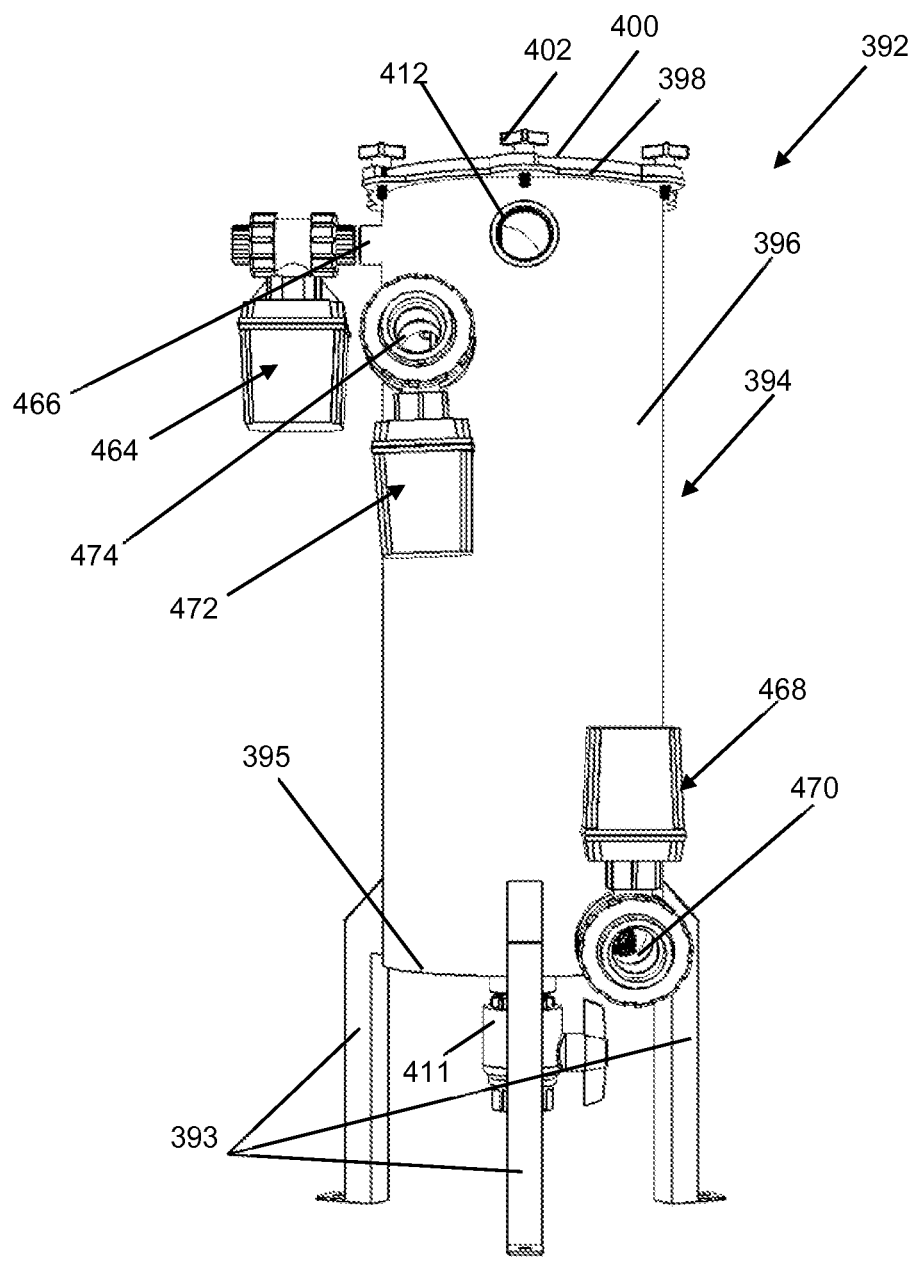
FIG. 15 is a perspective view of an embodiment of a self-cleaning recirculation filter device of the vehicle wash water reclaim system.

Referring to FIG. 15, an embodiment of the self-cleaning recirculation filter device 392 comprises a self-cleaning recirculation housing 394. The self-cleaning recirculation housing 394 comprises a bottom 395 having an outer circumscribing periphery transitioning into an upwardly extending circumscribing sidewall 396 terminating to an upper circumscribing lip 398 defining an upper opening of the housing 394. The upper opening of the housing 394 is closed at by a lid 400 that mounts on the upper circumscribing lip 398 of the housing 394. The lid 400 is secured to the upper circumscribing lip 398 of the housing 394 with bolts 402.

Figure 16:
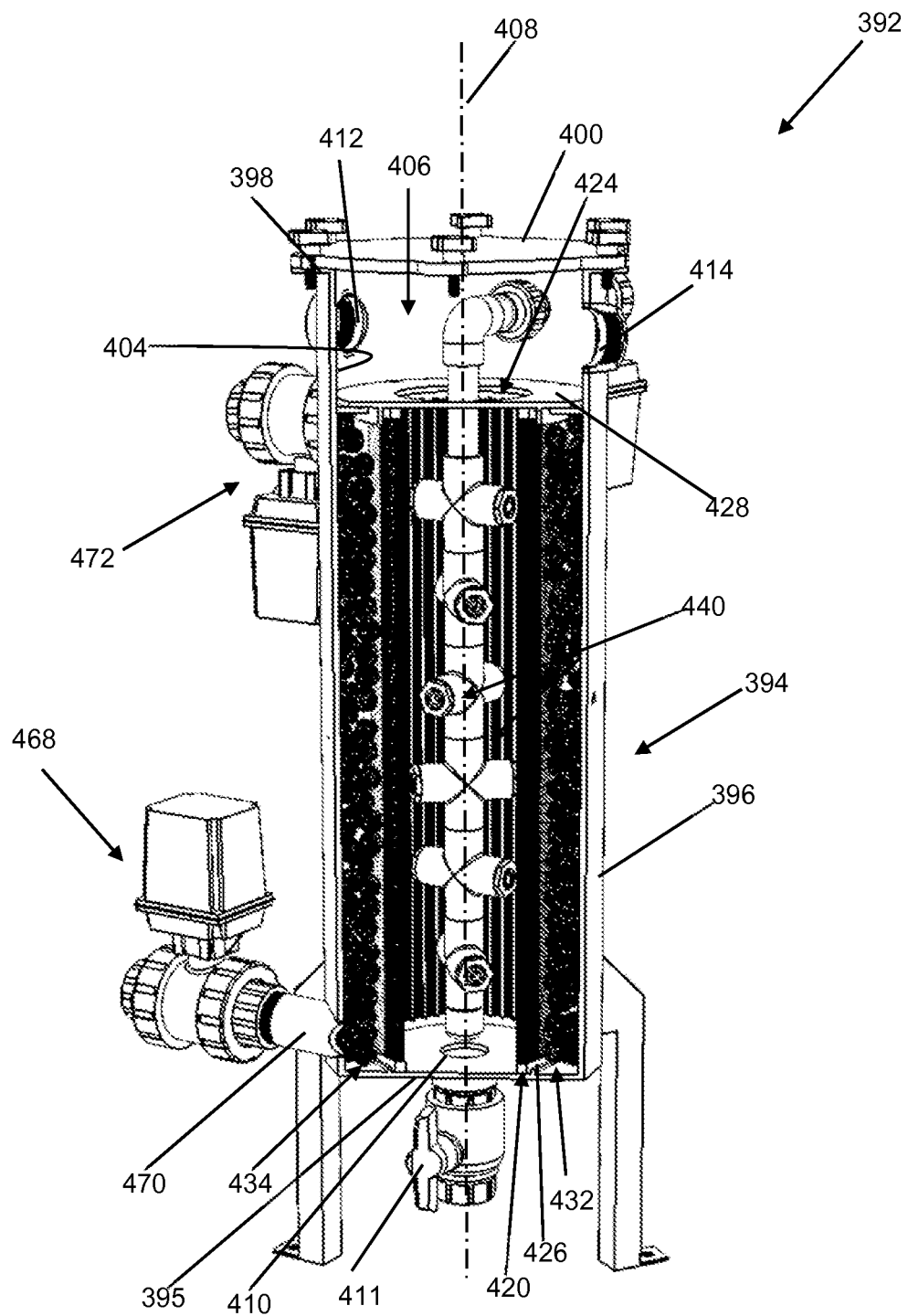
FIG. 16 is a partial sectional view of an embodiment of the self-cleaning recirculation filter device illustrating a perspective view of a housing enclosing a spray nozzle assembly, a cylindrical screen device circumscribing the spray nozzle assembly, and bio-media means disposed within a hollow cylindrical envelope or circumferential gap interposed an exterior surface of the cylindrical screen device and an interior surface of the housing.

Referring to FIG. 16, the upwardly extending circumscribing sidewall 396 of the housing 394 comprises an interior circumscribing surface 404 defining a circumscribing main chamber 406 that extends along and circumscribes a central longitudinal axis 408 of the housing 394 and that is closed at one end by bottom 395 and at the opposing end by lid 400. The bottom 395 of the housing 394 comprises a centrally disposed drainage opening 410 of the circumscribing main chamber 406. The centrally disposed drainage opening 410 is in selectively opened and closed communication with a drain via manual drain valve 411. Additionally, the housing 394 comprises an outlet channel or passage 412 and an alternate outlet channel or passage 414 that are integrally formed within the sidewall 396 of the housing 394.

Wedge-Wire Cylindrical Screen Filter 420 & Circumscribing Gap 432

Figure 17:
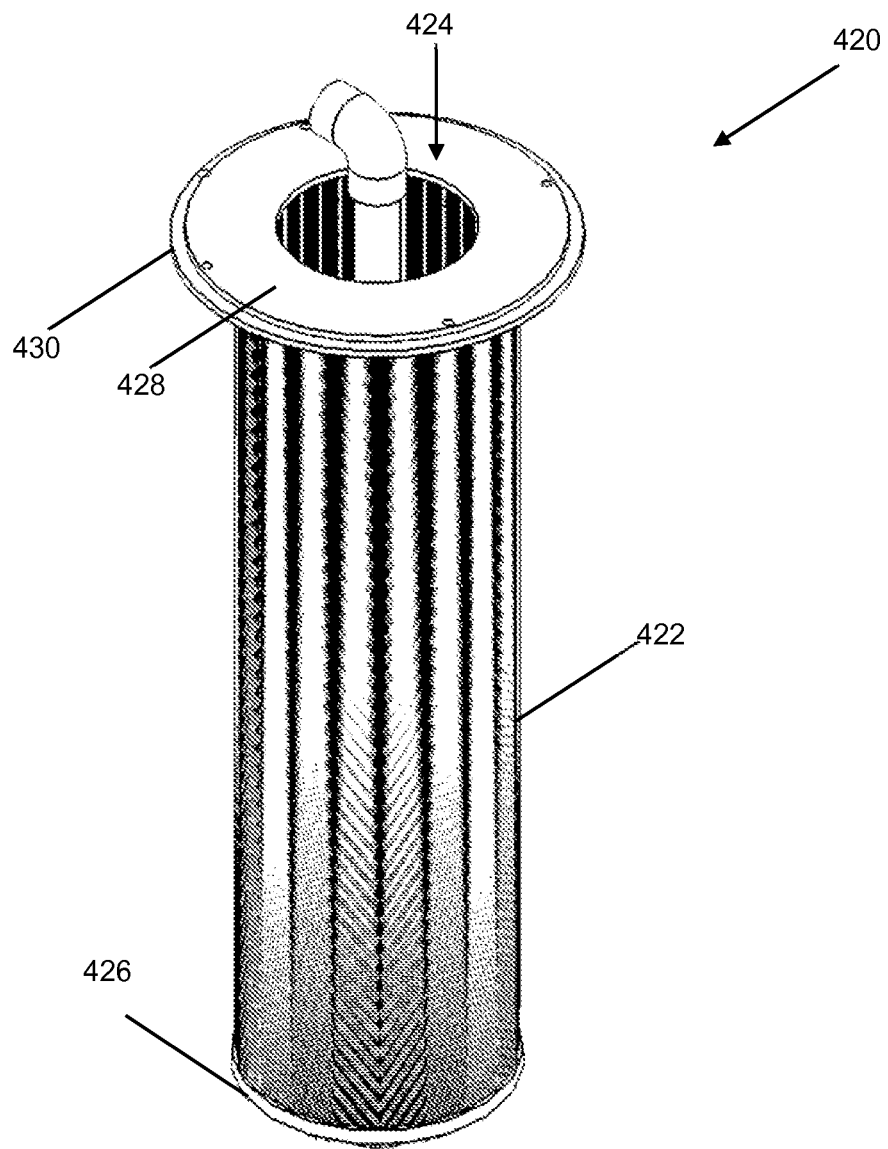
FIG. 17 is a perspective view of an embodiment of the cylindrical screen device circumscribing the spray nozzle assembly of the self-cleaning recirculation filter device.

Referring to FIGS. 16 and 17, the wedge-wire cylindrical screen filter 420 is configured to be received within said housing 394 and to filter from out-to-in with a filter rating of, but not limited to, 25-100 microns. The wedge-wire cylindrical screen filter 420 comprises a wedge-wire cylindrical screen body 422 having a hollow interior 424. Additionally, the wedge-wire cylindrical screen body 422 comprises an inferior end 426 and a superior circumscribing collar end 428. The inferior end 426 seals against the interior surface of the bottom 395 of the housing 394.

In turn, the superior circumscribing collar end 428 radially outwardly extends from the hollow interior 424 of cylindrical screen body 422 and comprises a outer circumscribing edge 430 that is configured to seal against the interior circumscribing surface 404 of the upwardly extending circumscribing sidewall 396 of the housing 394 while circumferentially spacing the exterior circumferential surface of the cylindrical screen body 422 of the cylindrical screen filter 420 away from the interior circumscribing surface 404 of the upwardly extending circumscribing sidewall 396 of the housing 394 for forming a circumscribing gap 432 (FIG. 16) between the exterior circumferential surface of the cylindrical screen body 422 of the cylindrical screen filter 420 and the interior circumferential surface 404 of circumscribing sidewall 396 of the housing 394 wherein the circumscribing gap 432 is closed at opposing ends respectively by superior circumscribing collar end 428 of the cylindrical screen filter 420 and the interior surface of the inferior or bottom end 395 of the housing 394 thereby forming a hollow cylindrically shaped envelope having a hollow interior in which the bio-media balls 434 are contained.

By having the wedge-wire cylindrical screen filter 420 disposed in the recirculation line with hydrogen peroxide injected ozone-laden treated reclaim water results in less build-up of bio-growth on the screen filter 420. Less biogrowth on the screen filter 420 makes the cleaning of the screen filter 420 easier and more effective.

Bio-Media Balls 434

As noted above, the bio-media balls 434 are contained in the hollow cylindrically shaped envelope of the self-cleaning recirculation filter system 390. Passing the ozone/hydrogen peroxide/treated reclaim water mixture through bio-media balls 434 allows for some preferential bio-growth to occur and reduce the overall amount of organic material and fine solids in the hydrogen peroxide injected ozone-laden treated reclaim water, making the treated reclaim water better for re-use and or discharge.

In particular, the combination of the hydrogen peroxide, ozone, and bio-media provides an overall cleaner (less BOD/COD and Oil & Grease) treated reclaim water so that it can be used in more applications within the wash without affecting wash quality.

The bio-media balls 434 are cleaned when the system 10 automatically controls the cleaning process of the self-cleaning recirculation filter system 390 as detailed below.

Bio-media balls are available from the manufacturer Coralife located at 5401 W. Oakwood Park Drive, Franklin, Wis., USA.

Spray Nozzle Assembly 440

Figure 18:
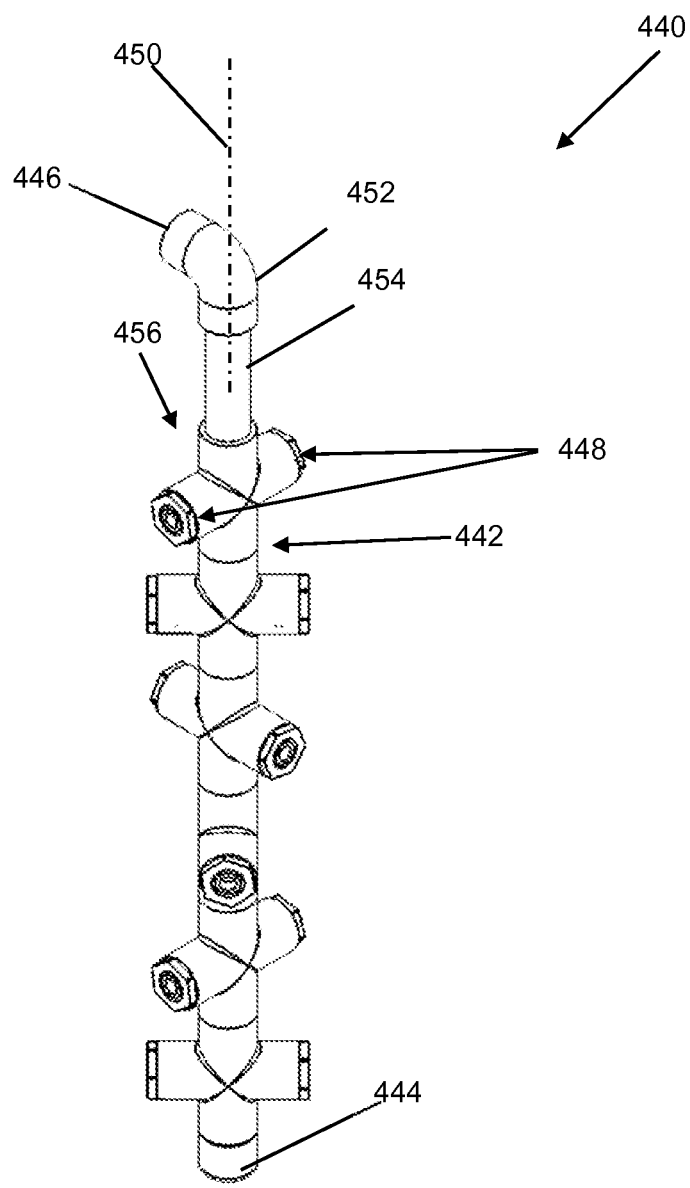
FIG. 18 is a perspective view of the spray nozzle assembly of the self-cleaning recirculation filter device.

Referring to FIG. 18, the self-cleaning recirculation filter device 392 (FIG. 16) further comprises spray nozzle assembly 440. Spray nozzle assembly 440 comprises a vertical blind bore conduit assembly 442 extending between a closed inferior end 444 and an open superior end 446. The vertical blind bore conduit assembly 442 supports, and is in fluid communication with, a plurality of pairs of opposing radially outwardly facing spray nozzles 448 that are vertically spaced apart and circumferentially distributed in a sequentially staggered pattern along a central axis 450 of the vertical blind bore conduit assembly 442. In one embodiment, and as illustrated in FIG. 18, the vertical blind bore conduit assembly 442 is formed of an elbow 452, an extension 454, and six cross connectors 456 coupled end to end.

Additionally, and as also illustrated in FIG. 18, the pair of spiral paths of spray nozzles 448 are sequentially staggered starting from the inferior pair of opposing spray nozzles and traversing the plurality of pairs of opposing spray nozzles along the pair of spiral paths to the superior pair of opposing spray nozzles wherein the pair of spiral paths of spray nozzles are shifted with respect to one another by one-hundred-eighty degrees. In other words, each successive pair of said plurality of pairs of opposing radially outwardly facing spray nozzles 448 is successively off-set 45 degrees so that one set of nozzles is off-set 45 degrees from its neighbor either above or below it.

The spiral paths of spray nozzles 448 are aligned on the inside of the cylindrical screen filter 420 to provide a pressurized water spray to clean the cylindrical screen filter 420 during the cleaning process of the self-cleaning recirculation filter system 390 detailed below.

Booster Pump 460 and Motor 462

Referring to FIGS. 2 and 16, the source water for the spray nozzle assembly 440 is either treated reclaim water or fresh water, and is pressurized with booster pump 460 by up to one-hundred psig to provide enough force to clean the cylindrical screen filter 420.

The booster pump motor 462 is electrically coupled to the PLC device 500 of the control system 480 for receiving a run signal from the PLC device 500 for actuating the booster pump motor 462 to deliver water to the interior cylindrical screen filter 420 and therethrough to the bio-media 434.

Flush Water Inlet Motorized Ball Valve 464

Referring to FIGS. 15 and 16, the fluid communication between the booster pump 460 (FIG. 2) and the spray nozzle assembly 440 is selectively controlled by the flush water inlet motorized ball valve 464 operatively coupled to a superior located channel 466 of the sidewall 396 of the housing 394. The flush water inlet motorized ball valve 464 comprises a position sensor 465 electrically coupled to the PLC device 500 for communicating whether the flush water inlet motorized ball valve 464 is in the open or closed position. Additionally, the opening and closing of the flush water inlet motorized ball valve 464 is orchestrated by the PLC device 500 of the control system 480.

Flush Water Outlet Motorized Ball Valve 468

Referring to FIGS. 15 and 16, the flush water outlet motorized ball valve 468 is operatively coupled to an inferior located channel 470 of the sidewall 396 of the housing 394. Fluid communication between the hollow cylindrically shaped, bio-media ball filled, envelope or gap 432 of the self-cleaning recirculation filter device 392 and a drain is selectively controlled by the flush water outlet motorized ball valve 468.

The flush water outlet motorized ball valve 468 comprises a position sensor 469 electrically coupled to the PLC device 500 for communicating whether the flush water outlet motorized ball valve 468 is in the open or closed position. Additionally, the opening and closing of the flush water outlet motorized ball valve 468 is orchestrated by the PLC device 500 of the control system 480.

Treated Reclaim Water Recirculation Filter Inlet Motorized Ball Valve 472

Referring to FIGS. 15 and 16, the recirculation filter inlet motorized ball valve 472 is operatively coupled to a recirculation filter inlet channel 474 located in the sidewall 396 of the housing 394 at a location just inferior to the superior circumscribing collar end 428 of the cylindrical screen filter 420.

Fluid communication between the hollow cylindrically shaped, bio-media ball filled, envelope or gap 432 of the self-cleaning recirculation filter device 392 and the recirculation line 278 is selectively controlled by the recirculation filter inlet motorized ball valve 472 at a location downstream from the introduction of the ozone and hydrogen peroxide solution and upstream from the reclaim tank system 30.

The opening and closing of the recirculation filter inlet motorized ball valve 472 is orchestrated by the PLC device 500 and the recirculation filter inlet motorized ball valve 472 includes a contact switch communicating to the PLC device 500 whether the recirculation filter inlet motorized ball valve 472 is in the opened or closed position. In the opened position, hydrogen peroxide injected ozone-laden treated reclaim water passes through the bio-media balls 434 and the filter 420 to the hollow interior 424 of the wedge-wire cylindrical screen body 422 and then out through filtered treated reclaim water outlet channel 414 or alternative outlet channel 412, which is closed when not in use.

The self-cleaning recirculation filter device 392 can be used with ozone only, or with the hydrogen peroxide/bio-media addition. If the bio-media 434 is used, it is placed on the outside of the wedge-wire screen and will also be cleaned when the filter performs its cleaning cycle detailed below, eliminating the need for a manual operator cleaning.

Control System 480

Figure 19:
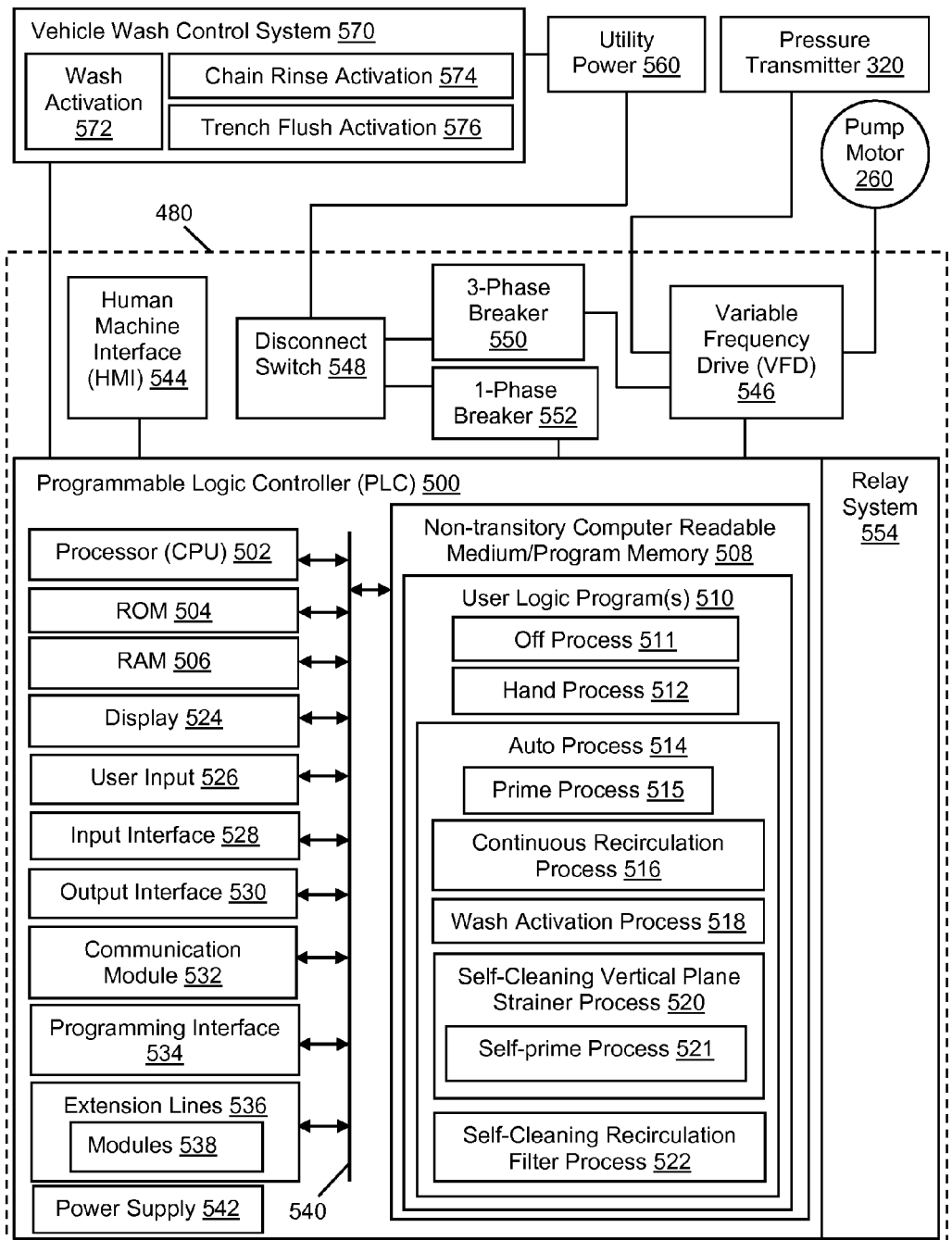
FIG. 19 is a block diagram view of an embodiment of a control system of the vehicle wash water reclaim system.

Referring to FIG. 19, an embodiment of the vehicle wash water reclaim unit 100 comprises control system 480. Control system 480 comprises programmable logic controller (PLC) 500, human machine interface (HMI) 544, variable frequency drive 546, power disconnect switch 548, 3-phase breaker 550, 1-phase breaker 552, and relay system 554

Control Box 482

Figure 3:
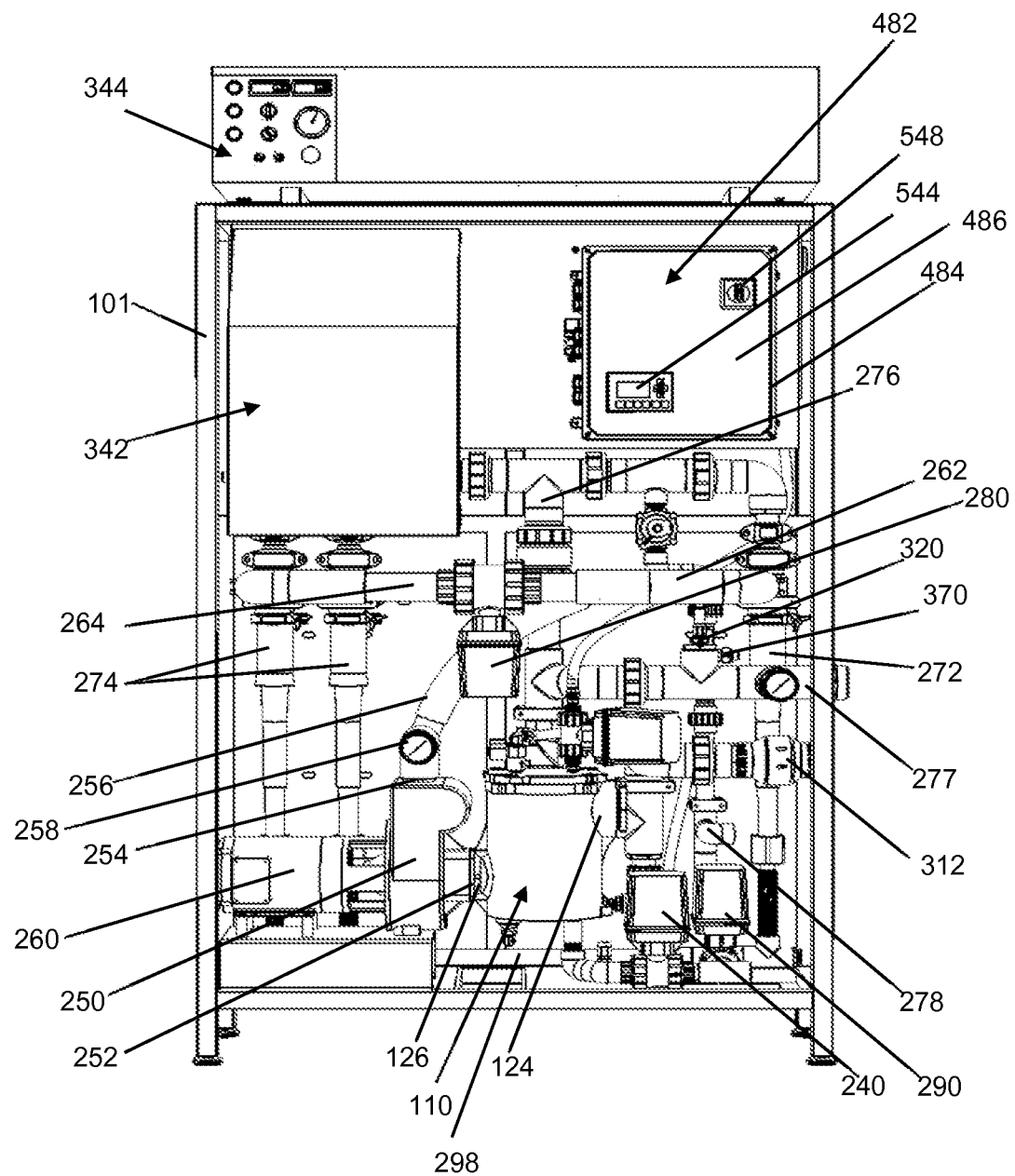
FIG. 3 is a front perspective view of an embodiment of a main vehicle wash water reclaim unit of the vehicle wash water reclaim system.
Figure 4:
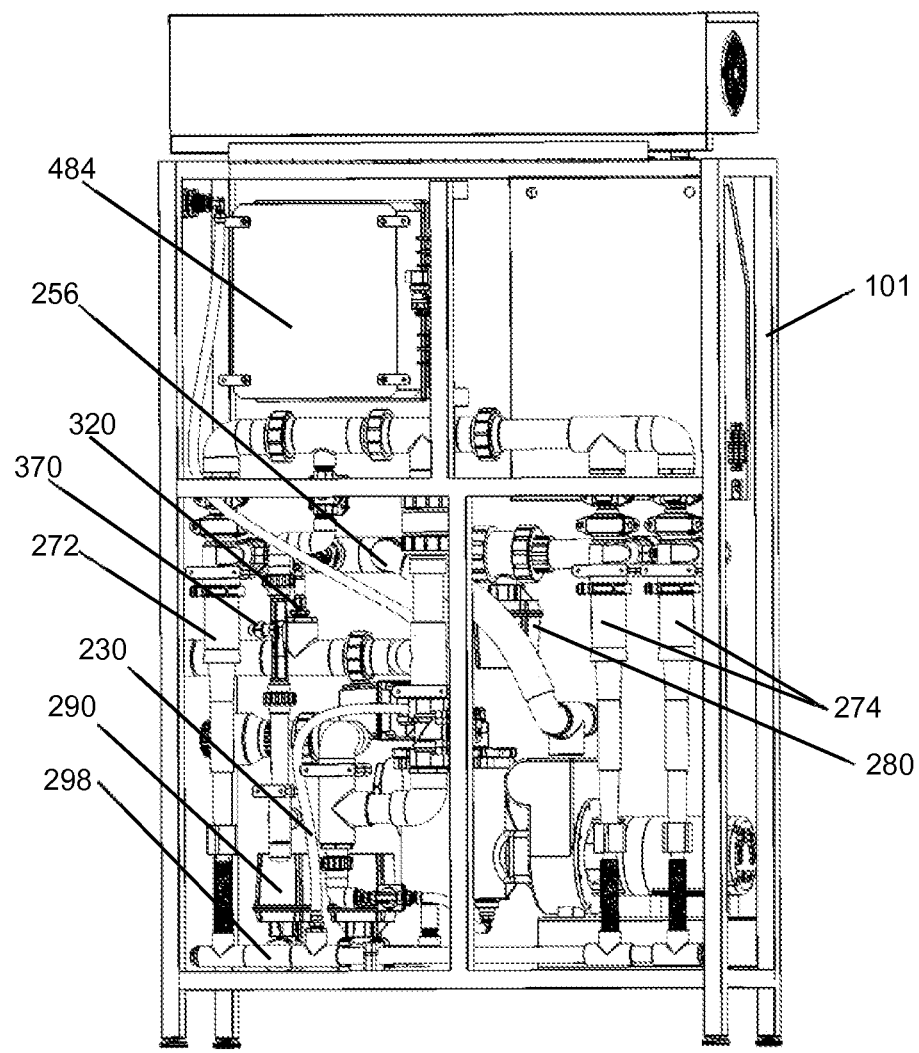
FIG. 4 is a rear perspective view of that which is illustrated in FIG. 3 with rear panels removed.

The components of the control system 480 are mainly housed in a control box 482 mounted on the frame 101 of the vehicle wash water reclaim unit 100 as illustrated in FIGS. 3 and 4. The control box 482 comprises an enclosure 484 having a cover 486 for mounting the electronic/electrical components of the control system 480 thereto and for covering the enclosure 484 for providing a weather proof interior surface for mounting electronic/electrical components of the control system 480 therein. As illustrated in FIG. 3, the HMI 544 and the disconnect switch 548 are exteriorly mounted on the cover 486 of the control box 482 for ease of user access and interaction.

Programmable Logic Controller (PLC) 500

Referring to FIG. 2, the control system 480 further comprises a programmable logic controller (PLC) 500. In one embodiment, the programmable logic controller (PLC) 500 is in the form of, but not limited to, a SIEMENS LOGIC MODULE, LOGO with extension modules for providing additional inputs and outputs.

More specifically and referring to FIG. 19, the programmable logic controller (PLC) 500 comprises a processor device or central processing unit (CPU) 502; a hardware read only memory device (ROM) 504; a hardware main memory device (RAM) 506; a non-transitory computer-readable medium or memory 508 providing application/program storage for user logic or application program(s) 510; a user display 524, a user input device 526, an input interface 528, an output interface 530, and a communication interface device or module 532, a programming interface 534, extension lines 536, extension modules 538, and a system bus 540 which comprises one or more conductor or communication paths that permit communication among the devices of the PLC 500. Programmable logic controller (PLC) 500 further comprises PLC power supply 542.

The CPU or processor device 502 reads converted input signals from the input interface 528, executes the user logic or application program(s) 510 stored in the non-transitory computer-readable medium or memory 508, and then writes the appropriate output signals to the output interface 530. In one embodiment, the application program 510 is written in a language called ladder logic.

In addition to executing the user logic or application program(s) 510, the CPU 502 performs a PLC scan process, said PLC scan process comprises the steps of: performing an input scan that detects the state of all input devices that are connected to the PLC 500; performing a program scan that executes the user created program logic or application program(s) 510, which is called a ladder logic program; and performing a output scan that energizes or de-energizes all output devices that are connected to the PLC 500. The PLC scan process further comprises the step of performing housekeeping by communicating with programming terminals (CPU transfers program and data between itself and the programming terminal), performing internal diagnostics, et cetera. These four steps are continually processed by CPU 502 in a loop.

The CPU 502 is controlled by operating system software. The operating system software is a group of supervisory programs that are loaded and stored permanently in a memory of the PLC by the PLC manufacturer.

Typically ROM 504 is used to store programs and data that should not be altered. For example, the operating system software of the PLC 500. ROM 504 is a nonvolatile memory device (memory that retains stored information even without power) that stores program information that allows the CPU 502 to interpret and act on the ladder logic program stored in the Non-transitory computer-readable medium or memory 508.

RAM 506 is a volatile memory device: memory that does not retain stored information without power.

Non-transitory computer-readable medium or memory 508 stores, inter alia, software or application instructions embodying or utilized by any one or more of the methodologies or functions described herein.

These software or application instructions include executable code that may also reside, completely or at least partially, within the RAM 506 and/or within the CPU or processor device 502 during execution thereof by PLC device 500 wherein the RAM 506 and the processor device 502 also constitute non-transitory computer-readable media or memory.

In one embodiment, the non-transitory computer-readable medium 508 is in the form of, but not limited to, a non-volatile flash memory that stores coded application instructions embodying or utilized by any one or more of the processes or methods described herein. Additionally, non-volatile flash memory may also be employed for ROM 504.

Examples of non-volatile flash memory include, but are not limited to, Solid-State Drive (SSD) devices, electrically programmable read only memory (EPROM), electrically erasable programmable read only memory (EEPROM), et cetera. In other words, any suitable media that is not fleeting or devoid of any semblance of permanence during transmission, and/or any suitable tangible media.

Display device 524 and user input 526 allow user interaction with the PLC 500.

Input interfaces 528 can accept discrete or analog signals of various voltage and current levels.

Output interfaces 530 operate much the same as the input interfaces 528 with the exception that the output interfaces 530 are either sinking (supplying a ground) or sourcing (providing a voltage) discrete voltages or sourcing analog voltage or current.

The input and output interfaces 528, 530 are designed in this way to minimize or eliminate the need for any intermediate circuitry between the PLC and the process to be controlled.

Communication interface device or module 532 provides means for communicating with one or more computer or communication networks for receiving and transmitting data to and from external devices. For example, texting status messages from the system 480 to monitoring personnel.

Programming interface 534 is utilized to couple the PLC 500 with a personal computer via a direct-connection cable or over a network and download a ladder logic program from the personal computer and store it in the non-transitory computer-readable medium or memory 508 of the PLC 500.

Extensions lines 536 are utilized to extend the limited number of input/output lines of the PLC 500 by coupling certain additional extension modules 538 to the PLC 500 through extension lines 536. Each extension module 538 can contain extensions of both input and output lines. Also, extension modules 538 can have inputs and outputs of a different nature from those on the PLC 500.

The PLC 500 is a control device. It take information from inputs and makes decisions to energize or de-energize outputs. The decisions are made based on the statuses of inputs and outputs and the ladder logic program 510 that is being executed.

In one embodiment, the inputs and outputs of the programmable logic controller (PLC) 500 are as listed below without being limited to the specific input and output numbering nomenclature below for numbering each specific output and input of the programmable logic controller (PLC) 500.

Inputs

Input one (I1) is terminated at VFD 546 and receives a positive signal indicating the VFD is powered on and not faulted.

Input two (I2) is terminated at the pressure transducer or transmitter 320 and receives a signal indicating the pump is working.

Input three (I3) is terminated at activation relays of the relay system 554 and receives a positive signal indicating one of the three act relays is energized.

Input four (I4) is terminated at cyclone inlet ball valve 280 (position switch 281) and receives a positive signal indicating the valve has opened absence indicates closed.

Input five (I5) is terminated at underflow flush ball valve 290 (position switch 291) and receives a positive signal indicating the valve has opened absence indicates closed.

Input six (I6) is terminated at the 02 pressure switch 350 and an absence of a signal indicates that the oxygen concentrator 342 is providing enough pressure to the ozone generator 344, and that the throttling valve 356 has been adjusted correctly.

Input seven (I7) is terminated at 03 vacuum switch 360 and receives an absence of signal indicating there is enough vacuum at mazzei 370 to run ozone.

Input eight (I8) is terminated at temperature switch 354 and receives an absence of signal indicating the temperature is within operating range.

Input nine (I9) is terminated at 03 fault indicator 347 and receives an absence of signal indicating the ozone is not faulted.

Input ten (I10) is terminated at float/level switch 94 and receives an absence of signal indicating the water level in the reclaim tanks 30 is adequate.

Input eleven (I11) is terminated at O2/O3 jumper and receives a positive signal indicating the system has an ozone system 340.

Input twelve (I12) is terminated at AOS jumper and receives positive signal indicating the system has an AOS system 380.

Input thirteen (I13) is terminated at trench flush jumper and receives a positive signal indicating the system has a trench flush solenoid valve 330.

Input fourteen (I14) is terminated at chain rinse jumper and receives a positive signal indicating the system has a chain rinse solenoid valve 324.

Input fifteen (I15) is terminated at self-cleaning vertical plane strainer flush water outlet motorized ball valve 240 (position switch 241) and receives a positive signal indicating the valve has opened absence indicates closed.

Input sixteen (I16) is terminated at self-cleaning vertical plane strainer vent motorized ball valve 248 (position switch 249) and receives a positive signal indicating the valve has opened absence indicates closed.

Input seventeen (I17) is terminated at self-cleaning recirculation filter flush water inlet motorized ball valve 464 (position switch 465) and receives a positive signal indicating the valve has opened absence indicates closed.

Input eighteen (I18) is terminated at self-cleaning recirculation filter flush water outlet motorized ball valve 468 (position switch 469) and receives a positive signal indicating the valve has opened absence indicates closed. Input eighteen (I19) is terminated at the position switch of the recirculation filter inlet motorized ball valve 472 and receives a positive signal indicating the recirculation filter inlet motorized ball valve 472 has opened absence indicates closed.

Outputs

Output one (Q1) is terminated at VFD 546 and outputs a positive signal giving the wash run command to the VFD so that the VFD operates the pump motor 260 at a pressure transducer command speed 549 for increased (pressure dependent) water output from the pump 250 in response to the wash activation signal 572 from the vehicle wash control system 570 placing the system 10 into wash activation mode that includes simultaneously auto recirculation.

Output two (Q2) is terminated at VFD 546 and outputs a positive signal giving the recirculate command to the VFD to run so that the VFD operates the pump motor 260 at a low motor speed or set point (speed reference) command speed 547. Accordingly, and in one embodiment, the PLC 500 is configured to orchestrate the change in the mode of operation of the VFD 546 and the programmable VFD 546 is programmed and configured to provide, on demand, the predefined or user defined set point (speed reference) command speed 547 and the pressure transducer variable command speed 549.

Output three (Q3) is terminated at bypass relay to freshwater by-pass solenoid valve 318 and outputs an absence of signal giving the bypass the ability to run with a wash activation.

Output four (Q4) is terminated at yellow terminal strip and outputs positive signal giving the oxygen concentrator 342 and ozone generator 344 power, but Q5 allows ozone production.

Output five (Q5) is terminated at ozone run signal and outputs positive signal giving the ozone generator 344 the command to run.

Output six (Q6) is terminated at orange terminal strip and outputs positive signal giving the prime solenoids power which, in one embodiment, are the flush water inlet solenoid valve 22 and the recirculation line solenoid valve 300.

Output seven (Q7) is terminated at recirculation valve relay to recirculation solenoid 300 and outputs positive signal giving the recirculation valve close command, absence to open. In one embodiment, this output is the same as output six.

Output eight (Q8) is terminated at underflow flush valve relay and outputs positive signal giving the underflow flush motorized ball valve 290 open command, absence to close.

Output nine (Q9) is terminated at AOS pump motor 384 and outputs positive signal giving the AOS pump motor 384 a run command.

Output ten (Q10) is terminated at trench flush solenoid 330 and outputs positive signal giving the trench flush solenoid valve 330 an open command.

Output eleven (Q11) is terminated at chain rinse solenoid 324 and outputs A positive signal giving the chain rinse solenoid valve 324 an open command.

Output thirteen (Q12) is terminated at vent relay for self-cleaning vertical plane strainer motorized ball valve 248 and outputs positive signal giving the ball valve open command, absence to close.

Output fourteen (Q13) is terminated at self-cleaning vertical plane strainer flush water inlet solenoid valve 222 and outputs a positive signal giving the reclaim inlet flush solenoid an open command.

Output fifteen (Q14) is terminated at self-cleaning vertical plane strainer flush relay for self-cleaning vertical plane strainer flush water outlet motorized ball valve 240 and outputs a positive signal giving the ball valve open command, absence to close.

Output sixteen (Q15) is terminated at self-cleaning recirculation filter flush outlet relay for self-cleaning recirculation filter flush water outlet motorized ball valve 468 and outputs positive signal giving the ball valve open command, absence to close.

Output seventeen (Q16) is terminated at self-cleaning recirculation filter flush inlet relay for self-cleaning recirculation filter flush water inlet motorized ball valve 464 and outputs positive signal giving the ball valve open command, absence to close.

Output eighteen (Q17) is terminated at self-cleaning recirculation filter flush pump motor 462 and outputs positive signal giving the self-cleaning recirculation filter flush pump 460 a run command.

Output eighteen (Q18) is terminated at recirculation filter inlet motorized ball valve 472 and outputs positive signal giving the ball valve open command, absence to close.

Human Machine Interface (HMI) 544

The HMI 544 allows a user to place the control system 480 in one of three different modes: an Off mode, a Hand mode, or an Auto mode by sending respective mode signals to the PLC 500. The HMI 544 provides submenus and status indicators that can be read depending on the mode the control system

480 is in. As noted above, the HMI 544 is mounted on the control box cover 486 and is operatively coupled to the PLC 500 to allow the operator of the system 10 to view the status of the system 10 without opening the control box 482.

Variable Frequency Drive 546

In one embodiment, the variable frequency drive (VFD) 546 is a programmable VFD 546 located within the control box 482. The VFD 546 controls the reclaim pump motor 260 speed of reclaim pump 250 by varying the Hz supplied to the motor. The control system 480 utilizes the VFD 546 to operate the pump motor 260 at a low motor speed or set point command speed 547 for low water output from the pump 250 when in auto recirculation only mode and at a variable, typically increased speed or pressure transducer command speed 549 for increased (pressure dependent) water output from the pump in response to a wash activation signal 572 from the vehicle wash control system 570 placing the system 10 into the auto recirculation and wash combination mode.

In the auto recirculation and wash combination mode, the VFD 546 utilizes the pressure transducer 320 which sends a signal to the VFD to ramp up or slow down the reclaim pump 250 based on the pressure of line 277. The default display on the VFD 546 shows the current operating Hz of the pump 250.

Typically, variable frequency drives accept analog signals from a one kilo ohm to ten kilo ohm variable resistor, a zero volt DC to ten volt DC voltage source, or a 4 milliamp to 20 milliamp current source as frequency/speed control commands or signals. In one embodiment, the pressure transducer 320 is a pressure to current sensor. Sensors that produce a proportional output current instead of voltage have fewer problems with induced noise from surrounding magnetic fields and with voltage drops due to long wire runs.

Although the variable frequency drive was described as a single unit, multiple variable frequency drives are utilized based on design requirements. Variable frequency drives (VFD) are available from the manufacturer Rockwell Automation located at 1201 South Second Street, Milwaukee, Wis., USA.

Power Disconnect Switch 548

As noted above, the power disconnect switch 548 is mounted on the control box cover 486 and turns power on from a utility power source 560 to the VFD 546 through a 3-phase breaker 550 and to a PLC power supply 542 of the PLC 500 through 1-phase breaker 552. Turning the disconnect switch 548 to the on position initiates the Human Machine Interface (HMI) 544.

Relay System 554

Relay system 554 is housed in the control box 482 and comprises a multiplicity of relays required for the PLC outputs described hereinabove.

Particularly, the relay system 554 provides a relay that powers on to open the normally closed valve of the cyclone inlet motorized ball valve 280, a relay that powers on to open normally closed underflow flush motorized ball valve 290, a relay that powers on to open a normally closed freshwater bypass solenoid valve 318 such that in the case of power or system 10 failure the bypass is closed without power, a set of three activation relays controlled by the vehicle wash control system 570, a relay that powers on to open normally closed self-cleaning vertical plane strainer flush water inlet solenoid valve 222, a relay that powers on to open normally closed self-cleaning vertical plane strainer flush water outlet motorized ball valve 240, a relay that powers on to open normally closed self-cleaning vertical plane strainer vent to atmosphere motorized ball valve 248, a relay that powers on to close normally opened treated reclaim water recirculation solenoid valve 300, a relay that powers on to open normally closed chain rinse solenoid valve 324, a relay that powers on to open normally closed self-cleaning trench flush solenoid valve 330, a relay that powers on to open normally closed recirculation filter motorized flush water inlet ball valve 464, a relay that powers on to open normally closed self-cleaning recirculation filter motorized flush water outlet valve 468, and a relay that powers on to close normally opened self-cleaning recirculation filter inlet motorized ball valve 472. As known to one skilled in the art, and informed by the instant disclosure, some of the above functions can be ganged together to minimize the relay count.

Multi-Mode Control Process/Method: Use and Operation

Referring FIGS. 2 and 19, and in one embodiment, the vehicle wash water reclaim system 10 comprises a user logic or application program 510 comprising a multi-mode control process. The multi-mode control process is comprised of coded instructions that are stored in the non-transitory computer readable medium or program memory 508 of the PLC 500 and that are illustrated in flowchart form in FIGS. 21-26.

The multi-mode control process comprises an Off mode or process 511, a Hand mode or process 512, and an Auto mode or process 514.

Off Mode 511

Off is the mode the system starts in whenever the PLC 500 is powered off and then back on. It is also the mode the PLC 500 is locked in if the time and date are not set on the HMI 544.

Hand Mode 512

In hand mode, the vehicle wash water reclaim system 10 opens the freshwater bypass solenoid valve 318 when wash activation 572 is sent to the PLC 500.

Hand is the mode that the system is turned to in order to perform routine maintenance (e.g. cleaning strainer screen or perforated vertical plane strainer device 152) or replacement of parts.

Auto Mode 514

Referring FIG. 19, and in one embodiment, the Auto mode or process 514 comprises manual prime mode or process 515, continuous recirculation mode or process 516, wash activation mode or process 518, self-cleaning vertical plane strainer mode or process 520 that includes an automatic self-prime mode 521, and a self-cleaning recirculation filter mode or process 522.

Figure 21:
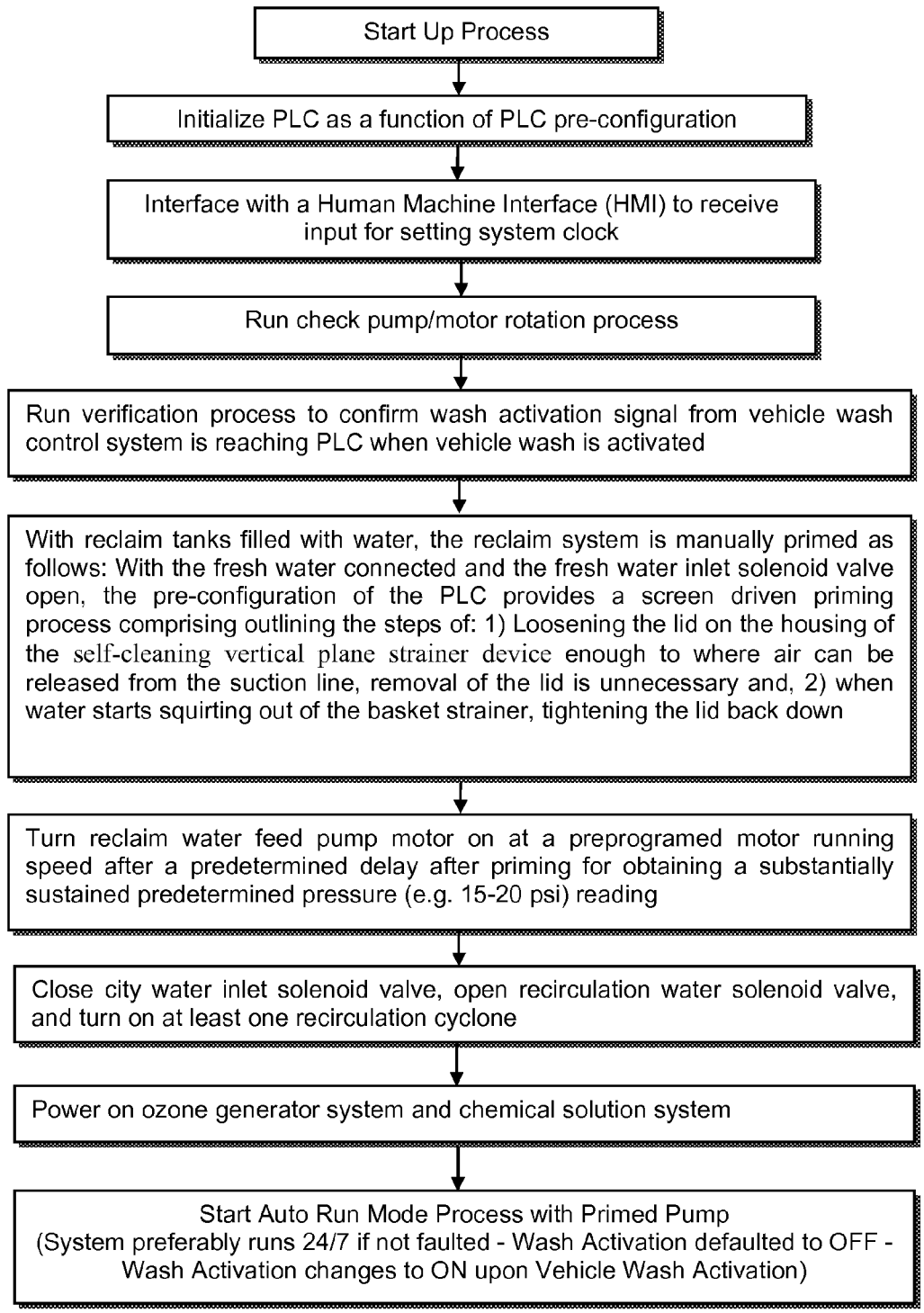
FIG. 21 is a flow diagram view of an embodiment of an initialization process of the vehicle wash water reclaim system under the orchestration of the control system.

In use and operation, and referring to FIGS. 19 and 21, the system 10 is designed to continuously run in the Auto mode or process 514 after the reclaim tanks 30 are sufficiently filled with water and the reclaim pump 250 has been primed.

At start up, the disconnect switch 548 is turned to the on position to power on the PLC 500, the VFD 546, and the human machine interface (HMI) 544. All valves are closed with the exception of valve 300. As noted above, the PLC 500 is preconfigured or programmed to begin the startup process by receiving a clock set via the HMI 544 operatively coupled to the PLC 500. Once the clock is set via the HMI 544, the PLC 500 awaits to receive an actuation signal of, for example, a function key to start a check reclaim pump 250/motor 260 rotation process. After verifying the motor 260 rotation, the next step is to make sure the wash activation 572 is reaching the PLC 500 when vehicle wash is activated. Upon completion, the Auto mode or process 514 steps the user through an initial prime pump sequence.

Manual Pump Prime Process 515

With the reclaim tanks filled with water, the reclaim pump 250 is manually primed as follows: With the fresh water connected and the self-cleaning vertical plane strainer fresh water inlet solenoid valve 222 open and the recirculation solenoid valve 300 closed, the pre-configuration of the PLC

500 provides a screen driven priming process comprising outlining the steps of: 1) Loosening the lid on the housing of the self-cleaning vertical plane strainer device enough to where air can be released from the suction line, removal of the lid is unnecessary and, 2) tightening the lid back down when water starts squirting out of the basket strainer.

After building pressure or a delay of a preset time of, for example, about a minute after priming the PLC 500 commands the solenoid valve 222 closed, the valve 300 open, and the VFD 546 to turn the motor 260 on at a preprogrammed motor running speed for obtaining a substantially sustained 15-20 psi reading at pressure gauge 258. The motor with keep operation the pump for at least 10 seconds. If the preset pressure is below the set point after 10 seconds, the motor will turn off and the self-prime will initiate again. After the prime mode or process 515, the ozone generator 344 and chemical solution system 380 are powered on.

Then, after the reclaim pump 250 is primed, the Auto mode or process 514 configuration of the PLC 500 places the system 10 in an auto run process or mode with primed pump 250.

Start Auto Run Process with Primed Pump

Figure 22:
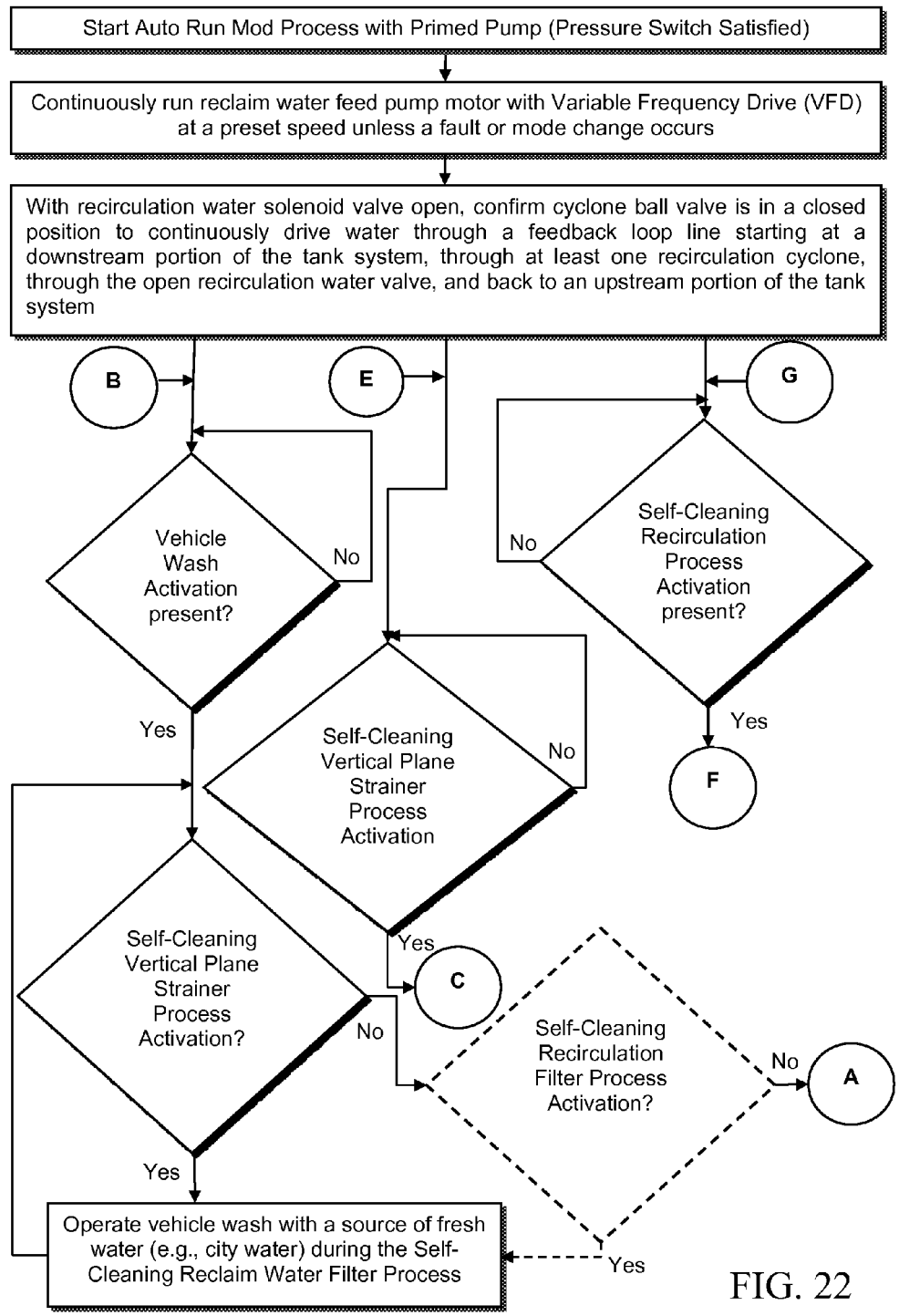
FIGS. 22 through 26 are flowchart views that detail an embodiment of a multi-mode control process of the of the vehicle wash water reclaim system.
Figure 23:
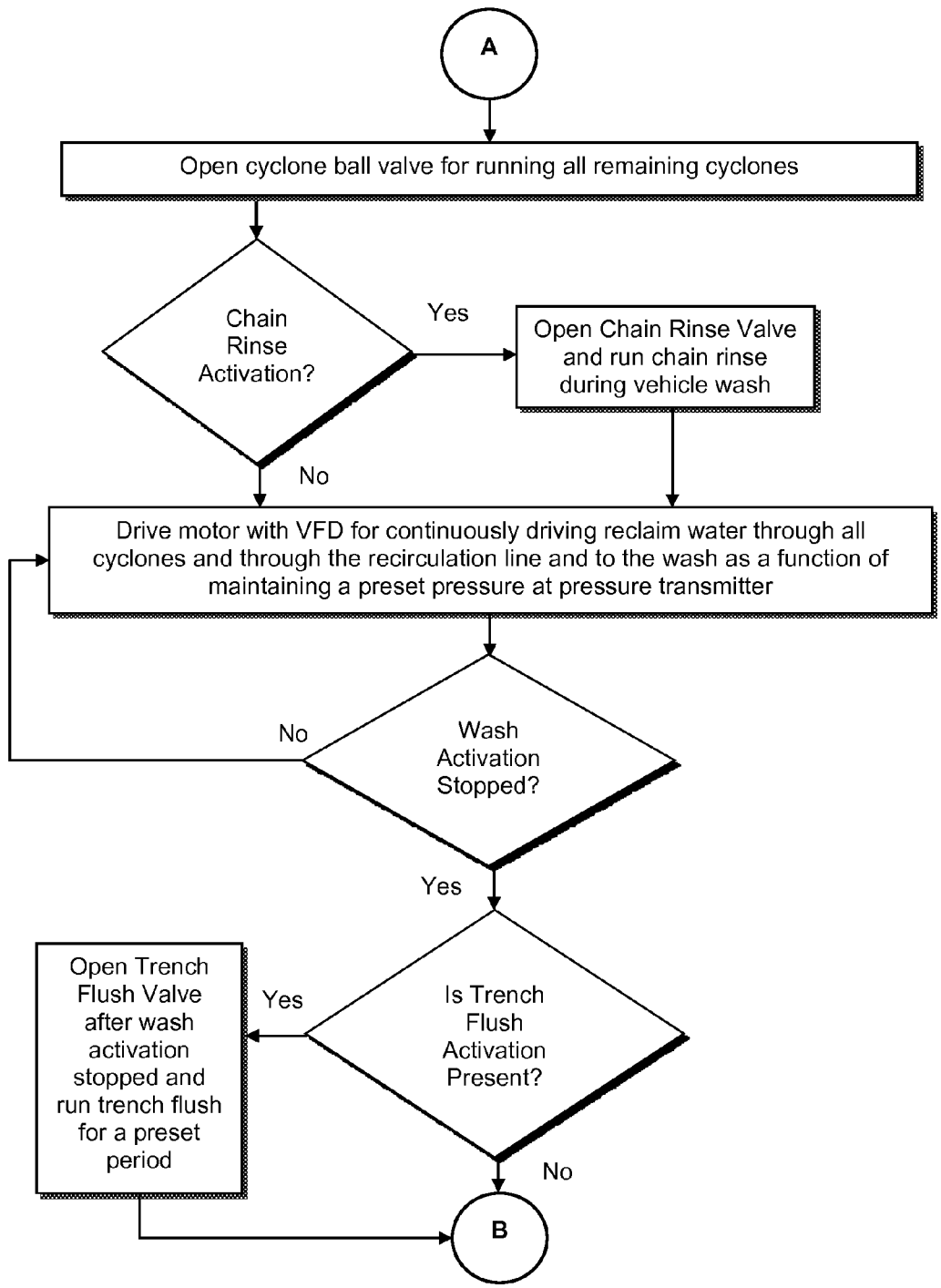

Referring to FIG. 22, and in the Auto mode or process 514, the system 10 preferably runs continuously (24/7) if not faulted and wash activation 572 is defaulted to OFF and changes to ON upon vehicle wash activation. If a major fault is present the control system 480 turns the freshwater bypass solenoid valve 318 on when the wash activation 572 comes on.

The reclaim pump 250 runs on the Variable Frequency Drive (VFD) 546 in one of two ways, either the continuous recirculation only mode or process of operation 516 or the continuous recirculation with simultaneous on demand vehicle wash mode or process of operation 518 or, in short, the wash activation mode 518.

Recirculation Only Process 516

In the continuous recirculation only mode or process of operation 516 the reclaim water feed pump 250 runs at a preset speed, the cyclone inlet motorized ball valve 280 is closed to run water through one cyclone line only comprising at least one recirculation cyclone 272, and the pump 250 constantly runs treated water back into an upstream portion of the tank system 30.

Accordingly, with recirculation water solenoid valve 280 open and with cyclone inlet motorized ball valve 280 being in a confirmed closed position, the pump 250 continuously drives water through a feedback loop line starting at a downstream portion of the tank system 30, through at least one recirculation cyclone 272, through the open recirculation water valve 300, and back to an upstream portion of the tank system 30.

Wash Activation Process 518

In the wash activation process 518, the PLC 500 determines the presence of wash activation signal 572 and if neither the self-cleaning vertical plane strainer process 520 or the self-cleaning recirculation filter process 520 are running, the PLC 500 signals the VFD 546 such that the reclaim pump 250 speed varies as the VFD 546 tracks the readings of the feedback pressure transducer 320 on line 277 to maintain a predefined pressure (e.g., 40 psi) on the treated water line 277.

Concurrently, the cyclone inlet motorized ball valve 280 is opened to run water through all cyclones 270 in parallel and the reclaim pump 250 still recirculates some treated water back into the tank system 30. In both cycles the reclaim pump 250 runs to the cyclonic separators 270 to separate the solids from the water, keeping the treated water to use for the wash or to recirculate back to the first tank of tank system 30.

Then, the processor 502 determines if a chain rinse activation 574 is present. If no, then the processor 502 commands the system 10 to drive reclaim motor 260 with VFD 546 for continuously driving reclaim water through all cyclones 270 and through the feedback loop line 278 as a function of maintaining a preset pressure at pressure transducer 320 with the chain rinse solenoid valve 324 closed. If yes, then the processor 502 commands the system 10 to open chain rinse solenoid valve 324 and run the chain rinse during vehicle wash and then processor 502 commands the system 10 to drive reclaim motor 260 with VFD 546 for continuously driving reclaim water through all cyclones 270 and through the feedback loop line 278 as a function of maintaining a preset pressure at pressure transducer 320. In another embodiment, a jumper can be utilized such that the wash activation signals the chain rinse to operate.

Upon the wash activation 572 providing a wash activation stop signal, the presence of a trench flush activation signal results in the system 10 opening the trench flush solenoid valve 330 after wash activation has stopped for the vehicle wash to run a trench flush for a preset period of time. Upon completion or if the trench flush was not activated, the system 10 again awaits a vehicle wash activation and returns to continuous recirculation mode. In another embodiment, a jumper can be utilized such that the wash activation signals the trench flush to operate.

During the wash activation process 518, an interrupt as a result of activation of either the self-cleaning vertical plane strainer process 520 or optionally the self-cleaning recirculation filter process 520 results in the vehicle wash operating with fresh water from fresh water supply 314 as delineated in detail above wherein this operation can be immediate in one embodiment or after a delay until the wash is complete (wash activation signal is absent) in another embodiment. If cleaning, and a wash activation signal becomes present, the system 10 operates with fresh water from fresh water supply 314 as delineated in detail above wherein this operation can be immediate in one embodiment or after a delay until the cleaning is complete in another embodiment.

Self-Cleaning Vertical Plane Strainer Process 520 with Self-Prime Process

Referring to FIG. 19, the self-cleaning vertical plane strainer process 520 with self-prime process 521 comprise processor executable instructions or coded instructions that are stored in non-transitory computer readable medium 508 that, when executed by the processor 502, cause the processor 502 to perform the self-cleaning vertical plane strainer process 520 with self-prime process 521.

To review and prior to describing these processes, the self-cleaning vertical plane strainer device 110 is used on the inlet of the reclaim pump 250 to remove large debris (i.e. gravel, construction debris, plastic bags, etc.) from the water being brought up from the underground settling tanks of settling tank system 30. In one embodiment, the perforated vertical plane strainer 156 includes, but is not limited to perforations of one-eighth (⅛) of an inch to strain out the debris and to protect the reclaim pump 250 from clogging with this debris. As the debris builds up on the perforated vertical plane strainer 156, the pressure drop across the perforated vertical plane strainer 156 increases and will eventually reduce or shut-off water flow to the reclaim pump 250. This action will cause the reclaim pump 250 to starve for water, which can cause pump seal damage and the system 10 to automatically shut down. Also, the water entering the self-cleaning vertical plane strainer device 110 has not yet been treated so some biological activity can occur within the strainer device 110 causing it to plug.

Figure 24:
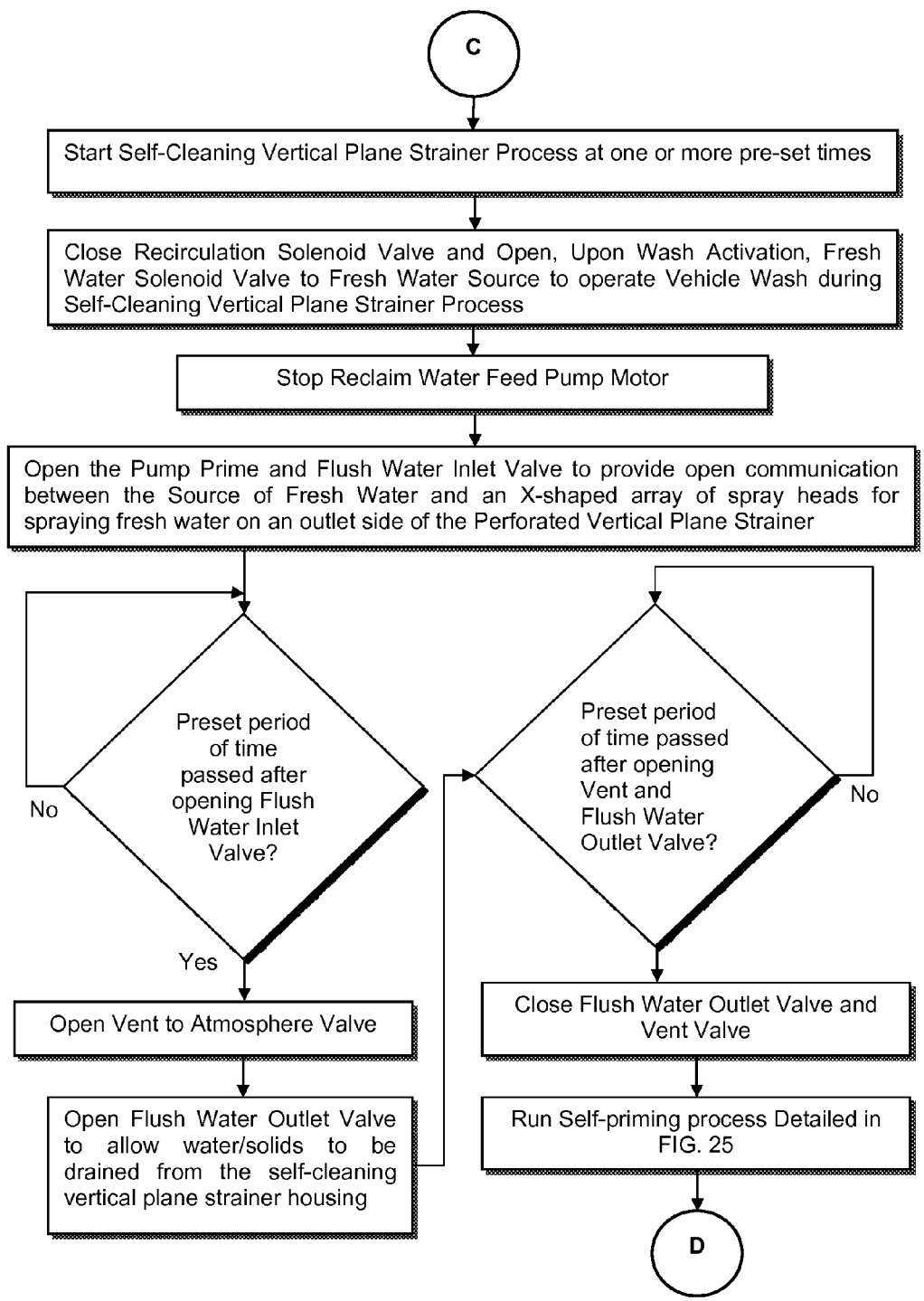

With reference to FIG. 24, said self-cleaning vertical plane strainer process 520 with self-prime process 521 are utilized to automatically drain, clean, and flush the self-cleaning vertical plane strainer device 110 of debris and biological build-up, and initiate the self-priming function without operator input, said processes comprise the following steps:

Starting the self-cleaning vertical plane strainer process 520 at one or more preset times. In one embodiment, the preset cleaning cycle is initiated at three pre-set times during the day (factory settings are 8 AM, 2 PM, and 8 PM). The pre-set times are user adjustable.

Opening, during the presence of the wash activation signal, the fresh water solenoid valve 318 to fresh water source 314 so that the vehicle wash 580 can still be operated during the self-cleaning vertical plane strainer process 520. When process 520 initiates, the system 10 goes into freshwater by-pass mode so that the vehicle wash 580 can still be operated.

Stopping the reclaim pump motor 260 and ozone generation system 340.

Opening the pump prime and flush water inlet solenoid valve 222 for receipt of freshwater so that the X-shaped array of spray nozzles 182 can start spraying the perforated vertical plane strainer 152 of the removable vertical plane strainer assembly 150.

Determining if a set period of time (e.g., five (5) seconds) has occurred after opening the flush water inlet solenoid valve 222.

When the determination is satisfied, opening the vent to atmosphere motorized ball valve 248 and the flush water outlet motorized ball valve 240 to allow water/solids to be drained from the housing 112 of the self-cleaning vertical plane strainer device 110.

Determining if a set period of time (e.g., thirty-five (35) seconds) has occurred after opening the vent to atmosphere motorized ball valve 248 and the flush water outlet motorized ball valve 240.

When the determination is satisfied, closing the vent to atmosphere motorized ball valve 248 and the flush water outlet motorized ball valve 240.

Figure 25:
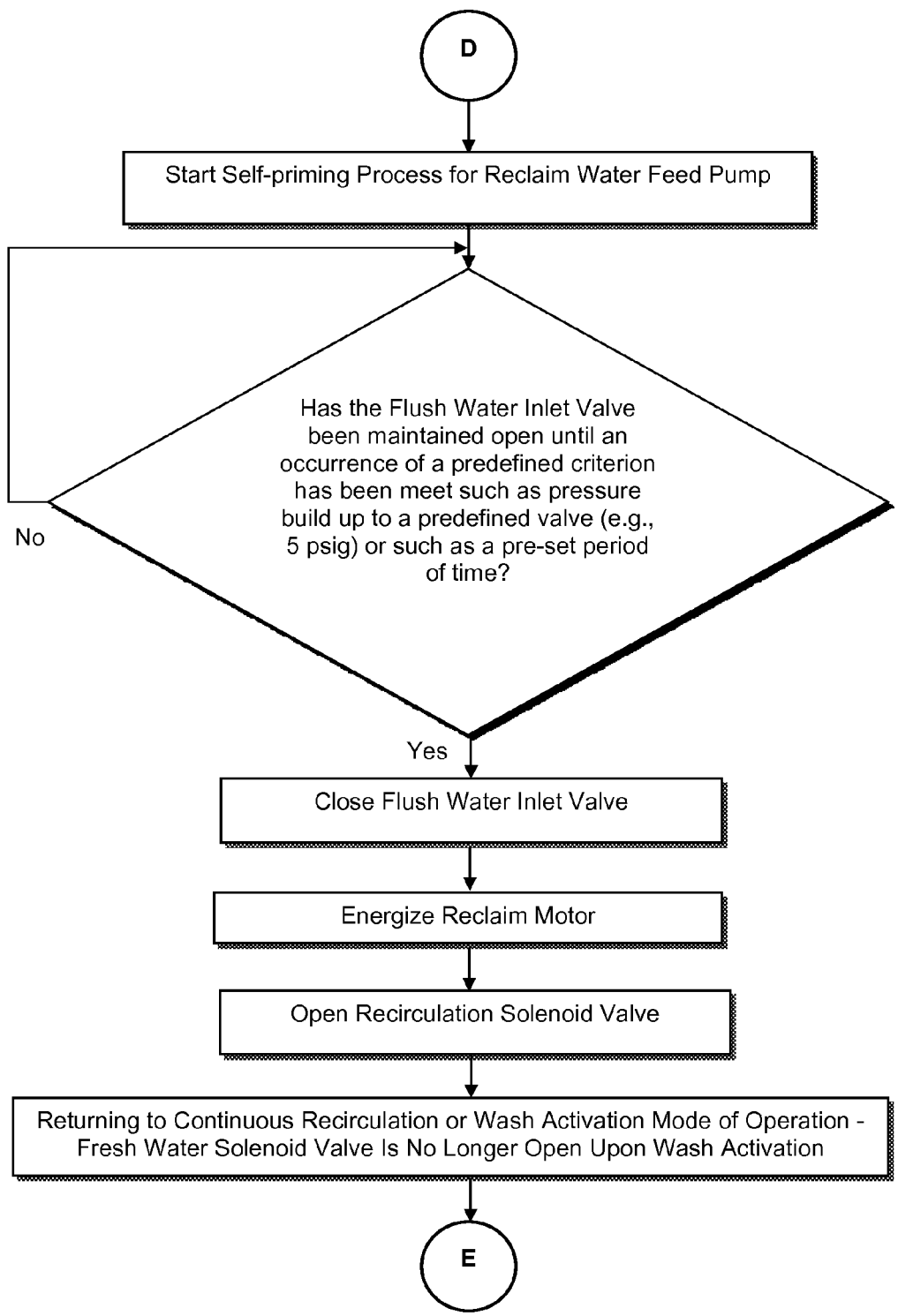

Referring to FIG. 25, the self-prime process 521 of the system 10 automatically initiates the self-priming process for the reclaim pump 250 and the self-cleaning vertical plane flush water inlet solenoid valve 222 remains open, the self-priming process comprising:

Determining if the flush water inlet solenoid valve 222 has been maintained open until an occurrence of a predefined criterion has been meet such as pressure build up to a pre-defined valve (e.g., 5 psig) or such as a pre-set period of time.

Once the self-priming function is complete (e.g., either the system builds up 5 psig pressure or 5 minutes after the self-priming function initiates), closing the flush water inlet solenoid valve 222; and energizing, by driving with motor 260, the reclaim pump 250.

Returning the system 10 to the continuous recirculation only mode or process of operation 516 by driving the reclaim motor 260 with VFD 546 for continuously driving reclaim water through at least one recirculation cyclone 272 and through the feedback loop line or recirculation line 278 as a function of, for example, maintaining a preset speed. System 10 can also go to wash activation mode 518 at this point. And, the system 10 starts the oxygen concentrator 342, hydrogen peroxide delivery system 380, and then the ozone generator 344 after the pump catches prime.

If the reclaim pump 250 does not prime properly within ten (10) seconds after being energized, then: 1) The reclaim pump 250 is shutdown to prevent damage to the pump; 2) The reclaim system 10 goes into the freshwater by-pass mode or hand mode 512; and 3) An alarm signal is displayed on the PLC 500 and HMI 544, and sent to the operator. The system 10 will remain in freshwater by-pass mode or hand mode 512 until the operator takes a manual action to re-prime the system.

Overall, the self-cleaning vertical plane strainer process 520 with self-prime process 521 ensures that the self-cleaning vertical plane strainer device 110 is cleaned periodically, which can extend the need for operator inspection or care to 60-90 days. Also, the processes reduce excessive pump wear and downtime by ensuring the perforated vertical plane strainer 152 of the self-cleaning vertical plane strainer device 110 is cleaned before it becomes plugged. In stark contrast, the structure of prior art devices require normal cleaning once every 1-2 weeks and are subject to operator neglect and the problems associated therewith as discussed hereinabove.

Self-Cleaning Recirculation Filter Process 522

Referring to FIG. 19, the self-cleaning recirculation filter process 522 comprises processor executable instructions or coded instructions that are stored in non-transitory computer readable medium 508 that, when executed by the processor 502, cause the processor 502 to perform the self-cleaning recirculation filter process 522.

To review and prior to describing process 522, cyclone treated water enters the recirculation line 278 and has ozone added thereto. Next, the ozone treated water has hydrogen peroxide added thereto. This hydrogen peroxide injected ozone-laden treated reclaim water then passes through the self-cleaning recirculation filter device 392 and returned to the underground settling tanks 30. The recirculation line flows 24/7 and keeps water moving through the system 10 to prevent the water from becoming septic. The hydrogen peroxide combines with the ozone to form the hydroxyl radical, which is a stronger oxidizer than either ozone or hydrogen peroxide. The stronger oxidizer provides better control of biological activity, the removal of color bodies from wash chemical dyes, and the destruction of organics from wash chemicals and oils/greases removed from washed vehicles. The bio-media 434 is used to establish controlled biological activity to further reduce organic content in the reclaim water. The addition of the hydrogen peroxide and bio-media 434 provides an overall cleaner (less BOD/COD and Oil & Grease) reclaim water so that it can be used in more applications within the wash without affecting wash quality.

Although the water quality is improved with the use of ozone, hydrogen peroxide, and bio-media 434, the reclaim water still has some total suspended solids (TSS) not captured by the settling tanks or cyclones. This small amount of TSS is typically buoyant or lighter than water, and gives the water a slight gray appearance.

The self-cleaning recirculation filter device 392 provides clearer water with lower TSS and up to 60-90 days without operator attention servicing. In stark contrast, the structure of prior art devices require normal cleaning once every 1-5 days and are subject to operator neglect and the problems associated therewith as discussed hereinabove. The filter media of device 392 is the wedge-wire cylindrical screen filter 420 that filters from out-to-in with, in one embodiment, a filter rating of 25-100 microns. Spray nozzle assembly 440 comprising the plurality of pairs of spray nozzles 448 are aligned on the inside of the wedge-wire cylindrical screen filter 420 and are used to provide the pressurized water spray to clean the wedge-wire cylindrical screen filter 420 during the self-cleaning recirculation filter process 522. Specifically, the pair of spiral paths of spray nozzles 448 are aligned on the inside of the cylindrical screen filter 420 to provide a pressurized water spray to clean the cylindrical screen filter 420 during the self-cleaning recirculation filter process 522. Source water for the sprays is either treated reclaim water or fresh water, and is pressurized with a booster pump 460 up to 100 psig to provide enough force to clean the wedge-wire cylindrical screen filter 420. The self-cleaning recirculation filter device 392 can be used with ozone only, or with the hydrogen peroxide/bio-media addition. If the bio-media is used, it is placed on the outside of the wedge-wire cylindrical screen filter 420 as detailed above and will also be cleaned when the self-cleaning recirculation filter process 522 is cycled to perform, eliminating the need for a manual operator cleaning. In particular, the pressurized water used to clean the cylindrical screen filter 420 also cleans the bio-media means 434 on the outside of the cylindrical screen filter 420. Moreover, the pressurized water agitating the bio-media means 434 against the exterior of the cylindrical screen filter 420 provides a cleaning action of the bio-media means 434 while assisting in knocking some debris off of the cylindrical screen filter 420 thereby assisting with the cleaning of the cylindrical screen filter 420.

Figure 26:
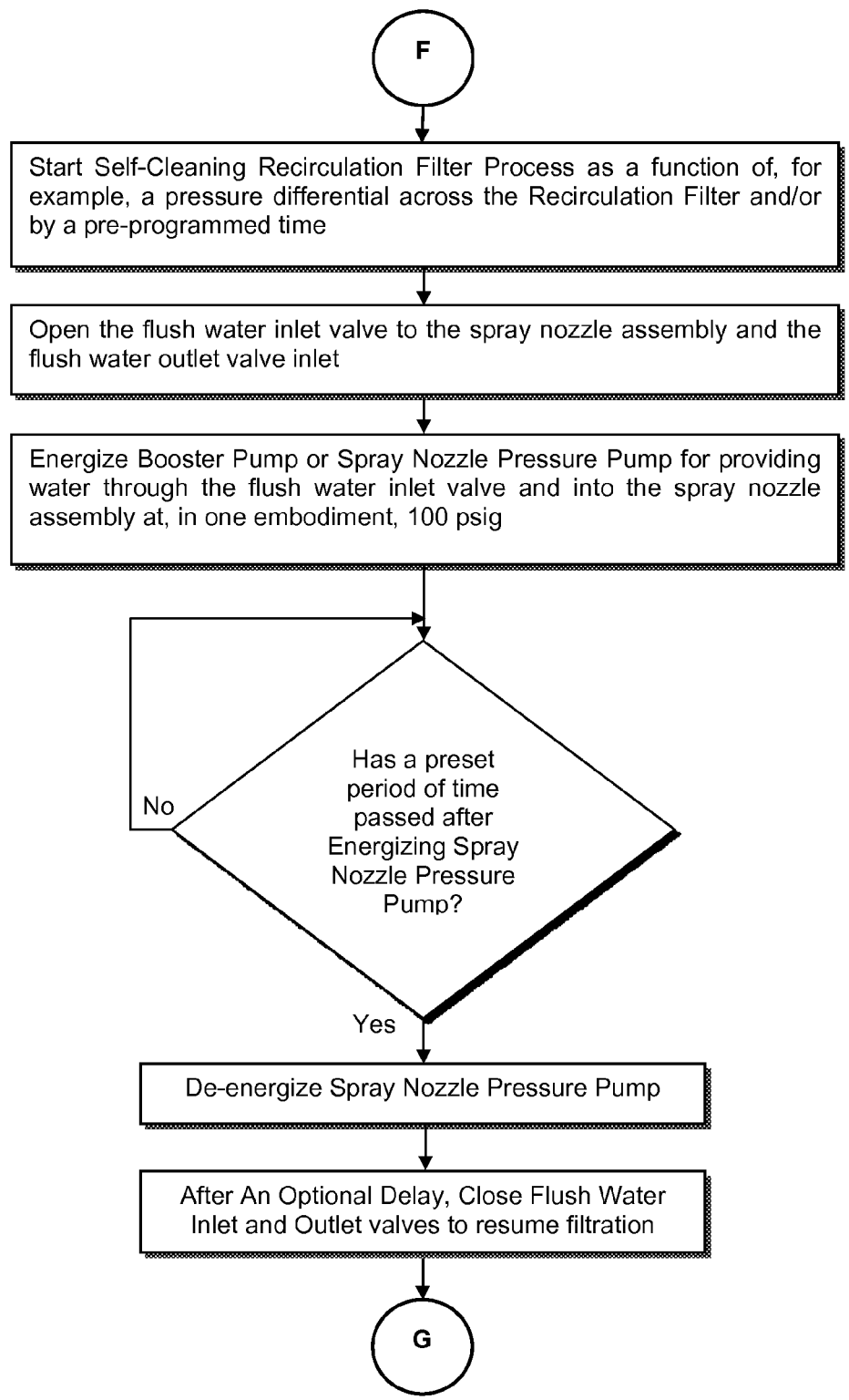

With reference to FIG. 26, the self-cleaning recirculation filter process 522 comprises the following steps:

Starting the self-cleaning recirculation filter process 522 as a function of, for example, a high pressure differential across the screen filter 420 and/or by a pre-programmed time. As noted, the cleaning cycle can be initiated by either a high differential pressure across the filter and or by a pre-programmed time. The differential pressure is sensed by a pressure switch 523 (FIG. 20) on the filter water inlet channel 474 that is set to provide a signal to the PLC 500 when the inlet pressure rises to a certain set point, indicating that the screen filter 420 is plugging. A pre-programmed time can also be set so that the self-cleaning recirculation filter device 392 will clean itself every X hours, or at a set time of day. The pre-programmed time and duration of the cleaning cycle is adjustable on the HMI 544 for the PLC 500.

Opening the flush water inlet valve 464 to the spray nozzle assembly and the flush water outlet valve 468, and closing inlet ball valve 472, if used.

Energizing the booster pump or spray nozzle pressure pump 460 for providing water through the flush water inlet valve 464 and into the spray nozzle assembly 440 at, in one embodiment, 100 psig. The spray nozzles 448 are arranged within the inside of the screen filter 420 to provide full coverage along the length and circumference of the screen filter 420, and at a water pressure and volume to remove solids from the outside of the screen filter 420. As the bio-media means 434 is on the outside of the screen and within the filter housing 394, the bio-media means 434 is also cleaned of excess debris, eliminating the need for monthly cleaning of the bio-media 434. The flush water containing the removed solids exits the housing 394 through the flush water outlet valve 468 and is discharged to sewer or back to the catch basin 22 if no sewer connection is available.

Determining if a preset period of time passed after energizing spray nozzle pressure pump 460. If no, the decision loops until yes or the duration of the cycle time is met. If yes, then de-energizing the booster pump or spray nozzle pressure pump 460 and closing the flush water inlet valve 464, the flush water outlet valve 468, and opening the inlet valve 472, if used. The recirculation line 278 fills the self-cleaning recirculation filter device 392 and it resumes in filtration mode.

In filtration mode, the flush water inlet valve 464 and the flush water outlet valve 468 are closed and the inlet valve 472 is open, if used. The spray nozzle pressure pump 460 is off. Hydrogen peroxide injected ozone-laden treated reclaim water enters the filter housing from the recirculation line 278 and flows out-to-in through the screen filter 420. Solids are captured on the outside of the screen filter 420 and the clean hydrogen peroxide injected ozone-laden treated reclaim water passes through. The clean or filtered hydrogen peroxide injected ozone-laden treated reclaim water exits the housing 394 and into the underground settling tanks 30.

The duration of the self-cleaning recirculation filter process 522 is pre-programmed and can be field adjusted using the HMI 544 to the PLC 500.

Overall, the self-cleaning recirculation filter system 390 provides cleaner water for reuse by the wash. This allows the wash operator to use more reclaim water for more functions within the wash, allowing the operator to use less fresh water and discharge less excess water. This quality of water is also needed where a wash operator has no sewer connection or desires to approach a zero discharge operation. The automatic cleaning function of the filter eliminates the need for an operator to perform at least once per week cleaning of the filter screen and a monthly cleaning of the bio-media, if used, and extend inspection of the filter to 60-90 days.

Accordingly, an embodiment of the system 10 provides self-cleaning functions that eliminate the need for an operator to perform weekly or monthly cleanings Inspections of system 10 can be extended to 60-90 days.

Use and Operation Continued

In use and operation, and in light of the description hereinabove with reference to FIGS. 1 through 26, the vehicle wash water reclaim system 10 provides quality reclaim water for re-use within the vehicle wash 580 and still provide a clean vehicle. The system 10 in combination with tank system 30 separates settleable solids (typically sand, grit) and free oils from the reclaimed vehicle wash water going to the vehicle wash 580. These solids and oils can affect wash quality, and increase the maintenance on wash pumps, piping, and nozzles. The large settleable solids are settled within the underground tanks of tank system 30 prior to entering the above ground system 10. The free oils float to the surface within the underground tanks of tank system 30 and are trapped within the tanks. The piping design within and between the tanks keeps these accumulated contaminants from migrating from tank-to-tank. Accumulated settleable solids and free oils are periodically (normally every 6-12 months) removed by pumping out the underground tanks of tank system 30 and replacing with fresh water.

The underground tanks of tank system 30 are normally supplied by a local concrete vault vendor in accordance with system 10 requirements.

Reclaim Tank Sizing for Tank System 30

In particular, there are two factors used in determining the size of the underground tanks of tank system 30 or the reclaim tanks for use with the system 10. The first consideration is the size of solid particle to separate within the reclaim tanks and the second consideration is how often to treat the water in the tanks using the continuous recirculation. The following will provide details on both of these factors:

First: Particle Removal

The reclaim tank system typically removes solid particles between 60-75 microns in size. This ensures large particles are not going through the system 10, which can cause excessive wear and/or plugging. Also, the size of the tanks needed for this removal allows for a relatively large volume for a sludge layer to build so that tanks do not need frequent cleanout. Particle size removal is determined by Stoke's Law:

$$V(R/S) = (g \times (Rho1 - Rho2) \times D^2)/18Nu$$

Where: V (R/S)=Rise or Settling Velocity of a Particle (cm/sec); g=Acceleration by Gravity (cm/sec^2);

Rho1=Density of Medium (g/cm^3); Rho2=Density of Particle (g cm^3); D=Particle Diameter (cm); Nu=Viscosity of Medium (g/cm/sec).

Assume a water temperature of 68 degrees Fahrenheit, which provides a water density of 1.0 g/cm^3 and a viscosity of 1 cp (0.01 g/cm/sec). The solids density we use is 1.2 g cm^3, which is typically the lighter solids (silt) found in car washes. The acceleration of gravity is 980 cm/sec^2.

For a 60 micron (0.006 cm) particle, the settling velocity is 0.039 cm/sec, or 0.93 in/min. For a 75 micron (0.0075 cm) particle, the settling velocity is 0.061 cm/sec, or 1.45 in/min. These velocities are used to determine the tank volume.

A tank that is 11 ft long (I.D.) by 5 ft wide (I.D.) with a 4.5 ft water depth is normally used. Allowing for 1 foot at the bottom to be sludge accumulation mean that a solids particle must travel a maximum of 3.5 feet (42 in.) to be removed. This provides approximately 1440 gallons per tank of working volume (excluding the sludge layer).

For example, assume the maximum flow to the reclaim unit is 90 gpm. To remove 60 micron particles, it will take a working tank volume of 4065 gallons (90 gpm×42 in. travel distance/0.93 in. per minute settling velocity), or 2.8 tanks (4065 gallons/1440 gallons per tank of working volume). To remove 75 micron particles, it will take a working tank volume of 2606 gallons, or 1.8 tanks A typical recommendation is to use three tanks for this flow rate.

Second: Treatment Frequency

System 10 continuously recirculates water through the reclaim tanks to provide odor control and to keep the water in the tanks from going stagnant. In one embodiment, it is recommended that the entire reclaim tank working volume is treated at least 2-3 times per day. In one embodiment and for example, the system 10 recirculates water at 12 gpm. Using three tanks (per the example above), the entire working volume will be treated every 6 hours (3 tanks×1440 gallons per tank/12 gpm), or 4 times per day. This treatment frequency is well within the guidelines.

System 10

The vehicle wash water reclaim system 10 further removes solids from the reclaim water so that it is acceptable for the high pressure pumps and nozzles within the wash. System 10 comprises the suction pump 250 that brings vehicle wash water up from the last reclaim tank into self-cleaning vertical plane strainer device 110 that removes, in one embodiment, any large debris (>⅛ inch) prior to the pump 250. The pump speed is controlled by the Variable Frequency Drive (VFD) 546 to either continuously recirculate water (low speed) or to provide on demand various water volumes to the wash at, for example, 40 psig. The system 10 uses high efficiency cyclones 272, 274 to remove down to 5 micron settleable solids prior sending the treated water to the vehicle wash 580. The cyclones create nearly 1000 G's of centrifugal force to obtain this fine particle separation.

The treated (cleaned) water is sent to the vehicle wash 580 and/or back to the reclaim tank system 30 as part of the continual recirculation mode. The solids-laden water from the system 10 is re-introduced into the reclaim water at the front end of the underground reclaim tank system 30, where some solids settle and some continue with the water phase to be re-treated or go out with the effluent.

The vehicle wash water reclaim system 10 also has the function of providing odor control for the reclaim water. Reclaim water is a great environment for growing bacteria which can create plugging and odor problems. Typically, anaerobic bacteria (bacteria that grow in the absence of oxygen) will grow beneath the settled solids in the reclaim tank system 30. This type of bacteria produces hydrogen sulfide which produces an odor similar to rotten eggs. To control this bacterial growth, the system 10 continuously recirculates water through the reclaim tank system 30 to keep the water moving so that it does not go septic. The system 10 also comprises odor control devices and methods to further keep the bacterial growth in check. One device and method used is the ozone generation and injection system 340. Ozone is a powerful disinfectant similar to chlorine. The ozone kills the bacteria to maintain acceptable bacteria levels to prevent odor and plugging. Also, ozone oxidizes dyes in the water, so it will remove the color created by wash chemicals (i.e. triple foams). The system 10 further comprises the hydrogen peroxide delivery system 380 for injecting hydrogen peroxide into the continuous flow of treated recirculation water to obtain a continuous flow of hydrogen peroxide injected ozone-laden treated reclaim water back to the underground reclaim water settling tank system 30. Moreover, the system 10 comprises the self-cleaning recirculation filter system 390 comprising bio-media means 434 for filtering the hydrogen peroxide injected ozone-laden treated reclaim water just prior to being delivered back to the underground reclaim water settling tank system 30.

The above delineation of the system 10, including its methods and aspects demonstrate the industrial applicability of this invention.

Moreover, it should be apparent that numerous modifications and adaptations may be resorted to without departing from the scope and fair meaning of this invention as set forth hereinabove and as described herein below by the claims.

We claim:

1. Vehicle wash water reclaim process, said process comprising:
   providing a self-cleaning vertical plane strainer device having an inlet channel in fluid communication with a source of used vehicle wash water and an outlet channel, the self-cleaning vertical plane strainer device comprising:
      a hollow strainer container having an interior cylindrical main chamber; and
      a perforated vertical plane strainer vertically partitioning the interior cylindrical main chamber into an inlet semi-cylinder volume zone in open communication with the inlet channel and an outlet semi-cylinder volume zone in open fluid communication with the output channel and separated from the inlet semi-cylinder volume zone by the perforated vertical plane strainer;
   providing at least one first cyclone having an input and an output; and
   driving a pump, the pump having a suction side operatively coupled to the outlet channel of the self-cleaning vertical plane strainer device and an outlet side operatively coupled to the input of the at least one cyclone, for drawing the used vehicle wash water through the perforated vertical plane strainer of the self-cleaning vertical plane strainer device and out of the outlet channel of the self-cleaning vertical plane strainer device and for pumping the drawn used vehicle wash water through the at least one cyclone for outputting pressured treated reclaim water from the at least one cyclone.

2. Vehicle wash water reclaim process, said process comprising:
   providing a self-cleaning vertical plane strainer device having an inlet channel in fluid communication with a source of used vehicle wash water and an outlet channel, said self-cleaning vertical plane strainer device comprising:

a hollow strainer container having an interior cylindrical main chamber; and a perforated vertical plane strainer vertically partitioning the interior cylindrical main chamber into an inlet semi-cylinder volume zone in open communication with the inlet channel and an outlet semi-cylinder volume zone in open fluid communication with the output channel and separated from the inlet semi-cylinder volume zone by the perforated vertical plane strainer;

providing at least one cyclone;

providing a pump driven by a motor for drawing the used vehicle wash water through the self-cleaning vertical plane strainer device from the used vehicle wash water source and pumping the drawn used vehicle wash water through the at least one cyclone for outputting pressured treated reclaim water from the at least one cyclone to a recirculation and a vehicle wash line wherein the recirculation line is in open fluid communication with the used vehicle wash water source and the vehicle wash line is in controllably opened or closed fluid communication with a vehicle wash;

providing an electrical signal correlative to a treated reclaim water pressure at a location which is in fluid communication with the vehicle wash line;

controlling the motor for driving the pump at a pre-set motor speed in a first mode of operation defined by an absence of a vehicle wash activating signal from the vehicle wash; and controlling the motor for driving the pump as a function of the electrical signal in a second mode of operation defined by a presence of the vehicle wash activating signal from the vehicle wash.

3. The process of claim 2 further comprises a step of controllably coupling at least one further cyclone in parallel fluid communication with the at least one cyclone when in the second mode of operation actuated by the vehicle wash line being in controllably open fluid communication with the vehicle wash.

4. The process of claim 2 further comprises a step of entraining ozone into the treated reclaim water flowing in the recirculation line for obtaining a flow of ozone-laden treated reclaim water in the recirculation line.

5. The process of claim 4 further comprises a step of injecting hydrogen peroxide into the ozone-laden treated reclaim water in the recirculation line for obtaining a flow of hydrogen peroxide injected ozone-laden treated reclaim water.

6. The process of claim 5 further comprises a step of passing the hydrogen peroxide injected ozone-laden treated reclaim water through a bio-media enveloped between an interior container wall of a self-cleaning recirculation housing and a circumscribing screen filter.

7. The process of claim 6 further comprises a step of passing the hydrogen peroxide injected ozone-laden treated reclaim water through the screen filter immediately after the hydrogen peroxide injected ozone-laden treated reclaim water passes through the bio-media for obtaining a flow of bio-media screen filtered hydrogen peroxide injected ozone-laden treated reclaim water flowing in the recirculation line to the used vehicle wash water source.

8. The process of claim 7 further comprises a step of sending pressurized water to a vertical blind bore conduit assembly centrally disposed within the self-cleaning recirculation housing and circumscribed by and radially spaced from an interior surface of the screen filter, the vertical blind bore conduit assembly is in open fluid communication with and supports a plurality of pairs of opposing radially outwardly facing spray nozzles vertically spaced apart and circumferentially distributed in a sequentially staggered pattern along a central axis of the vertical blind bore conduit assembly for discharging the pressurized water from the plurality of pairs of opposing radially outwardly facing spray nozzles in a direction from an interior of the screen filter to an exterior of the screen filter to clean the screen filter and the bio-media enveloped between the screen filter and self-cleaning recirculation housing and flushing the discharged pressurized water from the self-cleaning recirculation housing.

9. The process of claim 2 further comprises a step of shutting down the motor driving the pump and sending pressurized water to an X-shaped array of spray heads disposed in a plane spaced from and parallel to an outlet semi-cylinder volume zone side of the perforated vertical plane strainer to discharge a spray thereon to dislodge debris from an inlet semi-cylinder volume zone side of the perforated vertical plane strainer and flush the debris in the inlet semi-cylinder volume zone through a selectively opened bottom opening disposed through the self-cleaning vertical plane strainer device at a location in open fluid communication with the inlet semi-cylinder volume zone.

10. The process of claim 9 further comprises a step of supplying the vehicle wash line with a source of fresh water when said motor is shut down.

11. The process of claim 10 further comprises a step of powering the motor and self-priming the pump prior to resuming the preset pump speed.

12. Vehicle wash water reclaim system, said system comprising:

a self-cleaning vertical plane strainer device having an inlet channel in fluid communication with a source of used vehicle wash water and an outlet channel, said self-cleaning vertical plane strainer device comprising:

a hollow strainer container having an interior cylindrical main chamber; and a perforated vertical plane strainer vertically partitioning said interior cylindrical main chamber into an inlet semi-cylinder volume zone in open communication with said inlet channel and an outlet semi-cylinder volume zone in open fluid communication with said output channel and separated from said inlet semi-cylinder volume zone by said perforated vertical plane strainer;

at least one first cyclone having an input and an output;

a motor;

a pump driven by said motor, said pump having a suction side operatively coupled to said outlet channel of said self-cleaning vertical plane strainer device and an outlet side operatively coupled to said input of said at least one cyclone; and a motor drive configured to drive said motor.

13. The system of claim 12 wherein said motor drive is configured to drive said motor at a pre-set motor speed in a first mode of operation defined by an absence of a vehicle wash activating signal and as a function of pressure of treated reclaim water in a vehicle wash line in a second mode of operation defined by a presence of a vehicle wash activating signal wherein the vehicle wash line is operatively coupled between said output of said at least one first cyclone and a vehicle wash.

14. Vehicle wash water reclaim system, said system comprising:

a self-cleaning vertical plane strainer device having an inlet channel in fluid communication with a source of used vehicle wash water and an outlet channel, said self-cleaning vertical plane strainer device comprising:

a hollow fluid impervious strainer container having a closed bottom end with a circumscribing outer periphery transitioning into an upwardly extending circumscribing sidewall terminating to an annular lip defining an open top end of said strainer container;

said upwardly extending circumscribing sidewall having an inner circumscribing surface defining a chamber extending along a central longitudinal axis of said strainer container;

a top lid detachably coupled on said annular lip for closing said open top end of said strainer container;

receiving means fixed to said inner circumscribing surface of said strainer container;

a perforated vertical plane strainer removeably disposed within said strainer container and removeably held by said receiving means; and wherein said perforated vertical plane strainer partitions said hollow fluid impervious strainer container into a first region in open fluid communication with said input channel and a second region in open fluid communication with said output channel and separated from said first region by said perforated vertical divider;

at least one first cyclone having an input and an output;

a pump having a suction side operatively coupled to said outlet channel of said self-cleaning vertical plane strainer device and an outlet side operatively coupled to said input of said at least one cyclone for drawing the used vehicle wash water into said first region of said hollow fluid impervious strainer container through said perforated vertical divider into said second region of said hollow fluid impervious strainer container, and out of said outlet channel of said self-cleaning vertical plane strainer device and pumping the drawn used vehicle wash water through said at least one cyclone;

a recirculation line operatively coupled to said output of said at least one cyclone for receiving cyclone treated water pumped through said at least one cyclone and feeding back said cyclone treated water to the used vehicle wash water source;

a vehicle wash line operatively coupled to said output of said at least one cyclone for receiving cyclone treated water pumped through said at least one cyclone;

a pressure transducer operatively coupled to said vehicle wash line for providing an electrical signal correlative to the pressure of the cyclone treated water therein;

a motor driving said pump;

a variable frequency drive driving said motor;

a programmable logic controller operatively coupled to said variable frequency drive, said programmable logic controller configured to signal said variable frequency drive to drive said pump in a first mode of operation wherein said variable frequency drive drives said pump with said motor at a first pre-set speed in an absence of a wash activation signal and to signal said variable frequency drive to drive said pump at a second variable speed as a function of said electrical signal correlative to the pressure of the cyclone treated water flowing through said vehicle wash line in a presence of a wash activation signal.

15. The system of claim 14 further comprising:

at least one second cyclone having an input and an output;

a normally closed motorized ball valve having an input and an output, said input of said motorized ball valve is operatively coupled to said outlet side of said pump and said output of said motorized ball valve is operatively coupled to said input of said at least one second cyclone having said output of said at least one second cyclone operatively coupled to said recirculation and vehicle wash lines wherein said at least one second cyclone is selectively coupled in parallel with said at least one first cyclone; and wherein said programmable logic controller is operatively coupled to said motorized ball valve and is configured upon receipt of a wash activation signal to open said motorized ball valve for selectively coupling said at least one second cyclone in open parallel fluid communication with said at least one first cyclone and for signaling said variable frequency drive to drive said motor at a variable speed as a function of said pressure signal correlative to the pressure of the cyclone treated water flowing through said vehicle wash line in a presence of a wash activation signal.

16. The system of claim 15 further comprising:

a spray assembly disposed within said second region of said self-cleaning vertical plane strainer device, said spray assembly comprising:

a manifold in selectively open fluid communication with a water source;

an array of spray nozzles supported on and in open fluid communication with said manifold, said an array of spray nozzles facing said perforated vertical plane strainer and spaced therefrom in a plane substantially parallel with said perforated vertical plane strainer to discharge a spray from said array of spray nozzles onto said perforated vertical plane strainer in a direction from said second region to said first region to dislodge debris disposed on said first region side of said perforated vertical plane strainer.

17. The system of claim 16 wherein said array of spray nozzles are supported on said manifold in an X-shaped configuration for discharging a spray covering a rectangularly shaped pattern onto and complemental to a shape of said perforated vertical plane strainer.

18. The system of claim 16 further comprises a self-cleaning recirculation filter device, said self-cleaning recirculation filter device comprising:

a self-cleaning recirculation housing comprising a bottom having an outer circumscribing periphery transitioning into an upwardly extending circumscribing sidewall terminating to an upper circumscribing lip defining an upper opening of said self-cleaning recirculation housing;

a lid mounted on said upper circumscribing lip of said self-cleaning recirculation housing;

said upwardly extending circumscribing sidewall having an interior circumscribing surface defining a circumscribing main chamber that extends along and circumscribes a central longitudinal axis of said self-cleaning recirculation housing;

a cylindrical screen filter disposed within said self-cleaning recirculation housing, said cylindrical screen filter having a diameter less than an interior diameter of said self-cleaning recirculation housing;

said cylindrical screen filter having an inferior end abutting an interior surface of said bottom of said self-cleaning recirculation housing and a superior circumscribing collar radially extending away from a superior end of said cylindrical body of said cylindrical screen filter and circumferentially spacing said cylindrical body of said cylindrical screen filter away from said interior circumscribing surface of said self-cleaning recirculation housing for forming a hollow cylindrically shaped envelope between an exterior of said cylindrical body of said cylindrical screen filter and said interior circumscribing surface of said self-cleaning recirculation housing, said hollow cylindrically shaped envelope bounded by said superior circumscribing collar of said cylindrical screen filter, said bottom of said self-cleaning recirculation housing, said interior circumscribing surface of said self-cleaning recirculation housing, and said exterior surface of said cylindrical screen filter; and a multiplicity of bio-media balls disposed within said hollow cylindrically shaped envelope.

19. The system of claim 18 wherein said self-cleaning recirculation housing comprises an inlet channel providing open fluid communication to said hollow cylindrically shaped envelope and an outlet channel providing open fluid communication out of said self-cleaning recirculation housing to filter from out-to-in.

20. The system of claim 19 further comprises a spray nozzle assembly comprising:

a vertical blind bore conduit assembly extending between a closed inferior end and an open superior end, said vertical blind bore conduit assembly centrally disposed within said self-cleaning recirculation housing and circumscribed by and radially spaced from an interior surface of said cylindrical screen filter with said closed inferior end spaced from said bottom of said self-cleaning recirculation housing and said open superior end in fluid communication with a water source;

a plurality of pairs of opposing radially outwardly facing spray nozzles vertically spaced apart and circumferentially distributed in a sequentially staggered pattern along a central axis of said vertical blind bore conduit assembly and in open fluid communication with said blind bore to discharge a spray from said plurality of pairs of opposing radially outwardly facing spray nozzles in a direction from said interior of said cylindrical body of said cylindrical screen filter to said exterior of said cylindrical body of said cylindrical screen filter.

21. The system of claim 15 further comprising an underflow valve operatively coupled to a discharge bottom of said at least one first cyclone and a discharge bottom of said at least one second cyclone, said underflow valve comprising:

a ball having open faces for allowing fluid flow in an open position; and said ball having closed faces comprising a pair of opposing, diametrically spaced apart central orifices to allow a controlled flow of solids laden water out of said discharge bottom of said at least one first cyclone and out of said discharge bottom of said at least one second cyclone.

* * * * *